United States Patent [19]
Crabtree

[11] Patent Number: 5,990,990
[45] Date of Patent: Nov. 23, 1999

US005990990A

[54] THREE-DIMENSIONAL DISPLAY TECHNIQUES, DEVICE, SYSTEMS AND METHOD OF PRESENTING DATA IN A VOLUMETRIC FORMAT

[76] Inventor: Allen F. Crabtree, 1063 Louisiana Ave., Sebastian, Fla. 32958

[21] Appl. No.: 08/743,483

[22] Filed: Nov. 4, 1996

Related U.S. Application Data

[63] Continuation-in-part of application No. 08/152,861, Nov. 15, 1993, Pat. No. 5,572,375, which is a continuation-in-part of application No. 07/840,316, Feb. 24, 1992, Pat. No. 5,311,335, which is a division of application No. 07/562,271, Aug. 3, 1990, Pat. No. 5,090,789.

[51] Int. Cl.⁶ .................................................. G02F 1/1347
[52] U.S. Cl. ............................... 349/74; 349/77; 349/83; 359/316; 359/318; 345/6
[58] Field of Search ..................................... 359/261, 263, 359/267, 272, 316, 317, 318, 618, 629; 349/74, 83, 155, 193, 196, 77; 345/6; 348/758

[56] References Cited

U.S. PATENT DOCUMENTS

| | | |
|---|---|---|
| 3,489,485 | 1/1970 | Marcovecchio et al. ............... 350/271 |
| 3,679,290 | 7/1972 | Adams et al. .......................... 350/157 |
| 3,950,079 | 4/1976 | Rambauske ............................ 350/285 |
| 3,989,355 | 11/1976 | Wilmer ........................... 350/160 LC |
| 4,015,115 | 3/1977 | Corcoran ................................ 250/199 |
| 4,017,163 | 4/1977 | Glass ...................................... 350/294 |
| 4,134,104 | 1/1979 | Karras ........................................ 345/6 |
| 4,136,926 | 1/1979 | Sigler ........................................ 350/55 |
| 4,170,401 | 10/1979 | Yoder, Jr. et al. ...................... 350/173 |
| 4,735,473 | 4/1988 | Migozzi et al. ......................... 350/3.7 |
| 4,836,658 | 6/1989 | Laycock ................................. 350/384 |
| 4,857,425 | 8/1989 | Phillips ...................................... 430/1 |
| 4,960,320 | 10/1990 | Taniura ................................... 359/629 |
| 5,016,950 | 5/1991 | Smith ..................................... 350/3.7 |
| 5,148,310 | 9/1992 | Batchko ................................. 359/479 |
| 5,200,845 | 4/1993 | Crooker et al. ......................... 349/175 |
| 5,330,264 | 7/1994 | Ando et al. .............................. 359/12 |

*Primary Examiner*—Cassandra Spyrou
*Assistant Examiner*—Darren E. Schuberg
*Attorney, Agent, or Firm*—Brown Raysman Millstein Felder & Steiner LLP

[57] ABSTRACT

A system and method generate volumetric, three-dimensional displays, including displays of images or data. An apparent position of a volumetric image is translated by employing an image translation chamber with various combinations of concave and convex reflectors, mirrors, lenses, and/or holographic optical elements. A high-speed opto-mechanical shutter may also be used, as well as acousto-optic modulators (AOMs) for very high-speed intensity modulation of a coherent light beam to generate a periodic pattern of light packets or pulses. Active and passive multi-planar optical elements (MOEs) are also used in either a reflective or a transmissive mode and optionally having interposed layers of switchable liquid crystal material. A multi-planar optical sensor with interposed layers of light-sensitive material may be employed, as well as a gas imaging chamber for displaying the three-dimensional images. The system and method also allow interaction with the volumetric display of an image. Encoding and transmission of non-image data in a volumetric form are performed, as well as the receiving and decoding of the non-image data from the volumetric form. The system and method also transmit large amounts of data and perform a convergence of at least two streams of radiant energy.

8 Claims, 40 Drawing Sheets

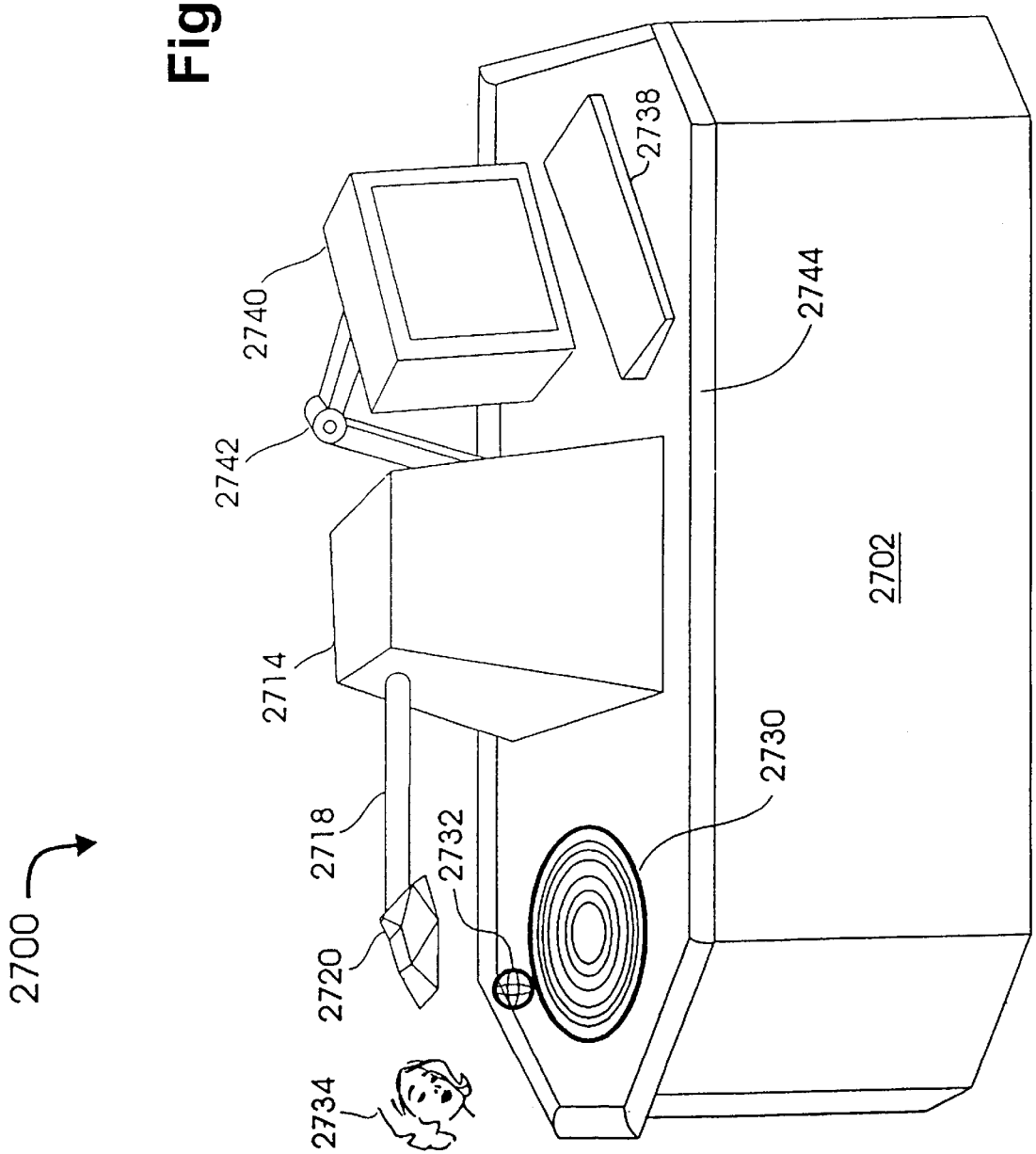

THREE-DIMENSIONAL DISPLAY TECHNIQUES, DEVICE, SYSTEMS AND METHOD OF PRESENTING DATA IN A VOLUMETRIC FORMAT

CROSS-REFERENCE TO RELATED U.S. PATENT APPLICATIONS

This application is a continuation-in-part of commonly-owned, U.S. patent application Ser. No. 08/152,861, filed Nov. 15, 1993 (now U.S. Pat. No. 5,572,375, issued Nov. 5, 1996), which is a continuation-in-part of commonly-owned U.S. patent application Ser. No. 07/840,316, filed Feb. 24, 1992 (now U.S. Pat. No. 5,311,335, issued May 10, 1994), which is a division of commonly-owned U.S. patent application Ser. No. 07/562,271, filed Aug. 3, 1990 (now U.S. Pat. No. 5,090,789, issued Feb. 25, 1992).

TECHNICAL FIELD OF THE INVENTION

The present invention relates to techniques (method and apparatus) for generating a three-dimensional "volumetric" image.

BACKGROUND OF THE INVENTION

Lasers emit coherent beams of electromagnetic energy, including a wide range of light wavelengths, among which are the visible (from red to violet) light wavelengths which can safely be viewed by a person without requiring that the person wear goggles.

The aforementioned, commonly-owned U.S. Pat. Nos. 5,090,789 and 5,311,335, incorporated by reference herein, describe a laser light show device and method. Laser light shows are typically use laser light sources to project brilliantly colored light patterns upon some reflective surface and, by changing the patterns, an appearance of an image having three-dimensionality is created. In the aforementioned patents, it is taught that the coherent nature of laser beams can advantageously be employed to form true (rather than apparent) three-dimensional images. Among the features discussed in these patents is that object image information signals can be supplied to the lasers by an object image information source which can contain virtually any type of image data. For example, the object image information signals can represent graphics data, such as that used in an engineering workstation, a video game or medical imaging applications.

The aforementioned commonly-owned, copending U.S. patent application Ser. No. 08/152,861, now U.S. Pat. No. 5,572,375, describes systems for generating and displaying true volumetric images. Generally, as described therein, a volumetric (three-dimensional) image is generated, then translated (spatially moved) by physical optical elements to a viewing position.

Most laser displays are merely two-dimensional projections on a two-dimensional surface. Some techniques, such as that described in U.S. Pat. No. 5,148,310, provide a depth component by rapidly spinning or oscillating the two dimensional surface. These techniques, however suffer from point-addressability, viewability, mechanical stability and interactionability problems and shortcomings.

It has long been known in the art that an autostereoscopic, three-dimensional volume display can be created by imposing a two-dimensional image on an imaging surface or display screen and the rapidly moving the imaging surface along a third axis. In the method of imaging known as direct volume display devices (DVDDs), the display screen is oriented so as to cause the image on the screen to sweep through the desired volume of space. One such system is described in U.S. Pat. No, 3,140,415 ("Ketchpel") which utilizes a phosphorescent rotating screen being illuminated by fixed electron gun means. Serious drawbacks to such a system, related to the lag time of the phosphors have been discussed in detail in U.S. Pat. No. 4,799,103 ("Muckerheide"). Additional drawbacks to such a system arise from the requirement of enclosing the screen and electron gun means in a vacuum. Muckerheide also discusses the evolution of the art towards incorporating lasers as image generation sources. Currently, such use of lasers is widely practiced and is generally preferred.

In general, all of these attempts at generating three-dimensional images utilize two-dimensional image projection techniques with mechanical scanning to produce the illusion of a third dimension. Because of present scanning methods and their limited scanning speed, image complexity must be limited to avoid excessive flicker. With these techniques, the use of phosphorescent screens to improve persistence of the image merely causes the image to smear in space. Moreover, the mechanical nature of these display devices creates stability problems as well as update rate limitations.

U.S. Pat. No. 5,148.310 ("BATCHKO"), incorporated by reference herein, describes a rotating, flat screen, fully addressable volume display system, which incorporates a rotating flat screen upon which is projected a two-dimensional scanned image. The image is changed as the screen is rotated, the rotation of the screen adding a third dimension to the sequence of two-dimensional images projected thereon. When the screen is rotated at sufficient speed, the phenomenon of visual persistence (in the viewer's eye) gives the sequence of two-dimensional images the appearance of a three-dimensional image in a full cylindrical volume of space. A system of reflectors, rotating in unison with the screen, is positioned between the screen and the two-dimensional image generator to allow the two-dimensional image to strike the surface of the rotating screen at a constant angle throughout the screen's rotation. The display is capable of being presented in color and is updatable in real time.

In BATCHKO, the size of the image created by the apparatus is limited to the diameter of the cylinder within which the screen rotates, and the position of the image is limited to the location of the cylinder (i.e., the image will appear to be in the cylinder). If the cylinder is small (e.g., having a diameter up to approximately one foot or one-third meter), permitting a commensurately small image to be displayed, the device would be portable and suitable, for example, for use as an output device for a personal computer. If the cylinder is large (e.g., having a diameter of several feet or meters), permitting a commensurately large image to be displayed, the device would not be portable. In either case, the cylinder represents a mechanical, moving part of the system which is subject to the vagaries of all systems having moving parts. Another limitation of the device described in the BATCHKO patent is that the user (viewer) is unable to interact with the image since the image is enclosed (in a cylinder) and generated on a rotating screen. As will be evident, the present invention overcomes these limitations inherent in a system such as BATCHKO's.

A well known technique for generating three-dimensional images, without involving scanning mechanisms, is known as "holography". In holography, an actual physical object is illuminated with a beam of laser (coherent) light. A reflected beam reflecting off of the object and a reference beam which has not reflected off of the object are combined to interfere with one another. An image of the interference pattern caused by combining the reflected beam with the reference beam is recorded on film. To project the image, a laser beam is split into two components, one of which passes through or reflects off of the film, the other of which does not. In this manner, an image of the object is re-created. From this 'generic' description of holography, it is evident that a hologram requires the pre-existence of a physical object in order to record and project its image.

The present invention, as well as the inventions referenced in the aforementioned commonly-owned patents relate to techniques for projecting (displaying) a three-dimensional image of a virtual (non-physical) object, or a sequence of such images, such as has been created by a computer. Evidently, according to the present invention, it is not required (as is the case with holography) to first take a picture of a physical three-dimensional object in order to project an image of a three-dimensional object. As used herein, the image created by the present invention is projected in a "volumetric" format which is distinguishable from an image projected in a holographic format. As used herein, the term "volumetric" and three-dimensional are essentially synonymous.

An area of particular interest is the area of three-dimensional, volumetric displays, particularly computer-generated displays. The have been many problems associated with laser illuminated volumetric imaging. These problems include high "flicker" due to slow scanning speed and modulation. The advent of acousto-optic modulators (AOMs) and deformable mirror display devices (DMDDs) has dramatically improved modulation speeds, but most techniques remain clumsy and slow.

SUMMARY OF THE INVENTION

It is therefore an object of the present invention to provide a technique for projecting a three-dimensional image of a virtual (non-physical) object, such as has been created by a computer.

It is another object of the invention to provide light manipulating devices, namely display forming devices, volumetric three-dimensional image display forming and projection devices, laser light apparatus, light processors and projectors, systems and components thereof, for use to generate, manipulate and display three-dimensional spatial images of objects or data in the following markets and for the following applications: science, entertainment, virtual reality, computer-aided design, computer-aided manufacturing, computer-aided engineering, aerospace simulation, air traffic control, and optical computing.

It is another object of the invention to provide method and apparatus for generating volumetric displays, wherein said display is of a virtual object which can be viewed as an image by a viewer, or wherein said display contains data encoded in a volumetric packet of light which may be decoded by a sensor.

In producing three-dimensional images, it is generally preferable to hide image generation apparatus from the viewer to enhance the visual effect. Light from stray sources (e.g., lasers), extraneous reflections, and the sight of bulky equipment can be quite distracting to a viewer.

It is a further object of the invention that three-dimensional volumetric images may be projected in a manner that hides the image-generation apparatus from the user.

It is a further object of the present invention to provide a technique for producing a virtual image which appears to hover in space and which is physically removed from any delicate or dangerous image generation apparatus.

It is a further object of the present invention to provide a technique for displacing the apparent position of a three-dimensional image which minimizes the "bulk" of the image translation apparatus.

It is a further object of the present invention to provide novel techniques for generating, scanning and forming three-dimensional images in a volumetric format by manipulating coherent radiation (such as, but not limited to, laser light).

As used herein, the display (e.g., image) created by the present invention is projected in a "volumetric" format which is distinguishable from an image projected in a holographic format.

Generally according to the invention, three-dimensional ("volumetric") displays are generated, translated (transported) and projected in a variety of manners. An input image, which may be a complete three-dimensional (volumetric) image, or an inchoate (partially formed, e.g., two-dimensional) image, is formed at one location (position) and is translated (moved, displaced), and optionally modified or enhanced (e.g., to add a third dimension to a two-dimensional input image, or to add a virtual fourth dimension to a three-dimensional input image) during the translation, to another location (position) whereat the (output) image can be viewed by a viewer (or "decoded" by a sensor) over a wide range of viewing angles. Generally, image translation occurs in an image-translation chamber which may be formed of physical optical elements such as reflectors, lenses and/or mirrors, or which may be formed as a holographic optical element (HOE) performing the function of the aforementioned reflectors, lenses and/or mirrors. Methods for fabricating and using a variety of HOE's is described herein, including fabricating and using a linear HOE (LHOE) and a radial HOE (RHOE). The volumetric display systems described herein allow for a wide range of viewing angles, in a range of embodiments ranging from desktop displays to room-size displays. The image translation chamber of the various embodiments described herein can also be considered to be an image "transport" chamber, in that the chamber transports an image from one position to another position.

As used herein, the term "volumetric" and three-dimensional are essentially synonymous. The output image, as perceived by the viewer is, and appears to be, a true three-dimensional image suspended in space.

In certain embodiments, an input image (such as an "x,y" scanned image) may be augmented (modified) with additional (e.g., z-axis) dimensionality by a multi-planar optical element (MOE) incorporated into the image-translation chamber.

There follows brief summaries of the aforementioned commonly-owned U.S. Pat. No. 5,090,789 and U.S. patent application Ser. No. 08/152,861. The summaries are presented individually, and are intended merely to be helpful to the reader, and should not be interpreted as restricting each case to particular teachings and/or embodiments.

Summary of U.S. Pat. No. 5,090,789

As described in the aforementioned, commonly-owned U.S. Pat. No. 5,090,789, the apparent position of a three-dimensional volumetric image can be "translated" or moved away from the image generation apparatus, seemingly suspending the image in space. This is accomplished by employing an image translation chamber comprising two concave reflectors. Inner surfaces of the concave reflectors are provided with a highly reflective "mirror" finish. The two reflectors are arranged such that their concave inner surfaces face one another, one above the other. Preferably the concave shape of the inner surfaces is either parabolic or a spherical approximation to a parabolic shape. Each reflector has a centrally located opening or aperture, permitting an observer to look into the opening in the upper reflector. The opening in the lower reflector is positioned over three-dimensional image generation apparatus which creates a three-dimensional image at or above the opening in the lower reflector. To the viewers eye, the apparent position of the image is moved to a position at or above the opening in the upper reflector. This translation of the "real" three-dimensional image is caused by internal reflections between the concave reflectors.

The volumetric display system disclosed in the aforementioned, commonly-owned U.S. Pat. No. 5,090,789 advantageously utilizes the coherent light generating capability of lasers to produce and to project images having enhanced three-dimensionality. The volumetric image may be projected onto a background having up to three types of background images. One type of background image is the projection of a reference beam created by reflecting a laser light beam off a rotating wobbler plate and diffracting the wobbled light beam through a spherical crystal lens. A second type of background image is generated by diffracting a laser light beam through a slowly rotating cylindrical amorphic dipolyhedral lens. A third type of background image is generated by diffracting a laser light beam through two diffraction gratings, wherein one diffraction grating is moving relative to the other.

Certain embodiments of the invention utilize a laser light beam shutter to effectively turn on and off, e.g. modulate, the laser light beam. The shutter includes a substantially opaque rod mounted and driven to rotate about its longitudinal axis. The rod has one or more holes (such as circular, square, or diamond-shaped in cross-section) extending through the rod, perpendicular to its longitudinal axis. As the rod spins, the hole(s) becomes alternately concentric (aligned) and non-concentric (not aligned) with the laser light beam, thereby allowing the laser light beam to pass freely through the shutter mechanism or become blocked by the shutter mechanism.

In an embodiment described in the aforementioned, commonly-owned U.S. Pat. No. 5,090,789, multiple laser light beams are modulated by object image information and are projected equi-angularly onto a substantially hemi-spherical body having a white, matte-finish surface. The spherical body acts as a screen to "reveal" the image. The spherical body is centrally located within an image translation chamber formed by two opposing parabolic (or hemispherical) reflectors. The image revealed on the spherical body is translated (by reflections occurring within the image translation chamber) and is thereby translated (moved) out of an aperture in the chamber. The translated, virtual-real, image converges just beyond the aperture. In this manner, the volumetric image is, and appears to be, suspended in space.

Summary of U.S. patent application Ser. No. 08/152,861

The aforementioned, commonly-owned, copending U.S. patent application Ser. No. 08/152,861, now U.S. Pat. No. 5,572,375, describes:

using a double parabolic reflector image translation chamber in conjunction with any method of generating a volumetric image at or above the opening in the lower reflector to produce a corresponding perceived "virtual" image at or above the opening in the upper reflector;

techniques of providing a volumetric image to an image-translation chamber, such as by disposing the BATCHKO device within an image-translation chamber utilizing two opposing parabolic reflectors;

providing a reduced portion or "sector" of the double parabolic reflector image translation chamber to facilitate image translation for a restricted range of viewing angles. Evidently, in viewing a "virtual" image from one viewpoint, the viewer only makes use of a small portion of the reflector surfaces;

rotating a "sector" image translation chamber to accommodate a wide range of viewing angles by positioning the "sector" image translation chamber to follow a single observer's viewing position;

rapidly spinning a "sector" image translation chamber to accommodate a large number of observers and viewing angles simultaneously. Image persistence in the viewer's eye creates image cohesion.

using non-parabolic reflectors, and employing centrifugal forces generated by rotating a "sector" image translation chamber can be used to deform (bend) the non-parabolic shaped concave reflector into a parabolic shape. This is accomplished by providing a flexible coupling between upper and lower reflectors of a "sector" image translation chamber. If the upper and lower reflectors are sufficiently flexible, then the centrifugal force generated by spinning them causes them to spread outward and assume a broader shape. Assuming that the initial shape of the reflectors is taller and narrower than the desired parabolic shape, then the spreading action caused by spinning will cause them to closer approximate the desired parabolic shape;

stacking (one atop the other) two or more image translation chambers to provide double translation of a three-dimensional image over a greater distance than can be achieved by a single image-translation chamber;

providing a high-speed opto-mechanical shutter is formed as a plurality of co-planar holes extending diametrically through a cylindrical rod. Aligning the rod with a light beam path and rotating the rod causes holes in the rod to line up with the light beam permitting transmission thereof, or to block the light beam, effectively cutting it off;

providing the shutter rod with a dark or matte finish (e.g., by anodizing an aluminum rod) to prevent unwanted reflections;

performing very high-speed intensity modulation of a coherent (laser) light beam with AOM's (acousto-optic modulator devices), Q-switches, self mode-locked lasers, or the like. This modulation can be accomplished in a manner which generates a periodic pattern of light "packets" or pulses. Subsequent image generation apparatus which is "tuned" to the period of the pattern of light pulses can be used in a reflected mode to permit depth addressing.

interposing an "active" multi-planar optical element (MOE, or MPOE) in the path of the beam or inchoate volumetric image, said active MOE comprising a series of parallel transparent (preferably glass) plates, separated from one another by monolithic liquid crystal layers, and using the active MOE in either a reflective (scanning) mode or in an opaque (image-forming) mode. Each liquid crystal layer is provided with a pair of transparent electrodes for the purpose of "activating" the liquid crystal material. By controlling the "state" of selected liquid crystal layers, the layers can be switched between a transparent, light-transmissive state and a reflective state.

In the reflective mode, the active MOE is used by directing a collimated light beam into the MOE at an oblique angle. The beam passes substantially unaffected through any layers in the transparent state and is reflected by the first layer it encounters in the reflective state. Anti-reflective coatings can be used on the transparent layers to prevent unwanted reflections. Because of the oblique angle of incidence, the position of the reflected beam depends upon which liquid crystal layer reflects it. By "scanning" the liquid crystal layers, the various reflected beam positions are correspondingly scanned, providing a completely solid-state, scanning mechanism. Any number of layers can be provided. Unlike beam-deflection techniques (e.g., galvo-scanning and acousto-optic beam deflectors (AOBD's)) the reflected scanning beams from the active MOE are parallel (or converging in conical paths).

In the opaque or "imaging" mode, a liquid crystal layer is controlled (via the electrodes) into an opaque state. Wherever an incident light beam strikes the opaque layer, a spot of light is formed. By performing a two-dimensional scan of a light beam over the opaque layer, the layer acts as a "screen" and a viewable two-dimensional image is formed on the opaque layer. By repeating this process for each of the liquid crystal layers in turn, a depth component is added, providing a viewable three-dimensional image inside the active multi-planar optical element.

interposing a "passive" multi-planar optical element (MOE; or MPOE) in the path of the beam or inchoate volumetric image, said MOE comprising a series of parallel transparent (preferably glass) plates, separated from one another by spacers, each plate (layer) having two parallel planar surfaces. Constant spacing between the transparent layers is maintained by spacers (preferably transparent) disposed between the layers at the edges of the layers. Like the active multi-planar optical element, the passive multi-planar optical element modes of use include a "reflective" mode and an "image-forming" mode.

In the "reflective" mode, an incident beam of light is directed into the passive MOE at an angle. Each surface of each transparent layer acts as a reflecting surface, since at each surface there is a change of refractive coefficient (e.g., glass to air). As the beam penetrates the transparent layers, a portion of the light energy in the beam is reflected off of each surface, forming a plurality of parallel reflected beams. If a rapidly modulated light source is used, then the reflected beams differ from one another in time. The first reflected beams are advanced in modulation "phase" relative to later modulated beams. This "phase" relationship can be used to advantage in computing applications.

In the "image forming" mode of usage, the passive MOE is employed to form a plurality of visible image "dots". A perpendicular incident beam, or coherent image beam, passes through the layers of the transparent multi-planar optical element, forming a visible "dot" at each change of refractive index (i.e., at each surface of each transparent layer where there is a gas to transparent medium (e.g., glass to air) transition. In conjunction with very high speed modulation and reflective reinforcement, the intensity of individual dots can be controlled. In conjunction with further scanning, two-dimensional visible images can be formed on each of the surfaces of each of the transparent layers, thereby creating a visible three-dimensional image inside the multi-planar optical array which can be viewed by an observer. (The viewer will observe parallax when changing his/her viewing position.)

using a pair of passive (or active) MOE's in cascade (tandem) to produce a rectangular array of parallel light beams from a single incident beam (generally, correcting optics will also be used);

producing volumetric images visible to a viewer in a gas imaging chamber (in a gaseous medium). The gas imaging chamber is described as being formed inside a transparent outer shell. The shell is filled with an imaging gas (preferably an inert gas, e.g., helium, neon, argon, xenon, etc.). Two parallel front-surface mirror finishes are provided on opposite inside surfaces of the chamber. One of the mirror finishes is of the partially transmissive type, permitting a light beam to enter the imaging chamber therethrough. The distance between the two mirror finishes is one half the distance traveled by a beam of light in the imaging gas over a time interval "T" corresponds to a repetition interval over which high-speed modulation provides a repeating sequence of light "packets" or pulses. The modulated beam enters the chamber at an angle perpendicular to the partially transmissive mirror finish. The beam passes through the gaseous medium and is reflected back and forth between the two reflectors. The reflections occur back and forth along the same path. Since the beam reflection path within the chamber is out of phase with the incident beam (e.g., exactly one half of the pulse waveform period "T"), subsequent pulse periods on the incident beam will reinforce one another. The pulses travel through the gaseous medium at the speed of light, but depending upon pulse (packet) spacing, will periodically encounter ("collide" with) and reinforce a reflected pulse on a returning (reflected) beam, and if sufficient light energy is transferred to the gas molecules, they will emit photons of visible light at the point of reinforcement. The gaseous medium can be "biased" with an energy source (in a manner similar to that used in "pumped" lasers), to reduce the amount of pulse (or packet) energy required to cause photon emission in the gaseous medium. A lasing gas or lasing crystal can be employed in lieu of the gas contained in a transparent cylinder.

The modulated beam need not be of a visible light wavelength, since it is only necessary that secondary emissions from the imaging gas provide visible light. Accordingly, the "mirrored" surfaces can be frequency selective, reflecting only the wavelength of the incident beam and transmitting all other wavelengths of light, or vice-versa.

By providing a two-dimensional parallel-ray scanning beam, modulated (e.g., by AOM's) to produce an image at a specific depth in the image chamber, a two dimensional visible image is formed at the selected depth. By repeating the process rapidly for a plurality of different depths within the chamber, a viewable three-dimensional image is formed.

Since the three-dimensional images are generally produced in pairs, only one of the images is likely to be used. It is possible to "hide" the redundant image either by blocking that portion of the imaging chamber, or by applying bias (voltage) potential to the imaging gas only in the vicinity of the desired image.

SUMMARY OF THE PRESENT INVENTION

The present invention describes various embodiments of forming image-translation chambers for use in volumetric display systems, including, but not limited to:

disposing a convex (e.g., parabolic) reflector atop a frontal surface mirror, said reflector having an input aperture for receiving an input image and an output aperture through which the translated output image is formed;

disposing two (preferably substantially radial) lens segments disposed atop a frontal surface mirror, directing an input image through a one of the segments and causing a translated output image to be formed outside of an other of the segments;

disposing a plano-convex lens atop a frontal surface mirror, said lens having an input region for receiving an input image and an output region through which the translated output image is formed;

disposing the plano-convex lens atop a multi-planar optical element (MOE), and using the MOE to provide z-axis (depth) modulation of the input image being translated;

fabricating a holographic optical element (HOE) by exposing film to laser light passing through a plano-convex lens disposed atop a frontal surface mirror, wherein said HOE performs image-translation in lieu of the aforementioned reflectors, lenses and/or mirrors;

fabricating a "linear" HOE (LHOE) by exposing the film at a plurality of x-axis and y-axis positions of the plano-convex lens and frontal surface mirror;

fabricating a "radial" HOE (RHOE) by exposing the film at a plurality of x- or y-axis and rotational positions of the plano-convex lens and frontal surface mirror;

using the HOE (preferably a RHOE) in a volumetric display system in either a transmissive mode (by passing laser light through the HOE from underneath the HOE) or a reflective mode (by directing light at the HOE from above the HOE, wherein the HOE is disposed on an opaque or a reflective surface);

interacting with a volumetric display, and using the interaction with the display to provide the user with a gradient of tactile feedback; and using the volumetric display technology in additional (non-visual) manners, such as for bundling (encoding), transmitting and receiving (decoding) large amounts of data.

These and other objects, features and advantages of the present invention will be readily understood upon consideration of the following detailed description of the invention and the accompanying drawings. Other objects, features and advantages of the invention will become apparent in light of the following description thereof.

BRIEF DESCRIPTION OF THE DRAWINGS

Throughout the figures similar elements are generally indicated by like numerals.

FIG. 27A is a perspective of the exterior surfaces of one embodiment of a volumetric display apparatus, according to the present invention.

DETAILED DESCRIPTION OF THE INVENTION

Laser Light Show Device and Method

The aforementioned commonly-owned U.S. Pat. Nos. 5,090,789 and 5,311,335 describe a laser light show device and method, and a method for generating holographic images, as set forth in the description of FIGS. 1A through 6 as set forth herein. As noted above, and in the context of the present invention, the images are more accurately referred to as "volumetric", rather than "holographic".

Figure 1A:
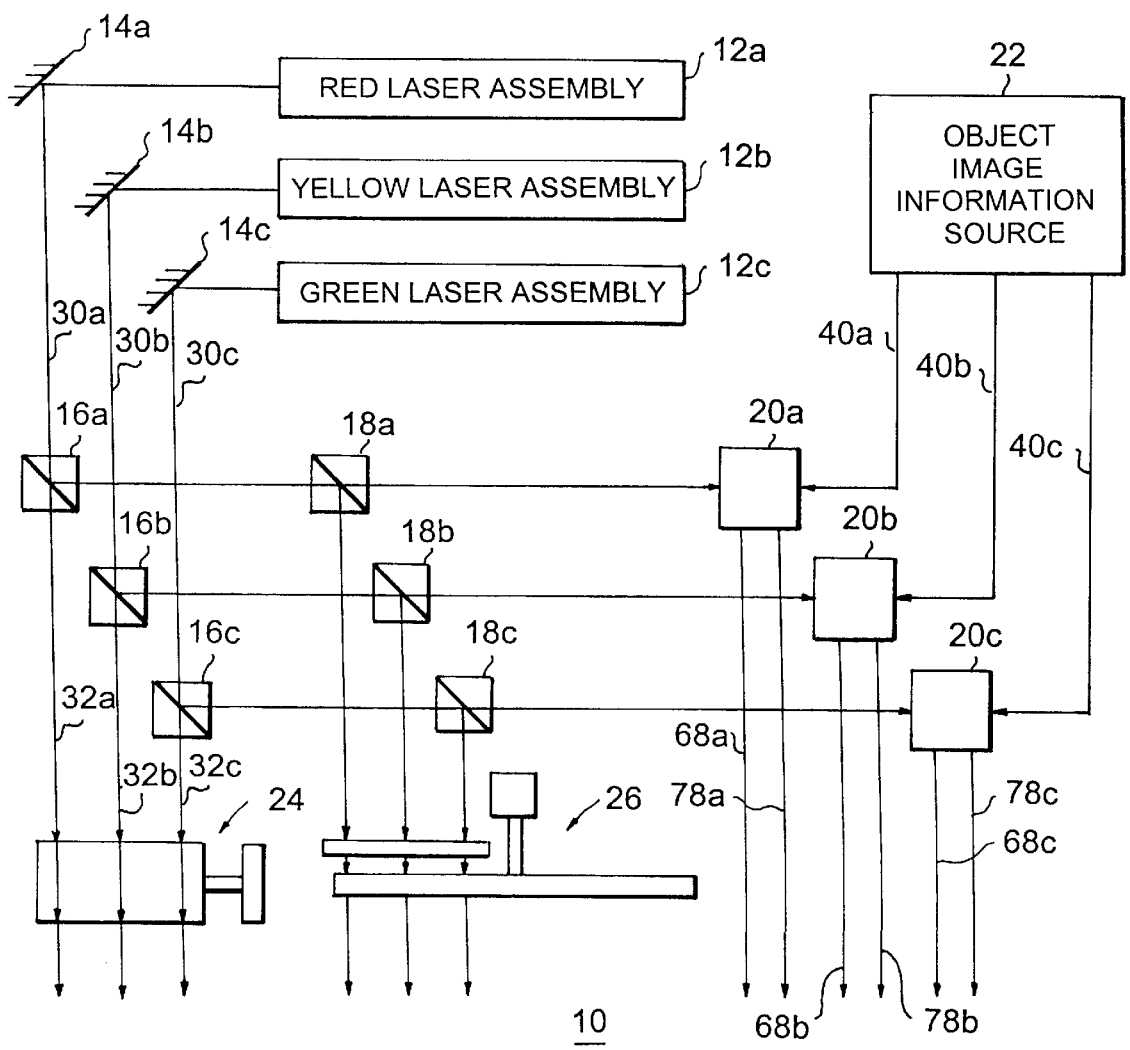
FIG. 1A is a block diagram of a laser light show device in accordance with the present invention.

FIG. 1A illustrates a laser light show device 10 including the following elements, coupled as shown: multiple colored laser assemblies 12a–12c; dielectric mirrors 14a–14c; multiple beam splitters 16a–16c, 18a–18c; multiple reference and object beam generator assemblies 20a–20c; an object information source 22; an amorphic dipolyhedral lens assembly 24; and a diffraction gratings assembly 26.

Three laser light assemblies 12a–12c, preferably having red, yellow and green laser light sources, are used in a preferred embodiment of the invention. However, it will be appreciated that any number of colors of laser light sources can be used in accordance with the invention as described below.

Each laser assembly 12a–12C emits an incident laser beam 28a–28c which is reflected off a dielectric mirror 14a–14c. The reflected laser beams 30a–30c pass through the first set of beam splitters 16a–16c, producing secondary incident laser beams 32a–32c and secondary reflected laser beams 34a–34c. As described more fully below, the secondary incident laser beams 32a–32c are diffracted through the amorphic dipolyhedral lens assembly 24 prior to projection.

The secondary reflected laser beams 34a–34c are passed through the second set of beam splitters 18a–18c, producing tertiary incident laser beams 36a–36c and tertiary reflected laser beams 38a–38c. As described more fully below, the tertiary reflected laser beams 38a–38c are passed through the diffraction gratings assembly 26 prior to projection.

The beam splitters 16a–16c, 18a–18c can be selected according to subjective desires regarding the relative beam intensities of the resulting laser beams 32a–32c, 34a–34c, 36a–36c, 38a–38c. For example, the first beam splitters 16a–16c can be selected to allow approximately 30% of the intensities of the reflected laser beams 30a–30c to pass through as the secondary incident laser beams 32a–32c, with the remaining intensities reflecting as the secondary reflected laser beams 34a–34c.

The tertiary incident laser beams 36a–36c are coupled into the reference and object beam generators 20a–20c for processing prior to projection of the reference 78a–78c and object 68a–68c beams. As explained more fully below, object image information signals 40a–40c from the object image information source 22 are also coupled into the reference and object beam generators 20a–20c for use in processing the tertiary incident laser beams 36a–36c prior to projection of the reference 78a–78c and object 68a–68c beams.

The object image information signals 40a–40c, supplied by the object image information source 22, can contain virtually any type of image data. For example, the object image information signals 40a–40c can represent graphics data, such as that used in an engineering workstation, a video game or medical imaging applications.

The dielectric mirrors 14a–14c are staggered horizontally so that the incident laser beams 28a–28c produce reflected laser beams 30a–30c which are similarly horizontally staggered. By appropriately staggering the dielectric mirrors 14a–14c horizontally, the reflected laser beams 30a–30c can be proximally located adjacent to one another at distances on the order of several millimeters. Thus, the horizontal spacing of the reflected laser beams 30a–30c can be substantially less than the horizontal spacing of the incident laser beams 28a–28c, which is dictated by the physical dimensions of the laser assemblies 12a–12c (typically on the order of several inches).

Figure 1B:
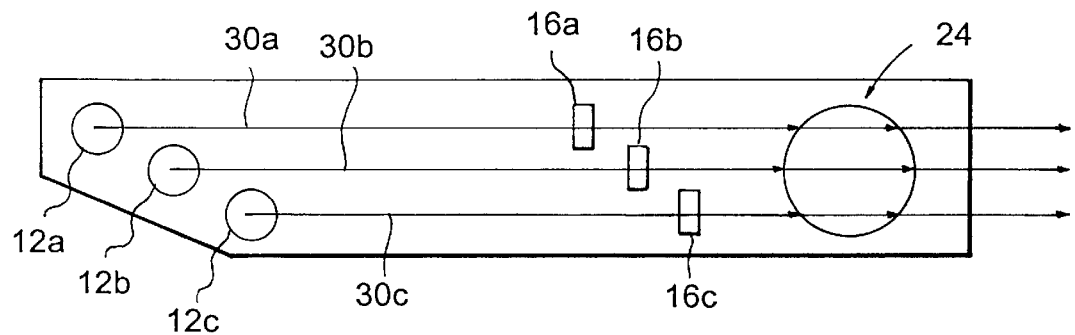
FIG. 1B is a side view of the invention illustrating the mechanical mounting of the laser assemblies.

As shown in FIG. 1B, the laser assemblies 12a–12c can be mounted along an inclined plane 42. By mounting the laser assemblies 12a–12c in this fashion, the vertical spacing of the reflected laser beams 30a–30c can also be established to be on the order of several millimeters. Just as with the horizontal spacing constraints imposed by the physical sizes of the laser assemblies 12a–12c, the vertical spacing would otherwise be substantially greater.

Therefore, by appropriately staggering the dielectric mirrors 14a–14c horizontally, and mounting the laser assemblies 12a–12c along a properly inclined plane 42, the reflected laser beams 30a–30c can be proximally located adjacent one another as desired.

Figure 2:
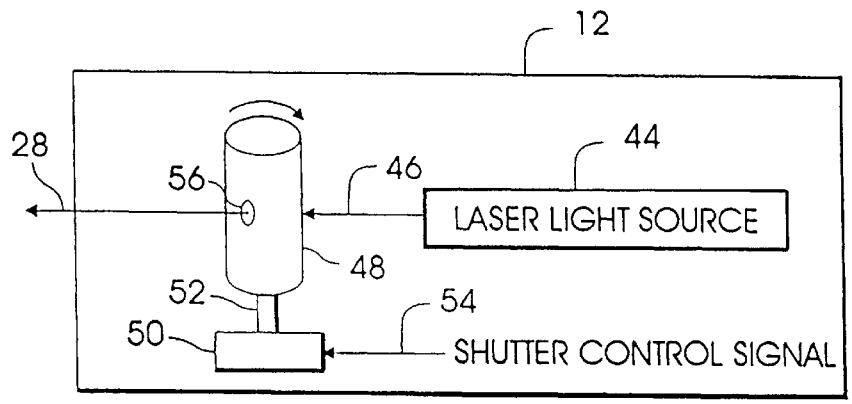
FIG. 2 illustrates a laser light shutter assembly in accordance with the present invention.

Referring to FIG. 2, each laser assembly 12 contains a laser light source 44, which produces an original laser beam 46, and a shutter 48, which is driven by a shutter motor 50 through a coupling shaft 52. As described further below, the shutter motor 50 is controlled by a shutter control signal 54. The original laser beam 46 produced by the laser light source 44 is modulated by the shutter 48 to produce the incident laser beam 28. This modulation is done by rotating the shutter 48. As the shutter 48 rotates, a hole 56 in the shutter, perpendicular to the axis of rotation, alternates between being aligned and non-aligned with the original laser beam 46. When the hole 56 is in alignment with the original laser beam 46, the incident laser beam 28 is produced. This means of modulating the original laser beam 46 produces an incident laser beam 28 which can be effectively turned on and off very quickly.

Figure 3A:
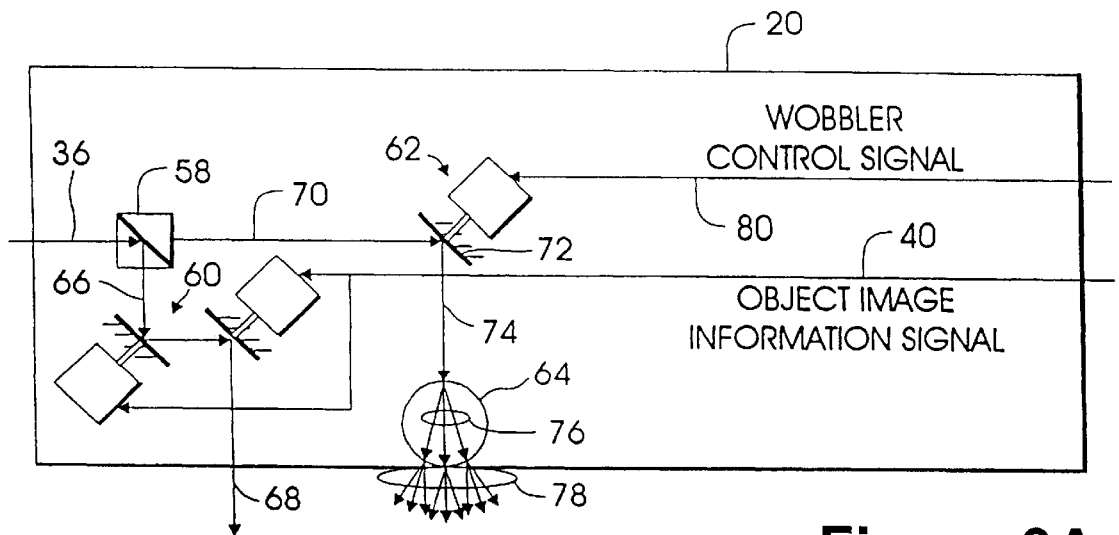
FIG. 3A is a block diagram of the invention's reference and object beam generator.

Referring to FIG. 3A, the reference and object beam generator assembly 20 consists of the following elements, coupled as shown: a beam splitter 58; an x-y scanner assembly 60; a wobbler plate assembly 62; and a substantially spherical lens 64.

The tertiary incident laser beam 36 enters the reference and object beam generator assembly 20 and passes through the beam splitter 58. The reflected beam 66 is reflected through the X-Y scanner assembly 60 to produce the object beam 68 for projection. The X-Y scanner assembly 60 is driven by the object image information signal 40, appropriately scanning, i.e. deflecting, the reflected beam 66 in the X- and Y- directions to produce the object beam 68 for projection.

The non-reflected beam 70 exiting the beam splitter 58 is reflected off a wobbler plate assembly 62. The dielectric mirror 72 of the wobbler plate assembly 62 rotates in a non-planar manner. The non-reflected beam 70 strikes the wobbling mirror 72 slightly off center, thereby striking a wobbling mirror surface. This produces a wobbling reflected beam 74 which spins conically about a central axis.

Figure 3B:
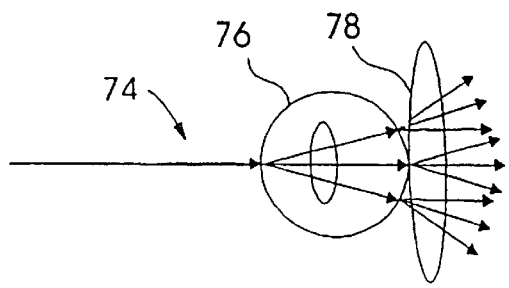
FIG. 3B illustrates the double hemispherical diffraction produced by a spherical lens in accordance with the present invention.

The wobbling beam 74 is passed through the substantially spherical lens 64 to produce a singly hemispherically diffracted beam 76 and then a doubly hemispherically diffracted beam 78. As shown in FIGS. 3A and 3B, the single and double diffraction patterns are hemispherical in the sense that the diffraction patterns extend in both the vertical and horizontal directions.

In a preferred embodiment, the substantially spherical lens 64 is constructed of substantially optically-pure quartz crystal. The latticed structure of the quartz crystal enhances the regularity and uniformity of the diffraction properties of the substantially spherical lens 64. This results in more uniform hemispherically diffracted beams 76, 78.

Both the object image beam 68 and reference image beam 78 are projected together. When so projected, the reference image beam 78 serves as a dim background providing a sensation of parallax, while the object image beam 68 provides the subject image. The overall holographic effect can be enhanced by selectively synchronizing the wobbler control signal 80 with the shutter control signal 54.

By selectively controlling the rotational speed of the wobbling dielectric mirror 72, relative to the rotational speed of the shutter 48, the relative wobbling circular motion of the wobbling beam 74, relative to the on-off modulation of the incident laser beam 28, and therefore the non-reflected beam 70, produces a reference image beam 78 having variable stasis. By varying the relative rotational speeds of the wobbling mirror 72 and shutter 48, the reference beam 78 can be selectively provided with negative stasis, wherein the reference beam pattern appears to rotate counterclockwise, or positive stasis, wherein the reference beam pattern tends to rotate clockwise. This produces an overall effect of making the projected object image appear to recede or approach the viewer.

Another X-Y scanner (not shown) can be used in line with the non-reflected beam 70. By "averaging" the object image information signal 40, the X-Y, i.e. planar, center of the object image can be represented. Such an "averaged" object image information signal can then be used to drive the X-Y scanner for the non-reflected beam 70. This would produce a wobbling beam 74, and therefore a reference beam 78, which projects a reference image which is substantially centered about the projected object image.

Figure 4A:
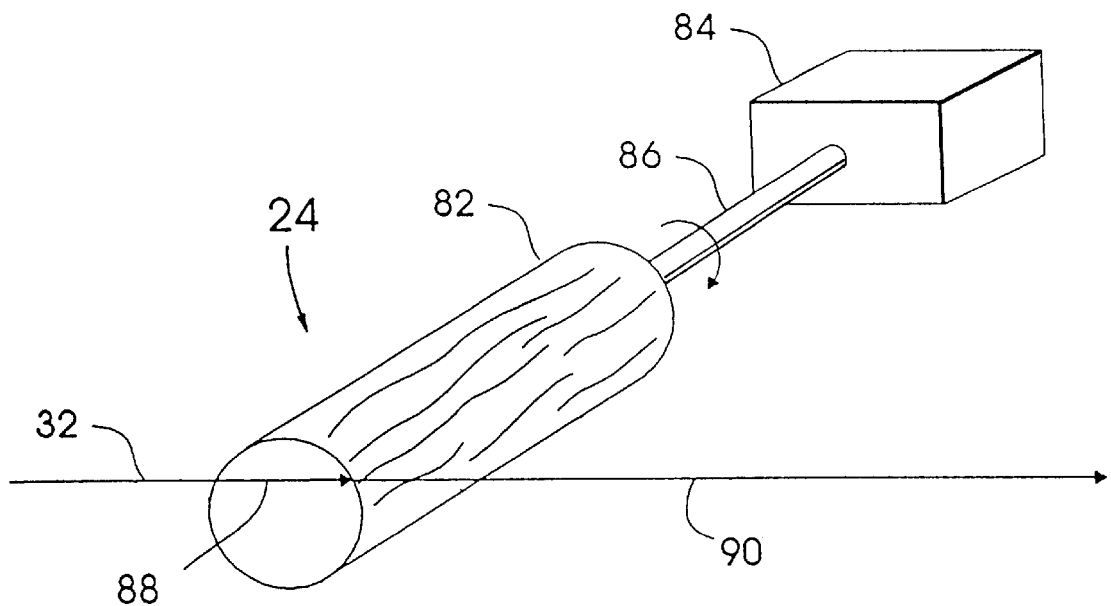
FIGS. 4A–4B illustrate the invention's amorphic dipolyhedral lens assembly.
Figure 4B:
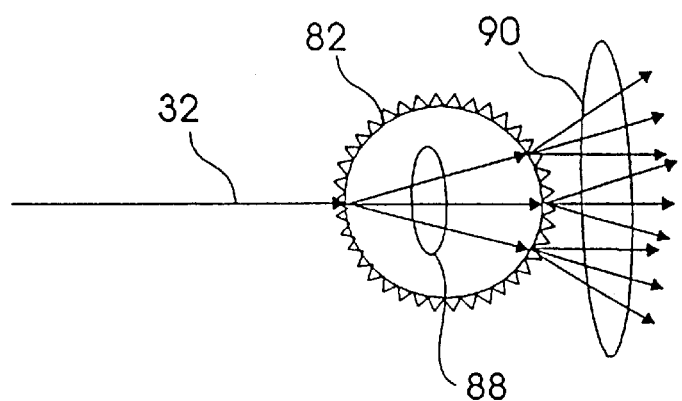
Figure 5:
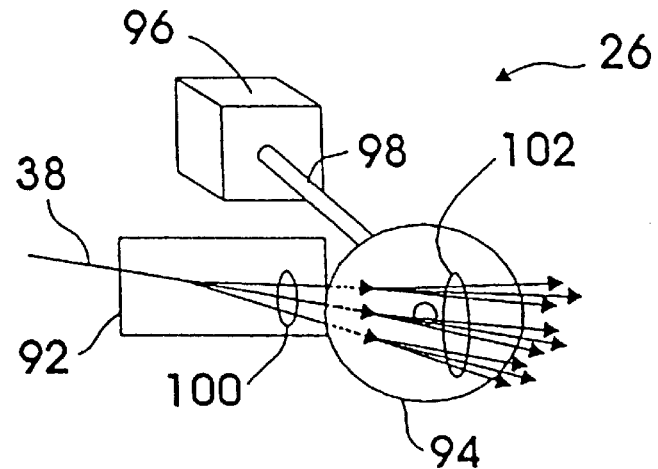
FIG. 5 illustrates the invention's diffraction gratings assembly.

Further projected background image information can be provided by using the amorphic dipolyhedral lens assembly 24, as shown in FIGS. 4A–4B. The lens assembly 24 consists of an amorphic dipolyhedral lens 82 rotated by a motor 84 via a shaft 86. The rotational speed of the lens 82 can be set at any speed subjectively deemed desirable, based upon the visual effect produced. The secondary incident laser beam 32 enters the lens 82, producing a singly vertically diffracted beam 88. The singly vertically diffracted beam 88, exits the lens 82, producing a doubly vertically diffracted beam 90. FIG. 4B illustrates this vertical diffraction in more detail. The amorphic dipolyhedral lens 82 is a hollow cylinder constructed of glass with irregular longitudinal protrusions, e.g. knurls, about its periphery. In a preferred embodiment, glass is preferred over crystal to take advantage of the non-latticed structure of glass. This non-latticed structure, in conjunction with the longitudinal outer surface irregularities, enhance the amorphic diffraction properties of the lens 82. An experimental version of the lens 82 was constructed from an empty Finlandia (TM) vodka bottle.

Still further background image information can be projected to further enhance the holographic effect of the laser light show device in accordance with the present invention. Such additional background image information can be provided with the diffraction gratings assembly 26. Referring to FIG. 5A, the tertiary reflected laser beam 38 first passes through a fixed diffraction grating 92. This produces a singly diffracted beam 100, which is passed through a rotating diffraction grating 94, producing a doubly diffracted beam 102. The rotating diffraction grating 94 is rotated by a motor 96 via a shaft 98.

In an alternative embodiment, the first diffraction grating 92 can also be rotated, either in a direction counter to that of the rotational direction of the first rotating diffraction grating 94, or in the same direction but at a different speed. This double diffraction of the laser beam 38 through multiple diffraction gratings moving relative to one another produces a background image beam 102 which imparts a further sensation of motion which enhances the holographic effect of the displayed object image.

Figure 6:
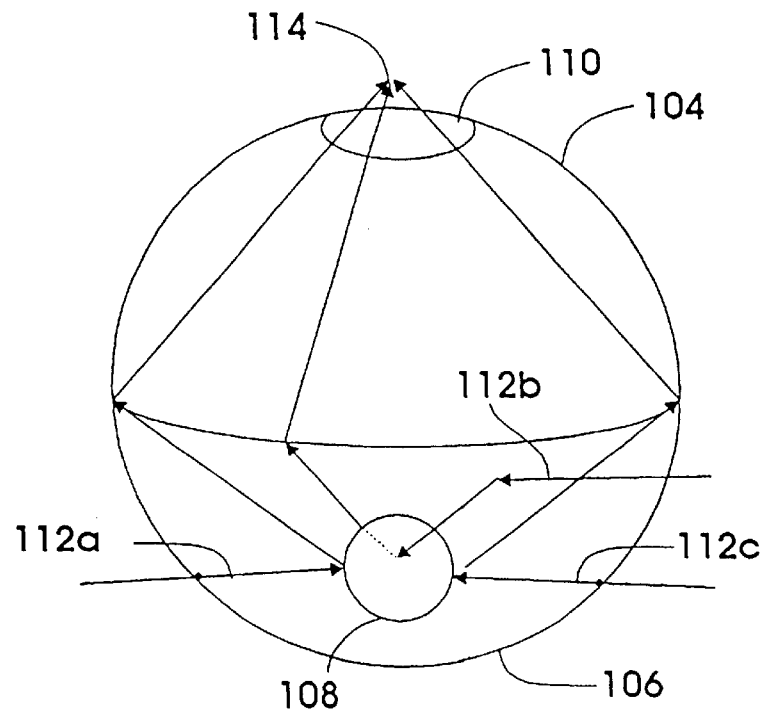
FIG. 6 illustrates the invention's holographic suspension projector.

As stated above, the background and object image information need not be projected onto a surface, but can be projected to produce a suspended, "virtual", real image. This can be accomplished by using a holographic suspension projector as shown in FIG. 6.

Top and bottom opposing concave reflective saucers 104, 106, preferably parabolic reflectors, are used. Centrally located within the bottom reflector 106, is a substantially spherical image reflector 108. The image reflector 108 should have a substantially white surface with a matte, i.e. not glossy, finish. For example, a white plastic material can be used, however, a flat white ceramic material will produce a better image.

Centrally disposed within the top reflector 104 is an aperture 110. Object image information modulated onto multiple laser beams 112a–112c is projected substantially equi-angularly about the equator of and onto the image reflector 108. The multiple images thereby produced on the image reflector 108 are reflected within the parabolic reflectors 104, 106 and converge at a point 114 just beyond the aperture 110. This converging image information produces a volumetric (virtual, real) image which appears to be suspended just above the aperture 110.

The object image information modulating each of the laser beams 112a–112c can be identical, thereby producing a suspended volumetric image which appears substantially identically regardless of the horizontal viewing perspective. Alternatively, the object image information modulating each of the laser beams 112a–112c can represent different views of the same subject, thereby producing a suspended volumetric image which appears to be three-dimensional as the horizontal viewing perspective changes.

FIGS. 7–18

FIGS. 1A–6 describe what may be considered to be a basic system for projecting three-dimensional volumetric images. In the description of FIGS. 7–18 that follows, certain improvements to the basic system are described, and have been discussed in the commonly-owned, copending U.S. patent application Ser. No. 08/152,861, filed Nov. 15, 1993.

In producing three-dimensional images, it is generally preferable to "hide the works" from the viewer. That is, the effect of a three dimensional image is significantly enhanced if the viewer cannot see the apparatus that creates it. In order to produce a three dimensional image, it may be necessary to employ bulky, obtrusive equipment. Light from stray sources (e.g., ambient room light), extraneous optical reflections, and the sight of the projection source can significantly detract from the impact of a three-dimensional image on a viewer. Further, there is often a temptation for viewers to attempt to "touch" or "handle" the image that they see. Certain types of image generation apparatus are either very delicate or very dangerous. In either case, it is imperative that the apparatus be rendered physically inaccessible by the viewer, while maintaining full viewability of the image.

It is possible, however, to "translate" or move a "volumetric" three-dimensional image away from the image generation apparatus, seemingly suspending the image in space. This is accomplished in a manner similar to that described with respect to FIG. 6. According to the invention, this can be accomplished by placing an "x,y,z" scanner in the bottom of the chamber.

Figure 7A:
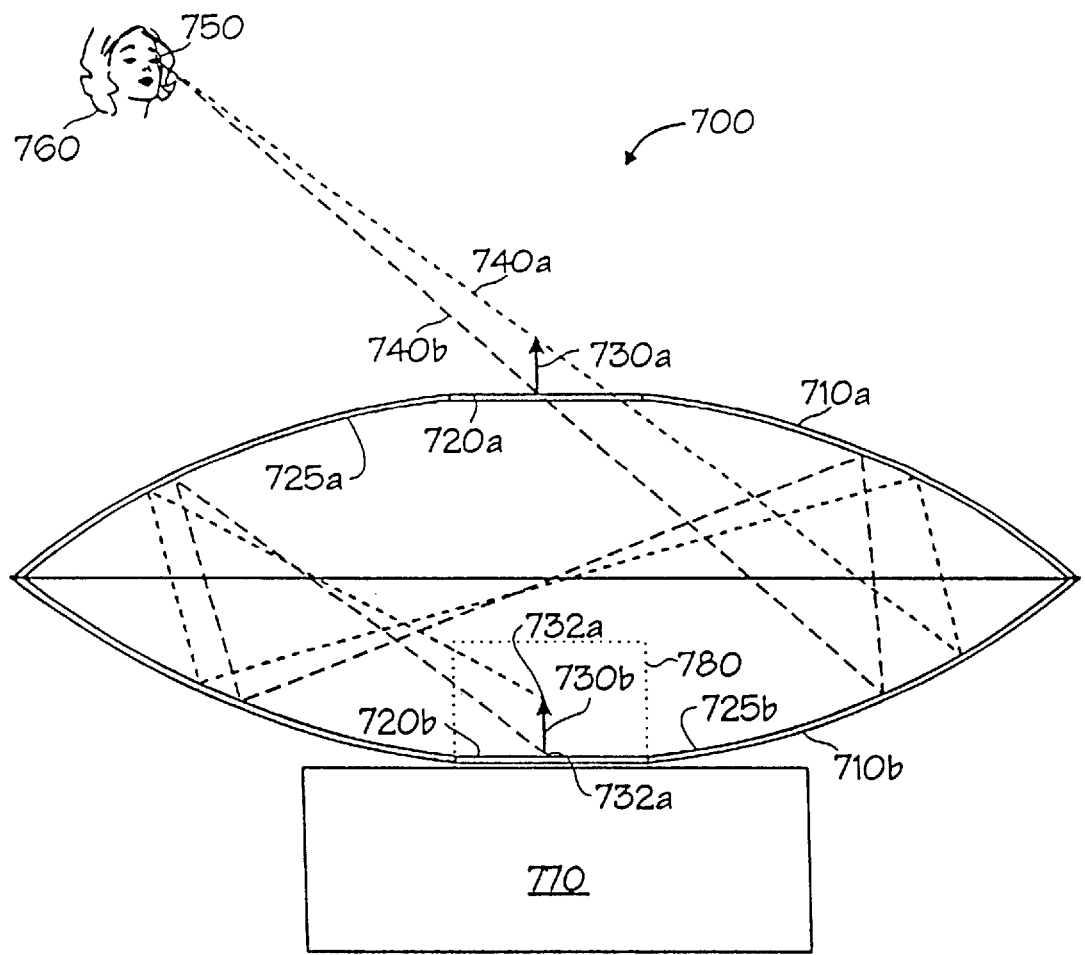
FIG. 7A is a cross-sectional view of apparatus for translating the apparent position of a generated three-dimensional image, according to the invention.

FIG. 7A is a cross-sectional view of a portion of a three dimensional display system 700 employing an image translation chamber (similar to the volumetric suspension projector shown in FIG. 6). The image translation chamber comprises two concave reflectors 710a and 710b. Inner surfaces 725a and 725b of the concave reflectors 710a and 710b, respectively, are provided with a highly reflective "mirror" finish. The two reflectors 710a and 710b are arranged such that their concave inner surfaces 720a and 720b, respectively, face one another. Preferably the concave shape of the inner surfaces 725a and 725b of the reflectors 710a and 710b, respectively, are either parabolic or spherical approximations to a parabolic shape. Each reflector 710a and 710b has a centrally located opening or aperture 720a and 720b, respectively. The reflector 710a is positioned above the reflector 710b, such that an observer 760 can look into the opening 720a in the upper reflector 710a. (The terms "upper" and "lower" refer to the apparatus as illustrated in the Figure. One of ordinary skill in the art will realize that the image translation chamber will operate in any orientation as long as the relative positions of the two reflectors 710a and 710b remain unaltered). The opening 720b in the lower reflector 710b is positioned over three-dimensional image generation apparatus 770, which creates a three-dimensional image 730b at or above the opening 720b in the lower reflector 720. To the viewers eye 750, the apparent position of the image 730b is shown generally as 730a, above the opening 720a in the upper reflector. This translation of the "real" three-dimensional image 730b is caused by internal reflections between the concave reflectors which cause the viewer 760 to perceive the "virtual" image 730a, as illustrated by trace lines 740a and 740b from the viewer's eye 750 to the top 732a and bottom 732b, respectively, of the three-dimensional image 730b. Dashed line 780 indicates a general image formation area for which a translated or moved three-dimensional image will appear above the opening 720a in the upper reflector 710a. (In fact, those portions of the "real" image 730b which extend below the opening 720b in the lower reflector 710b will appear in the "virtual" image 730a below the opening 720a in the upper reflector 710a. The viewability of an image below the openings, however, is somewhat restricted by the inability of certain reflection angles to "reach" portions of the image blocked by the edges of the openings 720a and 720b.)

It will readily be appreciated by one of ordinary skill in the art that any method of generating a "real" image (e.g. 730b) at or above the opening 720b in the lower reflector 710b will produce a corresponding perceived "virtual" image (e.g. 730a) at or above the opening 720a in the upper reflector 710a. One suitable image generation technique is described in U.S. Pat. No. 5,148,310, issued Sep. 15, 1992 to Batchko (hereinafter BATCHKO). Using the BATCHKO technique, the rotating flat screen may be positioned inside the opening 720b in the lower reflector 710b. Another suitable image generation technique is to use a holographic image or projection, such as a transmission hologram positioned such that the "real" image of the hologram appears inside the lower reflector 710b. Other suitable three-dimensional image generation techniques are described in greater detail hereinbelow.

Evidently, in viewing a "virtual" image (e.g., 730a) from one viewpoint, the viewer (760) only makes use of a small portion of the reflector surfaces. This presents the possibility that only a reduced portion or "sector" of an image translation chamber is required to view a three-dimensional virtual image from a single viewpoint. An image translation chamber "segment" suited to single or restricted viewpoint viewing of an image is described with respect to FIG. 7B.

Figure 7B:
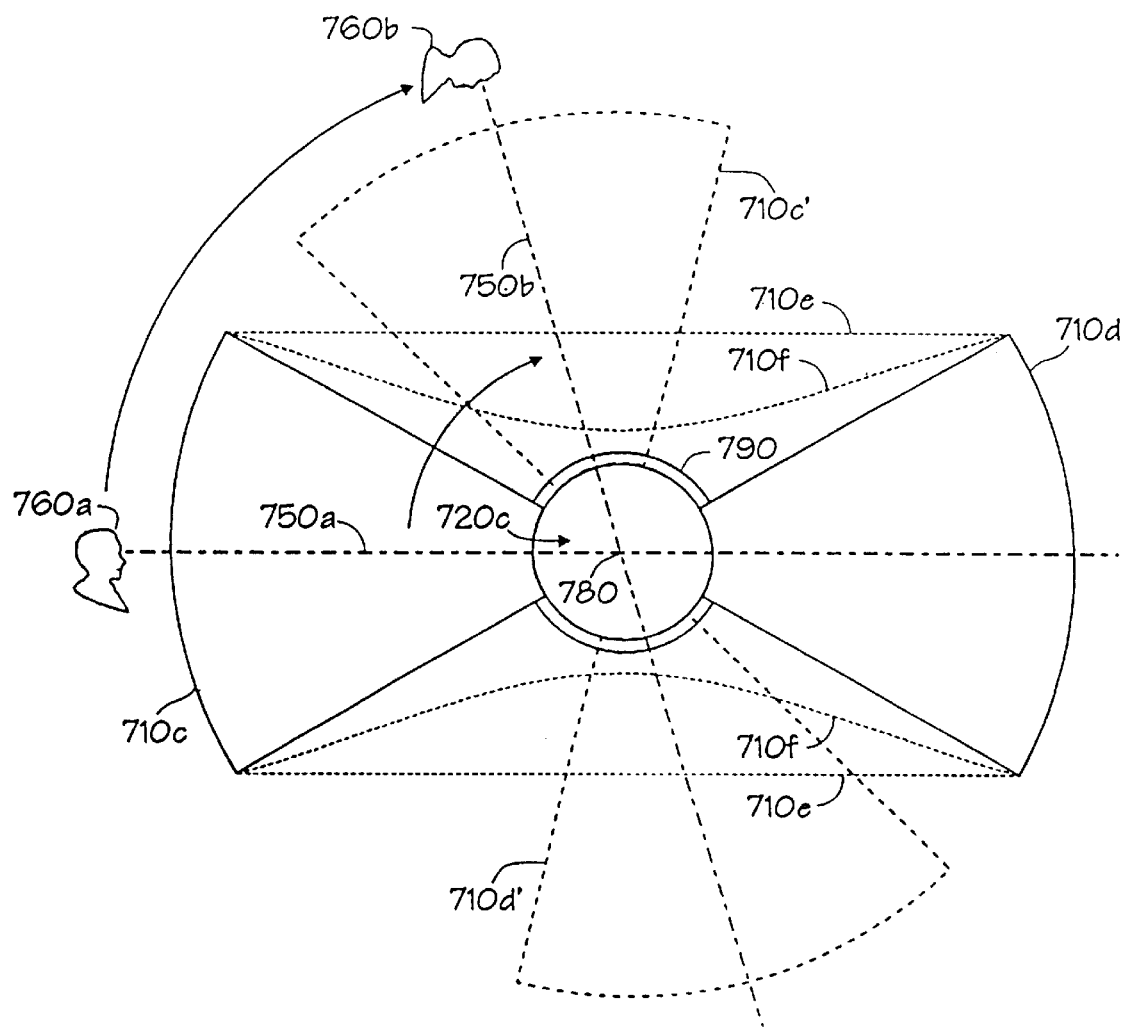
FIG. 7B is a top view of a "sector" image translation chamber, according to the invention.

FIG. 7B is a top view of an image translation chamber similar to that described with respect to FIG. 7a, but where only a portion of the reflectors is provided. A ring 790 defines the viewing opening 720c. Concave "sector" reflectors 710c and 710d are provided on opposite sides of the ring 790, centered about a viewing line 750a along which a viewer can view a "virtual" image at or above (and to some extent, below, as described above) the viewing opening 720c. The "sector" reflectors 710c and 710d are simply cutaway portions of complete concave reflectors (e.g., 710a and 710b, FIG. 7A), and each has an upward facing lower reflector portion and a downward facing upper reflector portion (not visible in top view). The "sector" reflectors 710c and 710d (shown in solid lines) are completely separate from one another and are held in position by the ring 790. Alternatively, joined sector reflectors can be provided as single-piece upper and lower reflector portions. Outlines 710e and 710f for sector reflectors of this type are shown in dashed lines. (If single piece sector reflectors are used, a supporting ring 790 may not be necessary. However, an viewing opening 720 must be provided in the single piece sector reflector.)

If the viewer position 760a is rotated about the center 780 of the opening to the position shown as 760b, the viewing line 750a is correspondingly rotated to the position shown as 750b. In order to view the "virtual" image in the opening 790 from this position (760b) it is necessary to rotate the "sector" reflectors 710c and 710d to the positions shown in dashed lines as 710c' and 710d'. (Assuming that the "sector" reflectors 710c and 710d are attached to the ring 790, the ring 790 rotates with the reflectors 710c and 710d).

This "sector" arrangement is particularly advantageous where a very large image translation chamber is needed, or where weight and portability are important, since considerably less material (and consequently considerably less polished surface area) is required.

Figure 8A:
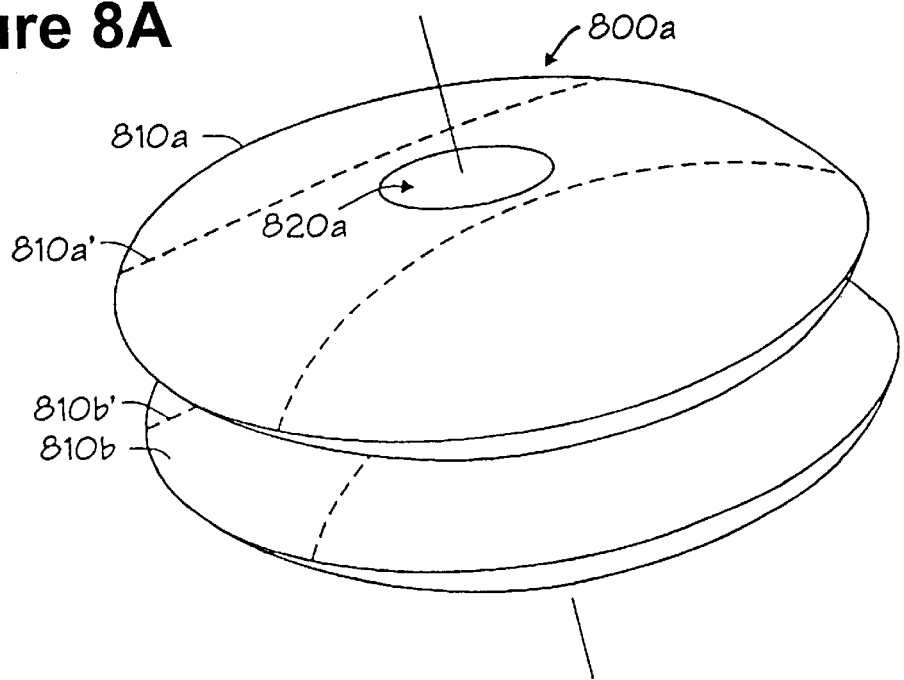
FIG. 8A is a view of a pair of "stacked" image translation chambers, according to the invention.

It will be readily appreciated by one of ordinary skill in the art that two or more image translation chambers can be "stacked" in a co-axial fashion to provide a double translation of the image. Such an arrangement is depicted in FIG. 8A. A stacked image translation arrangement 800a comprises a first image translation chamber 810a disposed above a second image translation chamber 810b in a co-axially aligned configuration. Each of the image translation chambers 810a and 810b is similar to the image translation chamber described hereinabove with respect to FIG. 7A, and operates in the same manner. A "real" image formed at or immediately above the lower reflector of the lower image translation chamber 810b will appear above the viewing opening 820a in the upper image translation chamber 810a.

One of ordinary skill in the art will recognize that if a single viewpoint is to be used, then either one or both of the image translation chambers can be formed in a restricted "sector" format, similar to that described hereinabove with respect to FIG. 7b. This is illustrated in FIG. 8a by outlines 810a' and 810b' of "sector" image translation chambers which can be substituted for the "solid" image translation chambers 810a and 710b, respectively. Evidently, the "sector" image translation chambers 810a' and/or 810b', if employed, must be aligned along the viewing path.

It will be evident to one of ordinary skill in the art that since "stacked" arrangements of image translation chambers involve more internal reflections (four per chamber), that in stacked arrangements, surface tolerances, finish requirements, parabolic conformance, and reflector positions are considerably more critical than for a single image translation chamber.

Evidently, a bi-convex lens can be used in much the same fashion as an image translation chamber, since its (parabolic or spherical approximations to parabolic) surfaces are similar to those of an image acceleration chamber. This is particularly true where coherent light (e.g., from a laser or optical parametric oscillator (OPO)) is used to form an image, since internal reflections will occur within the lens. These internal reflections occur off of the concave inner contours of the convex outer surfaces of the lens. Accordingly, a bi-convex lens can be "stacked" below an image translation chamber to alter the apparent position of a three-dimensional image within the image translation chamber.

Figure 8B:
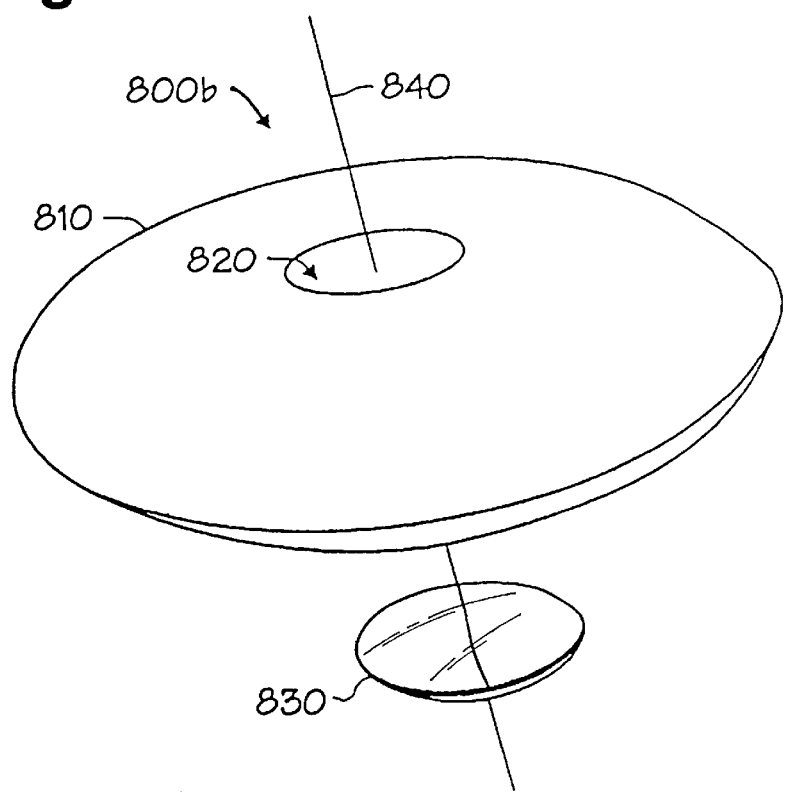
FIG. 8B is an "exploded" view of a stacked assembly of a bi-convex lens and an image translation chamber, according to the invention.

An arrangement 800*b* of this type is shown in FIG. 8B. An image translation chamber 810 is disposed above a bi-convex lens 830 in a co-axially aligned arrangement about a common axis 840. (The lens 830 is shown spaced away from the image translation chamber 810 in an "exploded" view for illustrative clarity. In actuality, the lens 830 would most likely be positioned close to or in contact with a lower opening of the image translation chamber 810.) An image formed via the lens 830 will appear at the viewing opening 820 in the image translation chamber. As with the stacked image translation chamber arrangement of FIG. 8*a*, optical tolerances are considerably more critical in the stacked arrangement 800*b*, due to the greater number of reflections as compared to a single image translation chamber. Also, as with the stacked arrangement of FIG. 8A, either the image translation chamber 810, the bi-convex lens 830, or both can be formed in a "sector" configuration (see FIG. 7B) aligned along a viewing path.

The "sector" arrangement described with respect to FIG. 7B is suited only to a single viewer or viewing position. Often, however, it is not possible to limit a viewer to a small range or viewing angles or to limit viewability to a single viewer. In these cases, the arrangement of FIG. 7B suffers considerably. The following discussion with respect to FIG. 8C addresses this deficiency in the "sector" reflector arrangements.

Figure 8C:
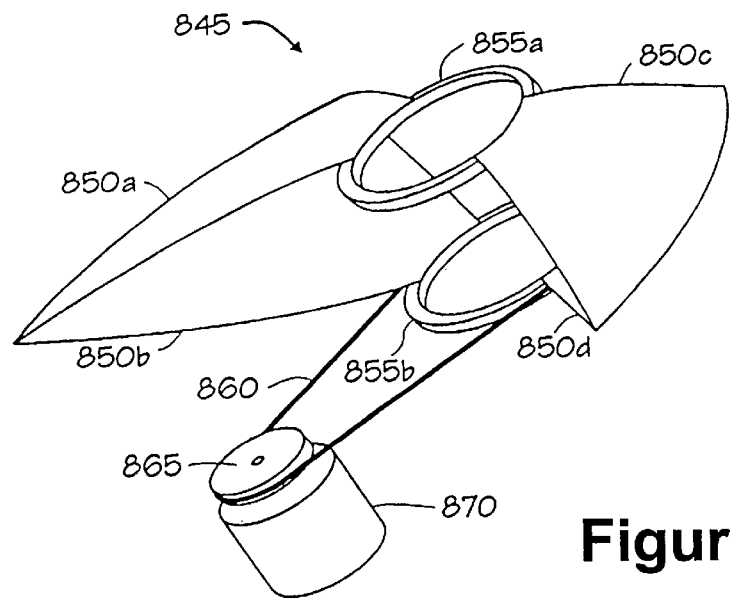
FIG. 8C is a view of a "sector" image translation chamber, and means for controlling its angular position, according to the invention.

FIG. 8C is an oblique view of a rotating "sector" image translation chamber 845. The image translation chamber, similar to that shown and described with respect to FIG. 7*b*, comprises two co-axially aligned support rings 855*a* and 855*b*, and four (or multiples of four, i.e., 8, 12, 16) convex reflector sections 850*a*, 850*b*, 850*c*, and 805*d*, attached to the rings 855*a* and 855*b*. The support ring 855*b* is shaped to act as a pulley, around which a drive band or belt 860 is disposed. The support rings 855*a* and 855*b* also define the lower and upper openings (apertures) of the image translation chamber 845. Two of the convex reflector sections 850*a* and 850*b* are arranged to one side of the rings 855*a* and 855*b*, and the other two convex reflector sections 850*c* and 850*d* are arranged diametrically opposite (with respect to the rings 855*a* and 855*b*) the first two convex reflector sections 855*a* and 855*b*. The drive band or belt 860 goes around a drive pulley 865 driven by a drive motor 870. By energizing the drive motor, the "sector" image translation chamber 845 can be rotated about its vertical axis (the axis through the centers of the rings 855*a* and 855*b*).

If there is a single viewer, then the motor can be used to align the chamber 845 with the viewer's position. This can be accomplished by sensing the viewer's position and driving the chamber 845 with the motor 870 so that the viewing axis of the chamber 845 follows the viewer's position. This is described in greater detail hereinbelow with respect to FIG. 8*e*. If, however, a wide range of viewing angles must be accommodated simultaneously, then it is possible to spin the chamber 845 rapidly to permit all viewing angles to be accommodated. It is important to realize, however, that since this arrangement makes use of the image persistence characteristics of the viewer's eye, that image brightness and contrast may be degraded somewhat. (However, this is not a problem if the spin rate is sufficient.) This can be compensated for by increasing the brightness (and contrast) of the "real" image. It will be evident to one of ordinary skill in the art that any suitable drive mechanism can be substituted for the belt and pulley arrangement shown in FIG. 8C. The chamber preferably moves constantly so that multiple views are presented to multiple viewers.

The quality of the virtual image formed by an image translation chamber is greatly affected by the parabolic conformance of its concave reflecting surfaces. Unfortunately, however, true parabolic surfaces are difficult to produce. A rotating "sector" reflector arrangement (e.g., FIG. 8B) can be used to great advantage in providing a "true" parabolic reflector shape while simultaneously avoiding the need for manufacturing a parabolic reflector. This is described with respect to FIG. 8D.

Figure 8D:
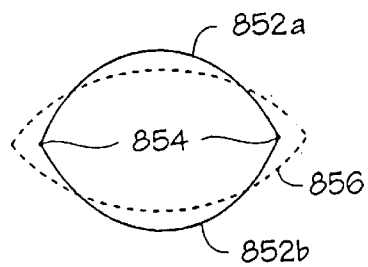
FIG. 8D is a cross-sectional view illustrating a "spreading" effect of spinning a flexible "sector" image translation chamber, according to the invention.

FIG. 8D is a side view of a "sector" image translation chamber formed from an upper concave reflector portion 852*a* and a lower concave reflector portion 852*b*. The two reflector portions 852*a* and 852*b* are joined by flexible attachments 854, which act as pivots between the two reflector portions 852*a* and 852*b*. The pivots are formed in a non-parabolic shape of a flexible material (e.g., a spring steel or other "springy" material). The non-parabolic shape reflector portions 852*a* and 852*b* is preferably a spherical shape or other suitable easy-to-form shape. When the "sector" image translation chamber is spun, centrifugal force causes the assembly to "spread" into the shape shown generally as 856 (dashed lines). Assuming a spherical initial shape, suitably flexible "pivots" (854), and appropriate rotational speed, the new shape (856) is parabolic. If desired, the "pivots" 854 can be weighted to help control the forces applied to the concave reflector portions 852*a* and 852*b*.

Figure 8E:
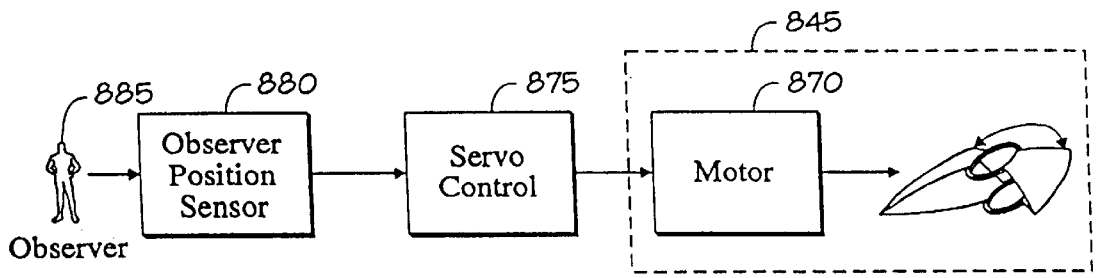
FIG. 8E is a block diagram of a system for controlling the angular position of a "sector" image translation chamber according to an observer's position, according to the invention.

FIG. 8E is a block diagram of a position control system for a "sector" image translation chamber. In this case, the image translation chamber 845 of FIG. 8*c* is considered. An observer 885 wishes to view a three dimensional image via the image translation chamber 845. An observer position sensor 880 determines the observer's angular position relative to the vertical axis of the chamber 845. This position information is applied to a servo control system 875 which drives the motor 870 to bring the image acceleration chamber 845 into alignment with the observer's viewing position. As the observer moves about the image, the "sector" image translation chamber is continually rotationally aligned with the observer's position. It will be readily appreciated by one of ordinary skill in the art that this arrangement is well suited to viewing by a single observer or to viewing by two observers opposite one another.

The discussion hereinabove with respect to FIGS. 7A, 7B and 8A–E has been directed to techniques of image translation whereby a "real" image is perceived by a viewer as a "virtual" image at a different location. These techniques manipulate three-dimensional images which have already been created. Attention is now directed to techniques aimed at generating images, including color images.

Figure 9:
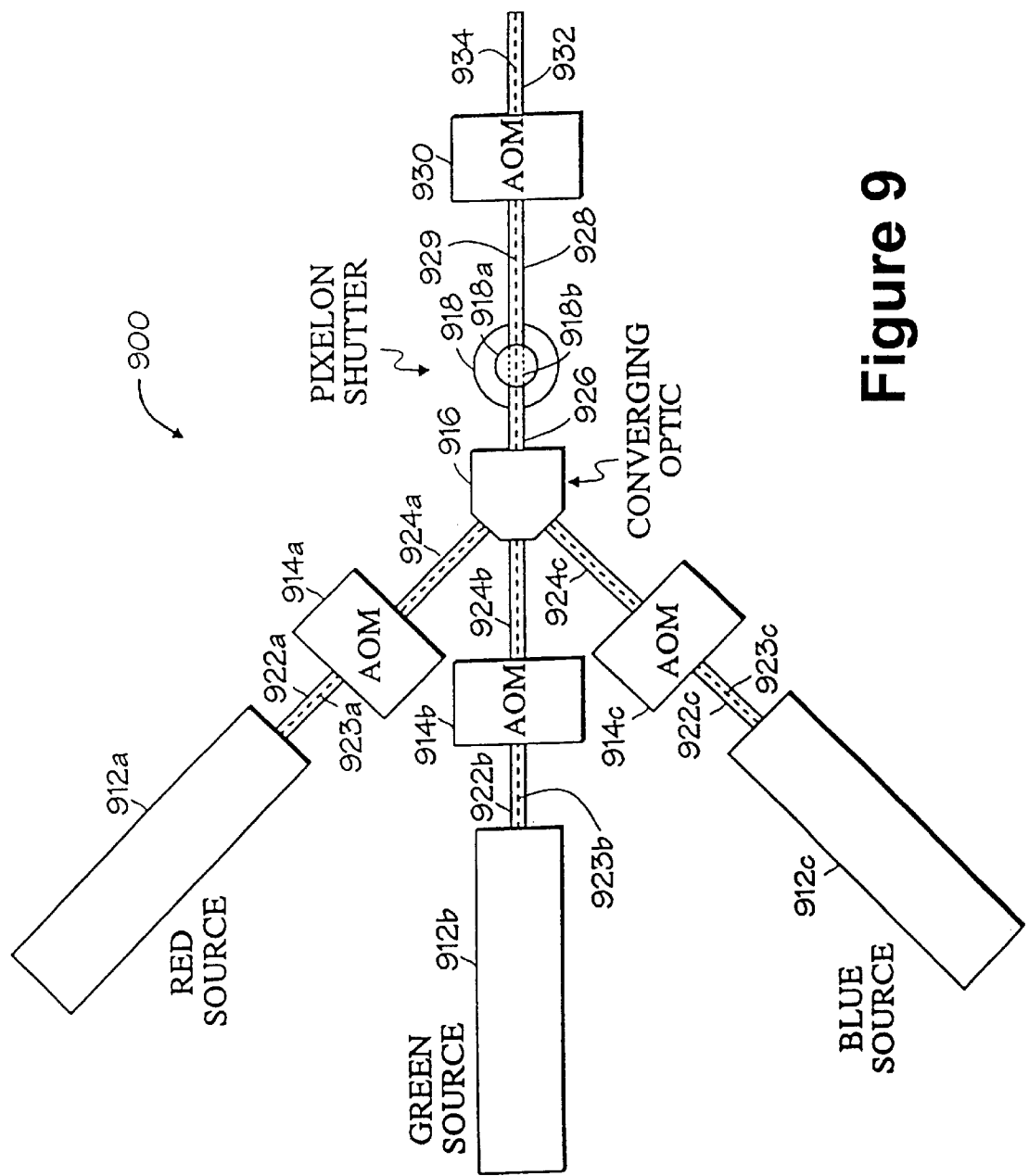
FIG. 9 is a diagram (top view) of apparatus for controlling color, intensity and modulation of a laser light beam, according to the invention.

In order to generate a color three-dimensional image, it is necessary to provide a coherent light source which can be modulated in both color and intensity. FIG. 9 is a block diagram of apparatus for accomplishing this.

FIG. 9 is a block diagram of a color controllable, intensity modulated laser light source 900. A red laser 912*a*, a green laser 912*b* and a blue laser 912*c*, provide monochromatic, coherent, collimated beams of light in each of the three primary colors of light. (It will be evident to ordinary skill in the art that the term "laser" is used loosely here, and encompasses all methods of generating collimated coherent light, including OPO's or Optical Parametric Oscillators). The red laser 912a generates a coherent red light beam 922a, directed along a path 923a. The green laser 912b generates a coherent green light beam 922b, directed along a path 923b. The blue laser generates a coherent blue light beam 922c, directed along a path 923c. A first AOM 914a (Acousto-Optic Modulator) receives the red light beam 922a and modulates it in intensity, producing an intensity modulated red light beam 924a. A second AOM 914b receives the green light beam 922b and modulates it in intensity, producing an intensity modulated green light beam 924b. A third AOM 914b receives the blue light beam 922c and modulates it in intensity, producing an intensity modulated blue light beam 924c. It will be understood by one of ordinary skill in the art that the three AOM's 914a, 914b, and 914c can be controlled with suitable drive electronics to provide very fine control (e.g., 8-bit or 256-level control; or 24-bit) over beam intensity. If, for example, 8-bit control is provided over each of the three color-modulated beams 924a, 924b, and 924c, then 16,777,216 color/intensity combinations are possible. A converging optical assembly 916. receives the three intensity modulated color beams 924a (red), 924b (green) and 924c (blue), and merges them into a common color-modulated beam 926. The color and intensity of the color-modulated beam 926 is controlled by manipulating the intensities of the three component color beams 924a, 924b, and 924c, using the first, second and third AOM's, 914a, 914b, and 914c, respectively.

The color-modulated beam is then passed through a Pixelon (TM) shutter 918 which permits high-speed gating of the color-modulated beam 926 to produce a gated color-modulated beam 928 directed along a path 929. The Pixelon (TM) shutter (described hereinabove with respect to FIG. 2) comprises a drive motor 918a and a gate 918b. The gate is essentially a cylindrical rod through which one or more diametric holes are formed. When a hole is in alignment with the incident beam (e.g., 926), the beam passes through the hole. When the hole is not in alignment with the beam, the beam is blocked. The position of the rod is controlled by the motor 918a. By rapidly controlling the alignment of the hole (or holes) with the incident beam, the incident beam can be rapidly gated. An alternative, according to the present invention, is to use co-phase gating techniques.

The gated color-modulated beam 928 is then modulated by a fourth AOM 930 to provide a Z-axis modulated beam 932, directed along a path 934. It will be readily appreciated by one of ordinary skill in the art that AOM's can be used in conjunction with extremely high-frequency modulating waveforms to provide extremely high-speed control of the intensity of the incident beam. This high-speed control can be used to provide a repeating pattern of "packets" of light. By adjusting the repetition period of the modulation pattern on the beam 932 to coincide with a reflection interval in interferometric apparatus, Z-axis (depth) control of an image can be achieved, as described in greater detail hereinbelow.

Although the apparatus 900 described above uses three lasers 912a, 912b, and 912c to produce the three primary colors of light, it will be readily understood by one of ordinary skill in the art that any number of light sources (e.g., one light source in monochromatic applications) is readily accommodated by this technique.

Figure 10A:
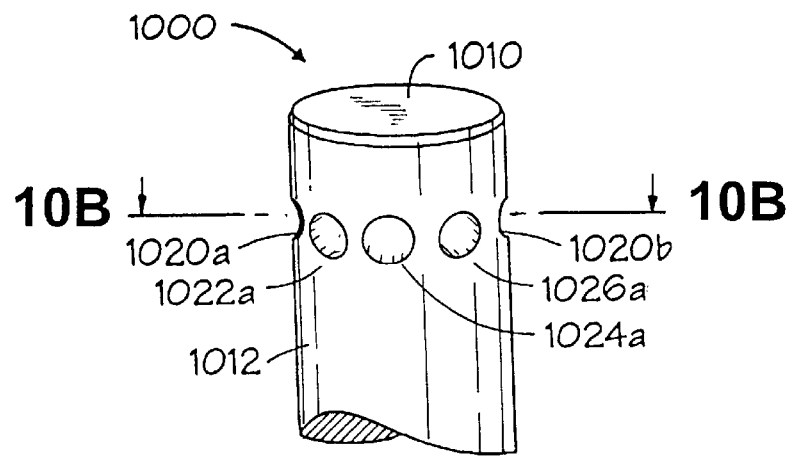
FIGS. 10A and 10B are views of a multi-aperture shutter, according to the invention.

The discussion hereinabove with respect to FIG. 2 was directed to a Pixelon (TM) shutter with a single hole. FIG. 10A is a view of a Pixelon (TM) shutter 1000 with a plurality of diametric holes (four, in this case). The shutter consists of a cylindrical rod 1010 with straight sides 1012, through which a plurality of diametric holes are formed. A first opening 1020a is formed in the side wall 1012 by a first hole which extends through the rod, exiting at a diametrically opposite location 1020b. Three other openings 1022a, 1024a, and 1026a, corresponding to three other holes extend into the side 1012 of the rod 1010, exiting at a diametrically opposite position (not shown).

It is possible to form the holes directly into a motor shaft, using the motor shaft itself as the cylindrical shutter rod 1010. This provides for extremely low-mass and rotational inertia (even lower than that of the original motor shaft), thereby allowing very rapid rotation and/or positioning of the shaft. The shutter can be spun rapidly to provide high-speed periodic gating of the incident beam (e.g., using a high-speed DC motor) or selectively controlled as described hereinabove with respect to FIG. 2. By providing more holes in the rod 1010, higher-speed gating of the beam is possible. Depending on the application, the holes in the shutter can be formed with any geometric shape (e.g., circle, square, ellipse, diamond, rectangle, parallelogram, trapezoid, alternating trapezoids, etc.).

Figure 10B:
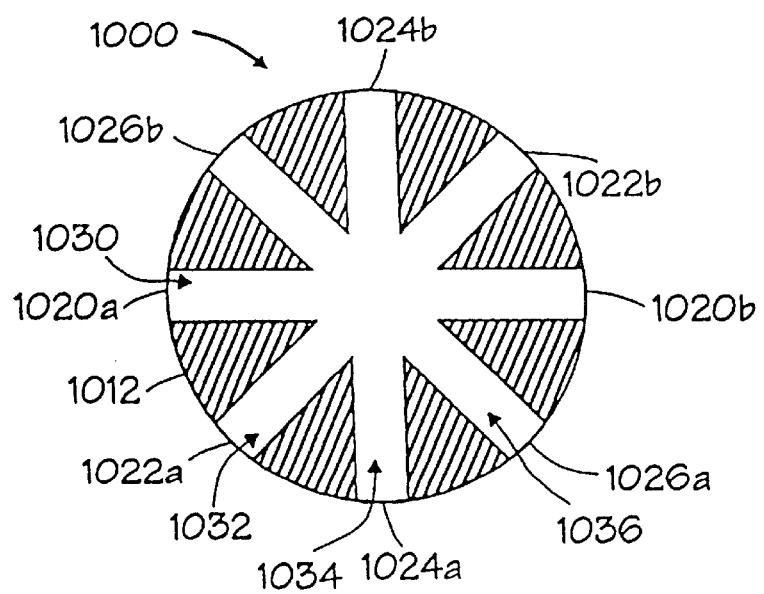

FIG. 10B is a cross-sectional view of the Pixelon (TM) shutter 1000 viewed from the top (i.e., looking along the length, or down the axis, of the rod) through section line A-A'. The four holes 1030, 1032, 1034 and 1036 can be seen extending along four evenly (radially) space diameters of the rod. The hole 1030 forms two diametrically opposite openings 1020a and 1020b in the side wall 1012 of the rod. The hole 1032 forms two diametrically opposite openings 1022a and 1022b in the side wall 1012 of the rod. The hole 1034 forms two diametrically opposite openings 1024a and 1024b in the side wall 1012 of the rod. The hole 1036 forms two diametrically opposite openings 1026a and 1026b in the side wall 1012 of the rod.

In order to limit or prevent unwanted reflections from the Pixelon (TM) shutter rod 1010, the rod 1010 can be provided with a non-reflecting (e.g., matte) surface finish, such as by anodizing an aluminum rod, or by electroplating a solid glass rod (which would have transparent, rather than physical, openings allowing light to pass therethrough and to be gated thereby).

Having developed a modulated beam, it is next necessary to address the issue of formation of a viewable image from that beam. Rotating screen techniques such as that described in BATCHKO can make use of a color-modulated beam (e.g., 926, 928, or 932, FIG. 9) to form a color image. Such techniques aim the beam at a rotating screen to form a small spot thereupon. Deflection of the beam and the rotational motion of the screen combine in a form of "scanning" to trace a three-dimensional image in space. Such techniques require only highly collimated light, as opposed to the fully coherent light provided by lasers. Since there is no interferometry, non-coherent light sources can be used as well. (Radiation sources and heat explosions from plasmas could also be manipulated by these techniques.) Image persistence in the viewer's eye provides image cohesion. Such rotating screen techniques, however, often have problems associated with illumination intensity, addressability, and form factor. Other techniques for forming three-dimensional images are described hereinbelow with respect to FIGS. 11A–18.

Figure 11A:
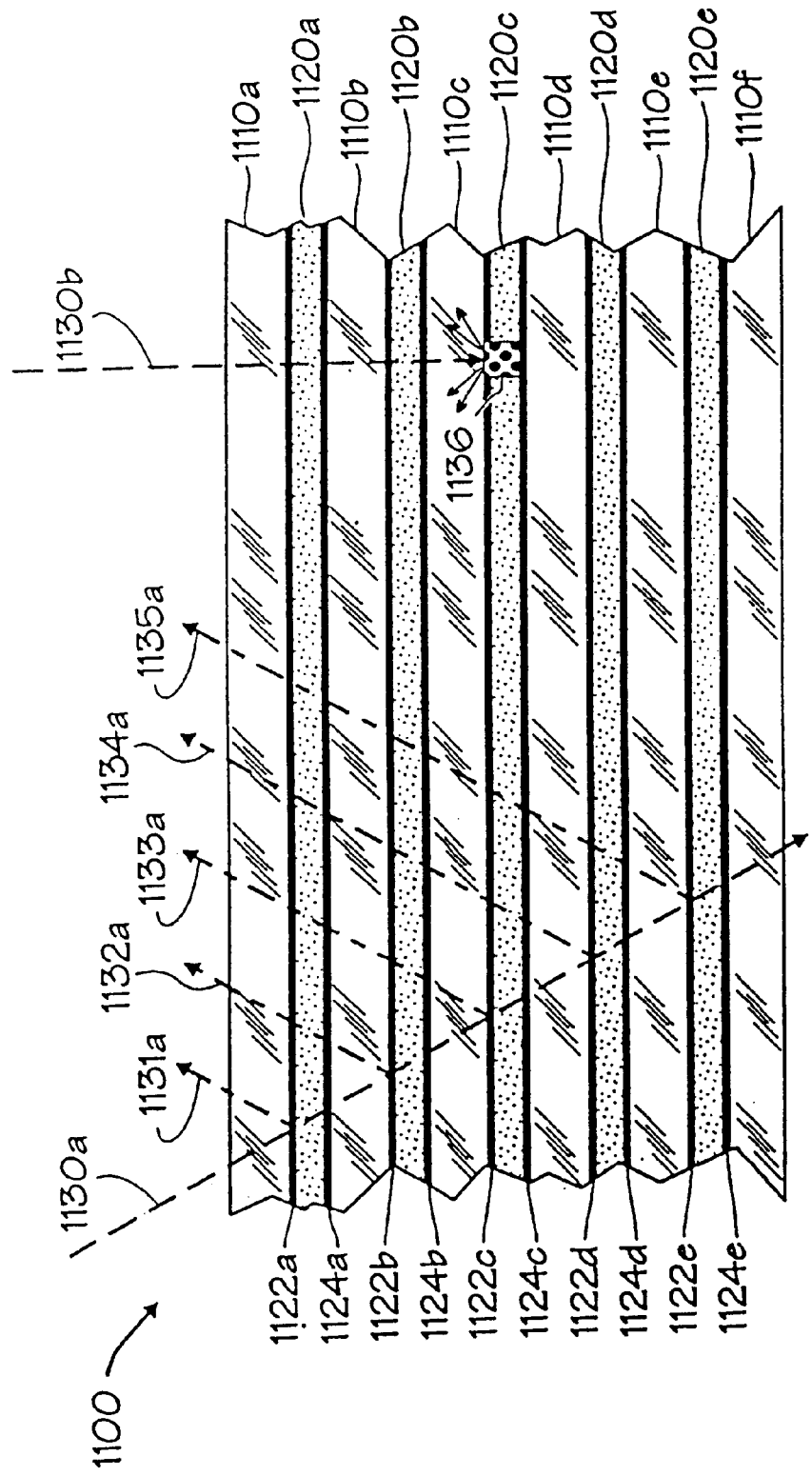
FIG. 11A is a cross-sectional view of an active multi-planar optical element ("MOE" or "MPOE"), according to the invention.

FIG. 11A is a view of an active multi-planar optical element (MOE) 1100 used in forming images, according to the invention. The multi-planar optical element 1100 comprises a series of transparent (preferably glass) plates 1110a, 1110b, 1110c, 1110d, 1110e, and 1110f, separated from one another by monolithic (preferably multi-pixelled, addressable) liquid crystal layers 1120a, 1120b, 1120c, 1120d, and 1120e. Each liquid crystal layer is provided with a pair of transparent electrodes for the purpose of "activating" the liquid crystal material. Liquid crystal layer 1120a has transparent electrodes 1122a and 1124a disposed on opposite sides thereof. Liquid crystal layer 1120b has transparent electrodes 1122b and 1124b disposed on opposite sides thereof. Liquid crystal layer 1120c has transparent electrodes 1122c and 1124c disposed on opposite sides thereof. Liquid crystal layer 1120d has transparent electrodes 1122d and 1124d disposed on opposite sides thereof. Liquid crystal layer 1120e has transparent electrodes 1122e and 1124e disposed on opposite sides thereof.

It is known to electrically control liquid crystal assemblies to switch between a light transmissive state and a reflective state. It is also known to similarly control liquid crystal materials to switch between a light-transmissive (transparent) state and an opaque state. This is accomplished by applying an electrical potential across a pair of electrodes between which liquid crystal material is disposed. The electrical potential causes the molecules of the liquid crystals to "align" into a common orientation, giving the liquid crystal material certain electrically controllable electrical properties. The behavior of liquid crystals is well understood in the art and will not be further elaborated upon herein.

The active multi-planar optical element 1100 has two primary "modes" of operation. In a first "reflective" mode of operation, the active multi-planar optical element acts as an electrically controllable selectively reflective device. This is illustrated in FIG. 11a by the behavior of an incident light beam 1130a. The light from the beam 1130a is either reflected or transmitted based upon the state of the liquid material through which it passes. Accordingly, if the topmost liquid crystal layer 1120a is in a reflective state, then the incident beam 1130a is "bounced" off of the liquid crystal layer 1120a as a reflected beam 1131a. If the topmost liquid crystal layer 1120a is in a transmissive state and the next lower liquid layer 1120b is in a reflective state then the incident beam 1130 is transmitted by the topmost liquid crystal layer 1120a without substantial reflection and bounced off of the liquid crystal layer 1120b as a reflected beam 1132a. If the topmost two liquid crystal layers 1120a and 1120b are in a transmissive state and the next lower liquid layer 1120c is in a reflective state then the incident beam 1130 is transmitted by the topmost two liquid crystal layers 1120a and 1120b without substantial reflection and bounced off of the liquid crystal layer 1120c as a reflected beam 1133a. If the topmost three liquid crystal layers 1120a, 1120b, and 1120c are in a transmissive state and the next lower liquid layer 1120d is in a reflective state then the incident beam 1130 is transmitted by the topmost three liquid crystal layers 1120a, 1120b, and 1120c without substantial reflection and bounced off of the liquid crystal layer 1120d as a reflected beam 1134a. If the topmost four liquid crystal layers 1120a, 1120b, 1120c, and 1120d are in a transmissive state and the next lower liquid layer 1120e is in a reflective state then the incident beam 1130 is transmitted by the topmost four liquid crystal layers 1120a without substantial reflection and bounced off of the liquid crystal layer 1120b as a reflected beam 1132a. The various reflected beams (1131a–1135a) are spaced apart from one another by a distance determined by the spacing between the liquid crystal layers (1120a–e) and the angle of incidence of the incident beam 1130a.

By selectively controlling the transmissive/reflective states of the various liquid layers, the active multi-planar optical element can be used to cause an incident beam to produce a number of "scanned" reflected beams in sequence. This beam "scanning" can be used in a manner similar to the well-known technique of "galvo" scanning (wherein a mirror mounted on a shaft of a galvanometer is rotated or vibrated to control a beam deflection angle or to generate a beam sweep pattern; two such "galvo" scanned mirrors can be used to accomplish scanning in two dimensions). Anti-reflective coatings on the transparent layers 1110a–e can be used to minimize "ghosting" and undesirable spurious reflections off the surfaces thereof. An advantage of active multi-planar optical element scanning is that all of the reflected beams (e.g., 1131a–1135a) are parallel, as opposed to the divergent beams resulting from galvo scanning.

The second "mode" of operation of this active multi-planar optical element 1100 is an opaque "imaging" mode. In this mode, a liquid crystal layer (e.g., 1120a–e) is made opaque. Wherever an incident light beam strikes the opaque layer, a spot of light is formed. This is illustrated in FIG. 11a. In this case the first two liquid crystal layers 1120a and 1120b are transparent and the third liquid crystal layer 1120c is made opaque (by controlling the transparent electrodes). An incident beam 1130b, aimed perpendicular to the surface of the active multi-planar optical element passes through the transparent liquid crystal layers 1120a and 1120b and strikes the opaque layer 1120c, forming a spot of light 1136. This spot 1136 is visible to an observer through the transparent layer. If the incident beam 1130b is scanned in a pattern over the multi-planar optical element, the spot 1136 on the opaque layer 1120c traces the path of the beam 1130b, thereby forming an image on the opaque liquid crystal layer 1130c which is visible to an observer. By rapidly scanning images in sequence over each of the liquid crystal layers 1120a–e, each layer 1120a–c made opaque in a repeating sequence, a three-dimensional image is formed within the active multi-planar optical element. As each liquid crystal layer (1120a–e) is made opaque in turn, the image traced on it by the incident beam 1130b can be seen by an observer through the other transparent layers. As before, anti-reflective coatings can be used to minimize "ghosting" and spurious reflections.

One of ordinary skill in the art will understand that the active multi-planar optical element is not restricted to any particular number of layers, and that any number of liquid layers may readily be incorporated into an assembly of this sort. By providing a large number layers, three-dimensional images of considerable depth can be formed. Alternatively, with a large number of layers an incident beam can be effectively "scanned" in a large number of steps.

Figure 11B:
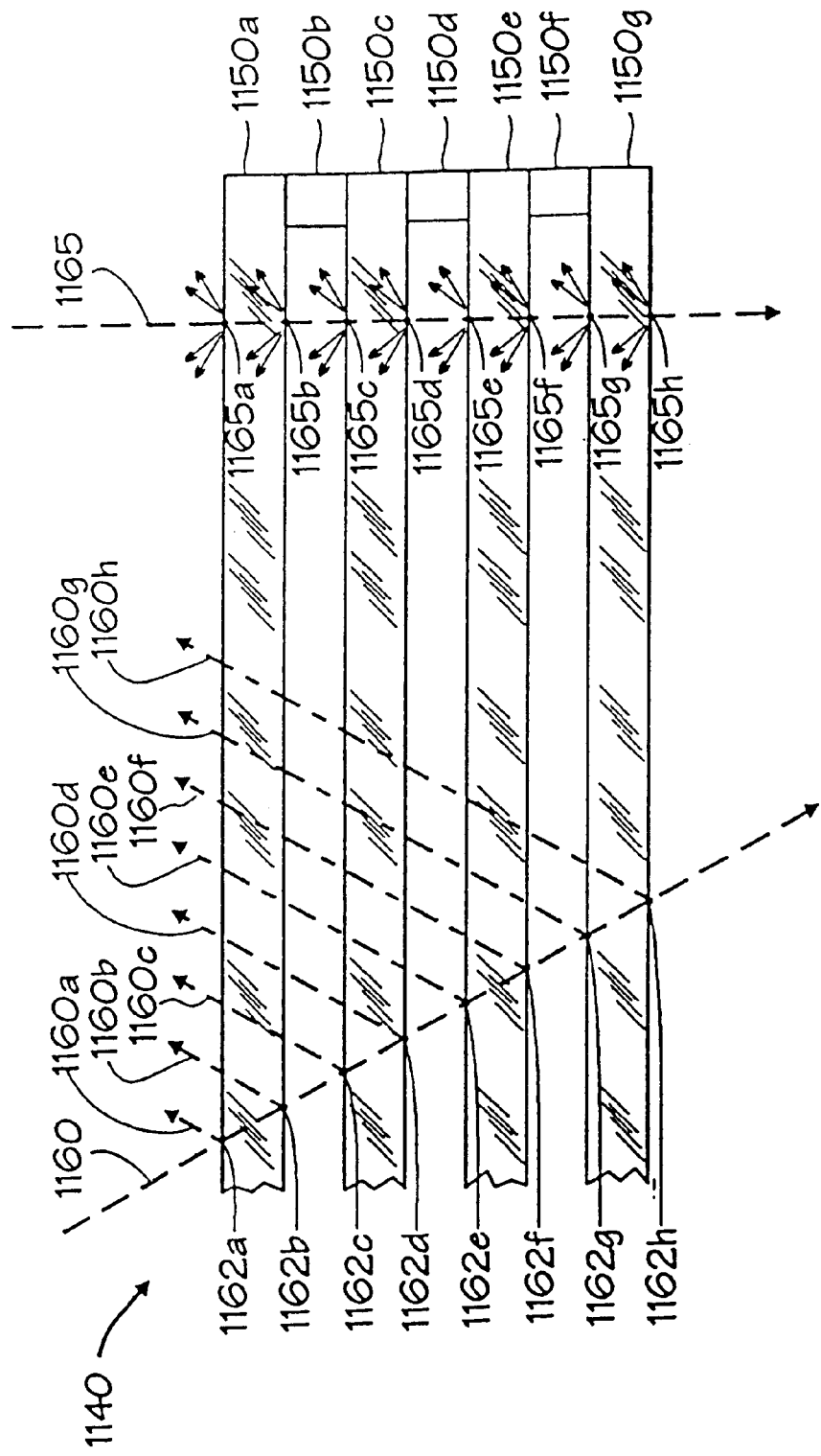
FIG. 11B is a cross-sectional view of a passive multi-planar optical element, according to the invention.
Figure 12:
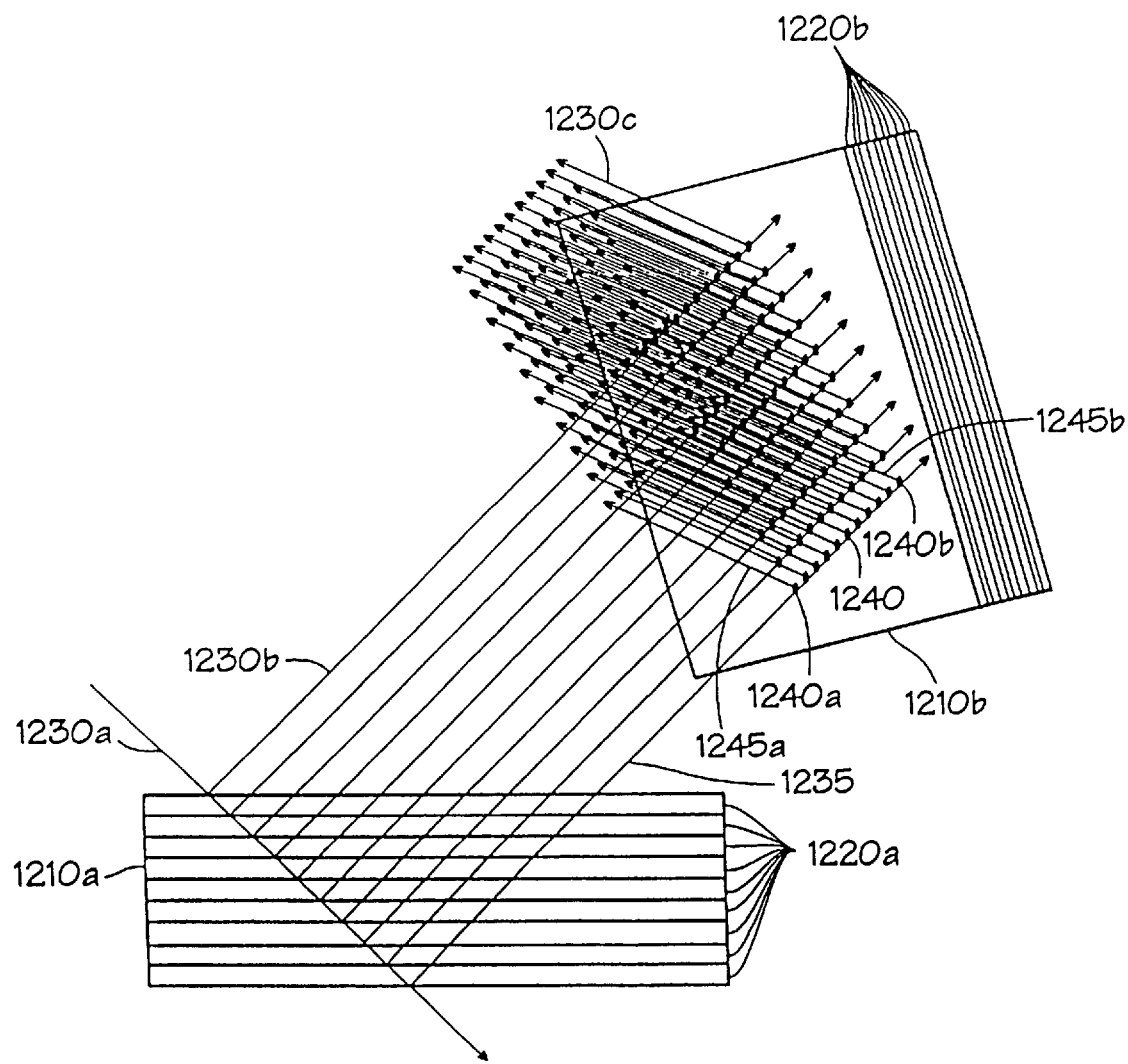
FIG. 12 is a view illustrating the use of two multi-planar optical elements to produce a two-dimensional rectangular array of light beams from a single incident beam, according to the invention.

FIG. 11B shows a "passive" multi-planar optical element 1140, comprising a plurality of spaced-apart planar transparent (preferably glass) layers 1150a, 1150c, 1150e, and 1150g, each layer having two parallel planar surfaces. Constant spacing between the transparent layers 1150a, 1150c, 1150e and 1150g is maintained by spacers 1150b, 1150d, and 1150f (preferably transparent). (Four layers and three spacers are shown. It will be understood by one of ordinary skill in the art that any number of layers may be similarly accommodated.) Unlike the active multi-planar optical element 1100 (FIG. 11A) the passive multi-planar optical array 1140 is a completely passive optical device, having no electrical (or other) connections.

Like the active multi-planar optical element, the passive multi-planar optical element 1140 has two "modes" of use: a "reflective" mode and an "image" mode. Both modes are illustrated in FIG. 11b. In the "reflective" mode, an incident beam of light 1160 is directed into the multi-planar optical element 1140 at an oblique angle. Each surface of each transparent layer (1150a, 1150c, 1150e, and 1150g) acts as a reflecting surface, since at each surface there is a change of refractive coefficient (e.g., glass to air). As the beam 1160 penetrates the transparent layers, a portion of the light energy in the beam is reflected off of each surface, forming reflected beams 1160a, 1160b, 1160c, 1160d, 1160e, 1160f, 1160g, and 1160h. The reflected beams are all parallel to one another.

If a rapidly modulated light source is used, then the reflected beams differ from one another in time. The first reflected beams are advanced in modulation "phase" relative to later modulated beams. This "phase" relationship can be used to advantage in interferometric applications.

In a second "image forming" mode of usage, the passive multi-planar optical element 1140 can be employed to form a plurality of visible image "dots". This is illustrated in FIG. 11b by the response of the multi-planar optical element 1140 to a perpendicular incident beam 1165. The beam 1165 passes through the layers 1150a, 1150c, 1150e and 1150g of the transparent multi-planar optical array 1140, forming a visible "dot" at each change of refractive index (i.e., at each surface of each transparent layer where there is a gas to transparent medium, e.g., glass to air, transition). In conjunction with very high speed modulation and reflective reinforcement (as described hereinbelow with respect to FIGS. 14A, 14B and 15), the intensity of individual dots can be controlled. In conjunction with further scanning (in the two dimensions perpendicular to the beam 1165), visible images can be formed on each of the surfaces of each of the transparent layers, thereby creating a visible three-dimensional image inside the multi-planar optical array which can be viewed by an observer.

Since a single multi-planar optical element can be used to generate a plurality of (preferably evenly spaced) first parallel reflected beams from a single incident beam, it follows that a rectangular array of second parallel reflected beams can be generated from the plurality of first parallel reflected beams by using a second appropriately positioned multi-planar optical element. This is illustrated and described with respect to FIG. 12.

A first multi-planar optical element 1210a having a plurality of reflecting layers (e.g. 1100 of FIG. 11A, or 1130 of FIG. 11B) is used to split an incident beam 1230a into a plurality of first parallel reflected beams 1230b. A second multi-planar optical element 1210b having a plurality of reflecting layers 1220b is positioned such that each of the first parallel reflected beams 1230b strikes its surface at an oblique angle. Each first parallel reflected beam 1230b is further "split" into a plurality of second parallel reflected beams 1230c, resulting in a rectangular array of second parallel reflected beams 1230c. Each second parallel reflected beam 1230c originates at a reflecting point 1240 where its respective first reflected beam 1230b crosses a reflecting surface in the second multi-planar optical element 1210b. To further illustrate the effect of the various reflecting layers 1220b in the second multi-planar optical element 1210b, several reflected beams are specifically indicated.

Following the path of one of the first parallel reflected beams 1235 (the lower-most beams 1230b as illustrated), the beam 1235 intercepts a first reflecting layer of the second multi-planar optical element 1210b at a reflecting point 1240a. A portion of the energy in the first parallel reflected beam 1235 is reflected from this reflecting point 1240a to form a reflected beam 1245a. As the beam traverses each reflecting surface 1220b in the second multi-planar optical element 1210b, another reflected beam is generated until the first parallel incident beam passes through the last reflecting layer at a reflecting point 1240b, generating a corresponding last reflected beam 1240b. Reflecting characteristics of the reflecting layers 1220a and 1220b can be controlled to provide uniform reflected beam intensity.

Figure 13:
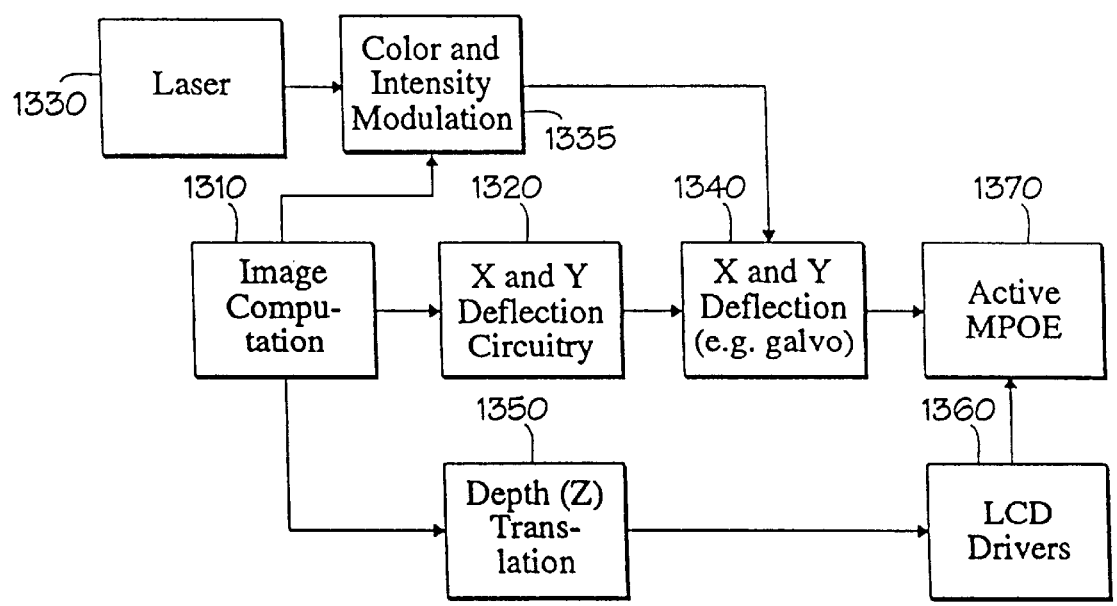
FIG. 13 is a block diagram of apparatus for generating a three dimensional viewable image using an active multi-planar optical element for imaging, according to the invention.

FIG. 13 is a block diagram of three-dimensional image generation apparatus which uses an active multi-planar optical element in an "imaging" mode to form a visible three dimensional image. A first block 1310 represents a computer or other image computation apparatus where the size, position, orientation, color, three-dimensional (e.g., X, Y, Z) image point coordinates, etc., of a three-dimensional image to be generated are determined. A laser 1330 (combination of color lasers for color applications) generates a continuous source beam. According to the image data generated in the image computation block 1310, a color and intensity modulation block 1335 modulates the intensity (and color in multi-color applications) of the source beam to produce a modulated beam. (Blocks 1330 and 1335 in combination are comparable to the apparatus depicted in FIG. 9.) The modulated beam is deflected in two dimensions (X and Y) by X and Y deflection apparatus 1340, such as a pair of galvo-controlled mirrors. The X and Y deflection apparatus 1340 is controlled by X and Y deflection circuitry 1320 which operates according to computed deflection parameters derived from X and Y image data from the image computation block 1310. Depth data from the image computation block 1310 is translated into specific Z-coordinates in a depth translation block 1350. The resulting Z-coordinate (depth data) is used to control LCD drivers 1360 to operate liquid crystal layers in an active MOE (multi-planar optical element). The X and Y deflected beam resulting from X and Y deflection (ref 1340) of the modulated beam (from 1335) impinges upon the activated (opaque) selected layer of the active MOE 1370 to create a visible image thereupon. As the various layers of the active MOE 1370 are individually activated and "imaged" with the modulated beam (from 1335) a three-dimensional image appears within the active MOE 1370.

As an alternative to galvanometer scanning, AOBD's (Acousto-Optic Beam Deflectors) can be used to cause electrically controllable deflection of a beam of light. AOBD's are essentially acousto-optic devices adapted specifically for beam deflection, and are commercially available.

The image generation (formation) techniques described hereinabove with respect to FIGS. 11A, 11B, 12 and 13 make use of multi-layer transparent assemblies. Another approach to forming three-dimensional image makes use of the ability to cause gas molecules to emit light when stimulated with photon energy.

Figure 14A:
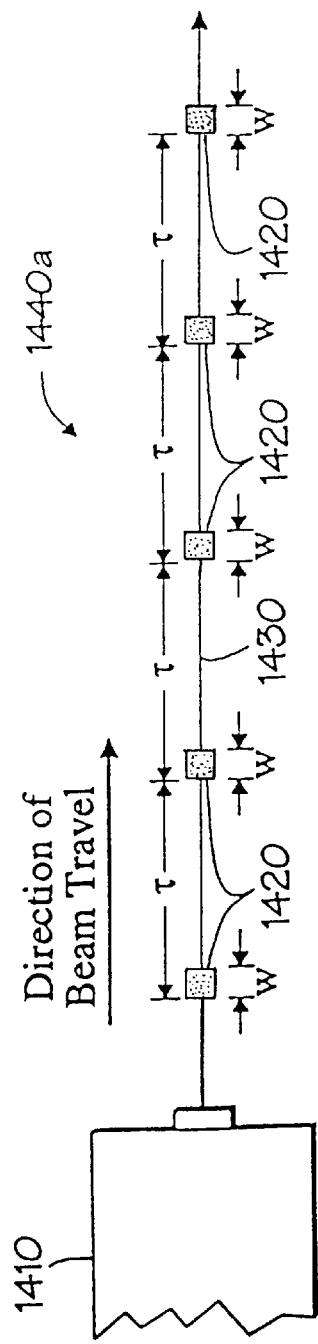
FIGS. 14A and 14B illustrate high-speed periodic pulse modulation of a light beam, according to the invention.

FIG. 14A is a diagram illustrating high speed modulation of a light beam. Beam generation apparatus 1410 (see, e.g., FIG. 9) is used to generate a modulated beam of coherent light 1440a. The beam is modulated (e.g., with AOM's, see FIG. 9) to produce a plurality of evenly-spaced (in time) "packets" of light 1420. (That is, the beam is gated on and off such that evenly-timed pulses of light are generated.) The beam travels in the direction indicated (to the right in the Figure, as indicated by the arrow pointing to the right) at the speed of light. As a result, the evenly-timed "packets" 1420 of light are also evenly-distanced from one another (in space) along the path of the beam. Each packet 1420 (pulse) has a duration "w", and the packets 1420 (pulses) are emitted with a repetition period "T". The actual distance (in space) between the starting points of adjacent packets 1420 (pulses) is the distance traveled at the speed of light (roughly one nanosecond per foot) in a time interval "T". For example, if one packet 1420 (pulses) is emitted every 0.25 nanoseconds, then the pulses will be spaced approximately 3 inches apart along the path of the beam 1440a. The length of each packet 1420 (along the path of the beam 1440a) is equal to the distance traveled at the speed of light over a time interval "w".

Figure 14B:
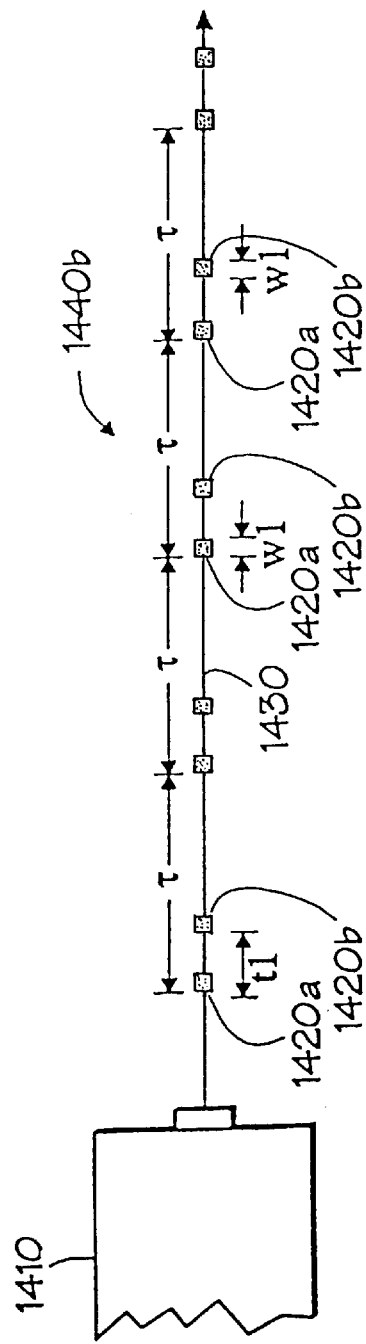

FIG. 14B is similar to FIG. 14A, except that a different modulated beam 1440b is generated. In this case, two pulses 1420a and 1420b are emitted during each time interval "T". Each pulse (1420a,b) has a duration "w1". The second pulse 1420b of each pair of pulses (1420a,b) is emitted a time interval "t1" after the first pulse 1420a is emitted. This results in the time (and distance) spacing of pulses shown in the Figure.

Figure 15:
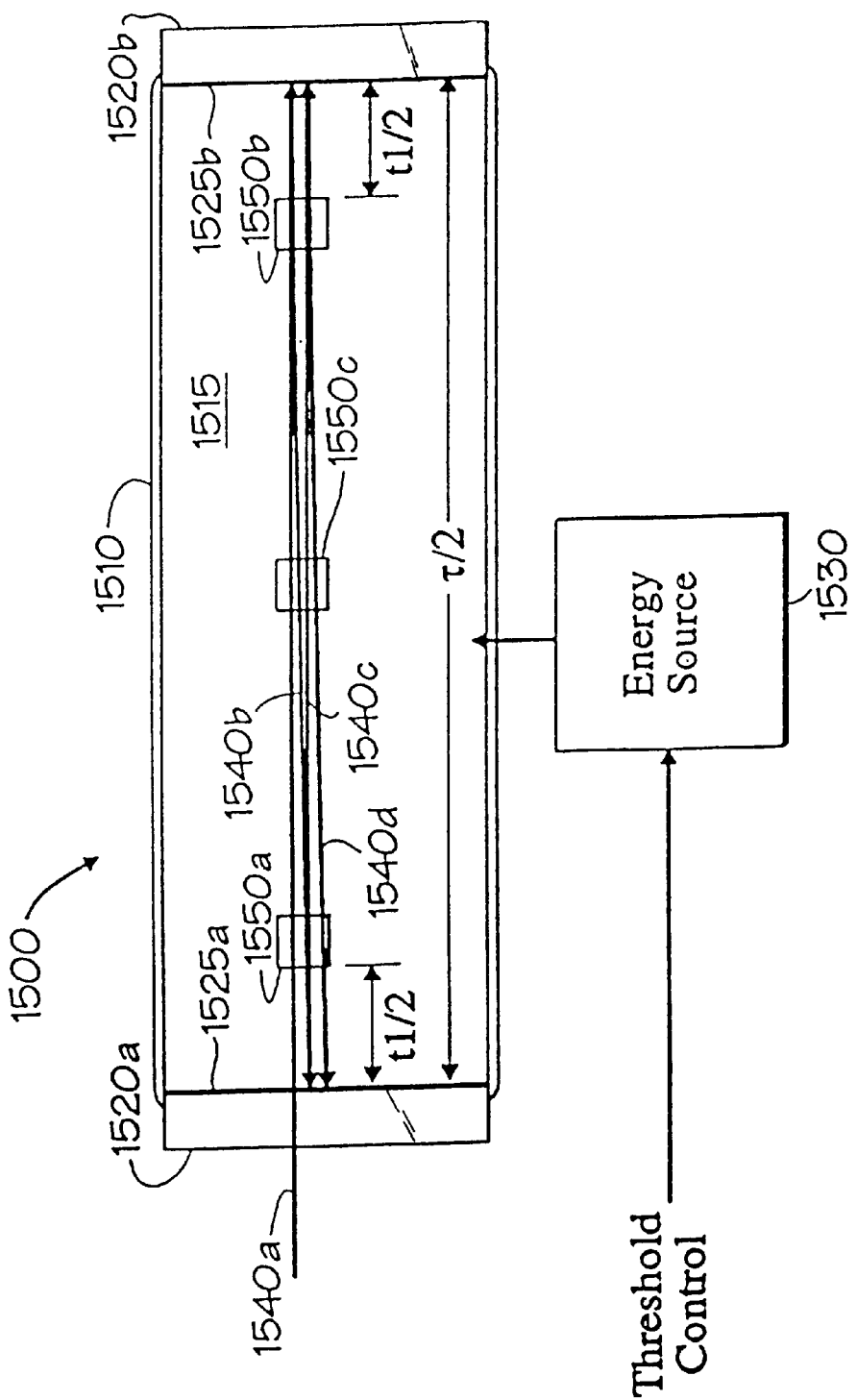
FIG. 15 is a cross-sectional view of a gaseous imaging chamber, according to the invention.

FIG. 15 is a view of a gas imaging chamber 1500, suited to processing a modulated beam 1540a (see, e.g., 1440a and 1440b of FIGS. 14A and 14B, respectively) to produce a visible image. The imaging chamber 1500 is formed inside a transparent outer shell 1510, including transparent ends 1520a, 1520b. The shell is filled with an imaging gas 1515 (preferably an inert gas, e.g., helium, neon, argon, xenon, etc.). Two parallel front-surface mirror finishes 1525a and 1525b are provided on the inside surfaces of the transparent ends 1520a and 1520b, respectively. One of the mirror finishes 1525a is of the partially transmissive type, permitting a light beam to enter the imaging chamber therethrough. The distance between the mirror finishes 1525a and 1525b is one half the distance traveled by a beam of light in the imaging gas over a time interval "T". The time interval "T" corresponds to the time interval "T" between (pairs of) light pulses on the modulated beam 1540a (refer to the discussion hereinabove with respect to FIGS. 14a and 14b). The modulated beam enters the chamber 1500 at an angle perpendicular to the partially transmissive mirror finish 1525a. The beam passes through the gaseous medium 1515 and is reflected off of the opposite mirror finish 1525b in a first reflected beam 1540b. This first reflected beam 1540b then passes back through the gaseous medium 1515 and is reflected off of the first mirror finish 1525a in a second reflected beam 1540c. This second reflected beam 1540c passes through the gaseous medium 1515 again, and is once again reflected off of the second mirror finish 1525b in a third reflected beam 1540d, etc.. The reflected beams 1540b, c,d are shown diverging slightly only for the purpose of illustrative clarity. In fact, the reflections actually occur back and forth along the same path. Since the beam reflection path within the chamber is exactly one half of the pulse waveform period "T" on the incident beam, subsequent pulse periods on the incident beam will reinforce one another. The pulses (or packets, as described with respect to FIGS. 14a and b) travel through the gaseous medium at the speed of light in the gaseous medium, but depending upon pulse (packet) spacing, will periodically encounter ("collide" with) and reinforce a reflected pulse on a returning (reflected) beam. If the modulated beam 1540a is modulated as described with respect to FIG. 14a, this reinforcement where forward-travelling and reflected pulses meet will occur only at the mirrored ends (1525a,b) of the imaging chamber where packets are "folded" and meet themselves as they reflect. If, however, the modulated beam is modulated as described with respect to FIG. 14b, this pulse reinforcement will occur at positions indicated generally as 1550a and 1550b. If these reinforced pulses have sufficient energy, the gaseous medium will emit photons of light at the point of reinforcement, causing visible spots at locations 1550a and 1550b. The gaseous medium 1515 can be "biased" with an energy source 1530 (in a manner similar to that used in "pumped" lasers), to reduce the amount of pulse (or packet) energy required to cause photon emission in the gaseous medium. Illuminated spots within the chamber 1500 always occur in complementary pairs, equidistant from the center of the chamber. If the time interval "t1" (see FIG. 14B) is exactly one half of "T", then the pair of spots merge to form a single (possibly double-bright) spot 1500c at the center of the chamber. A threshold control governing the amount of electrical "bias" applied to the imaging gas 1515 can be used to control overall image brightness. Beam modulation intensity can also be used to control brightness.

One of ordinary skill in the art will immediately appreciate that the modulated beam 1540a need not be of a visible light wavelength, since it is only necessary that secondary emissions from the imaging gas 1515 provide visible light. Accordingly, the "mirrored" surfaces 1525a and 1525b can be frequency selective, reflecting only the wavelength of the incident beam and transmitting all other wavelengths of light. It will also be readily understood by one of ordinary skill in the art that the embodiment of FIG. 15 is merely representative of one of many different possible physical configurations for a gaseous imaging chamber and that it is within the spirit and scope of the present invention that the physical configuration of the imaging chamber be altered as necessary to fit within the physical constraints of a three-dimensional (volumetric) imaging application.

Figure 16:
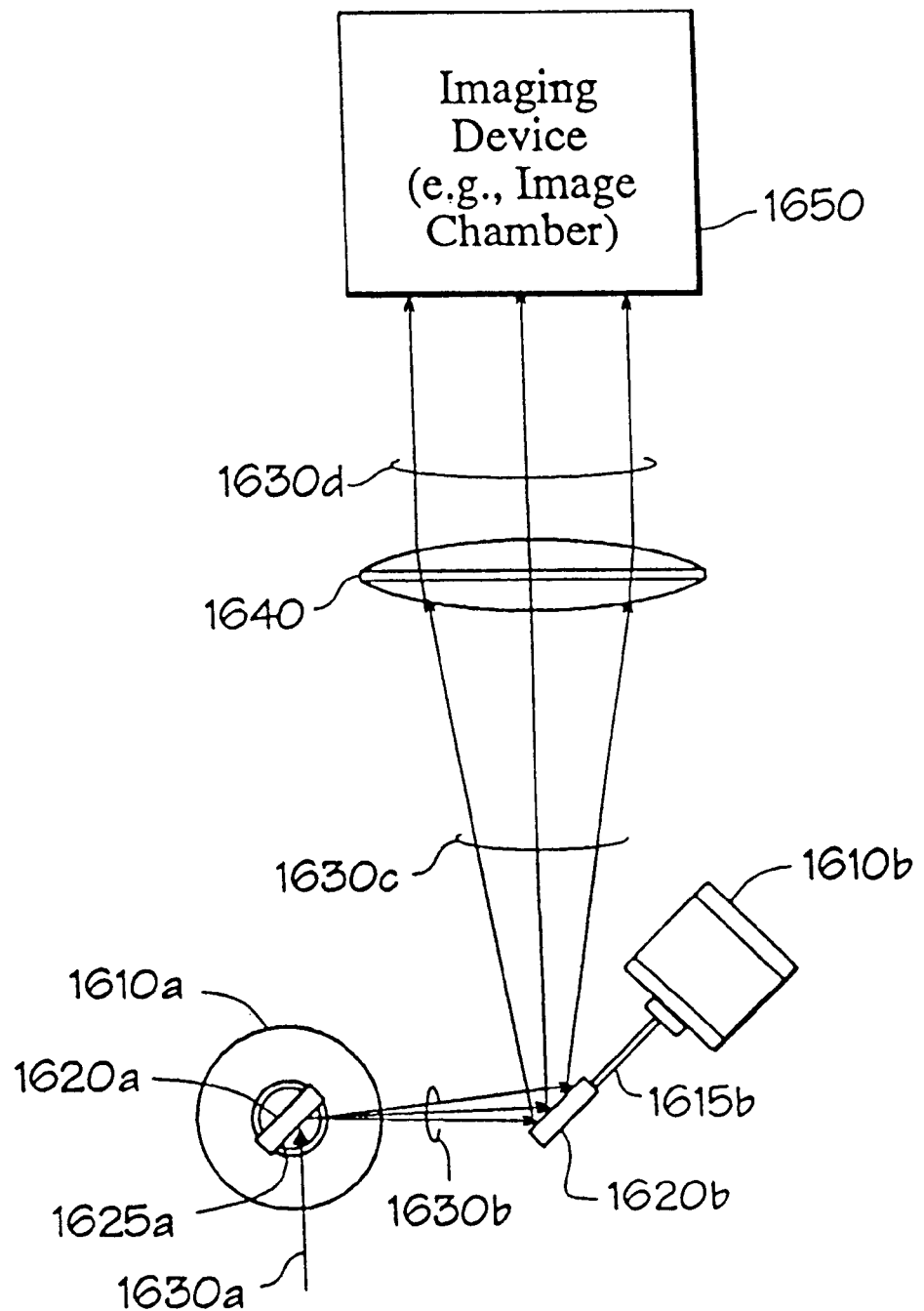
FIG. 16 is a diagram illustrating two-dimensional scanning of a beam for imaging in an imaging device such as an image chamber, according to the invention.

FIG. 16 is a diagram of apparatus suited for scanning a modulated beam to produce a complete, viewable three-dimensional image in a gaseous imaging chamber. A pair of frontal surface mirrors 1620a and 1620b are affixed to the shafts of a pair of galvanometers 1610a and 1610b, respectively, such that one galvanometer 1610a controls the angular position of one of the mirrors 1620a and the other galvanometer 1610b controls the angular position of the other mirror 1620b. An incident beam strikes the first mirror 1620a. The first galvanometer 1610a modulates the position of the first mirror 1620a such that the incident beam 1630a is deflected in one linear dimension (X) and reflects as a one-dimensional "scanning" beam 1630b. The one-dimensional scanning beam 1630b then strikes the second mirror 1620b. The second galvanometer 1610b and mirror 1620b are positioned such that angular motion of the second mirror 1620b causes further scanning of the one-dimensional scanning beam 1630b in a second linear dimension (Y), thereby producing a resultant two-dimensional scanning beam 1630c. This two-dimensional scanning beam 1630c is divergent, however. That is, rays of the beam 1630c form an expanding cone shape as they travel away from the deflection apparatus (galvos and mirrors). In order to convert the rays of the divergent two-dimensional scanning beam 1630c into a parallel-ray two-dimensional scanning beam 1630d, a converging optical element is used. (Although shown as a bi-convex lens, more elaborate converging optical arrangements may be employed. Such arrangements are well known in the art.) Intensity/color modulation of the incident beam controls the intensity/color of the resultant image. Further, high-speed pulsed modulation of the beam may be employed to provide "Z-axis" (depth) control as described hereinabove with respect to FIGS. 14A, 14B and 15.

The parallel-ray scanning beam is directed into an imaging device (e.g., active multi-planar optical element or gaseous imaging chamber) to produce a three-dimensional image. Three-dimensional image formation using an active multi-planar optical element has already been described hereinabove with respect to FIG. 13. Three-dimensional image formation in an imaging chamber is now describe with respect to FIG. 17.

Figure 17:
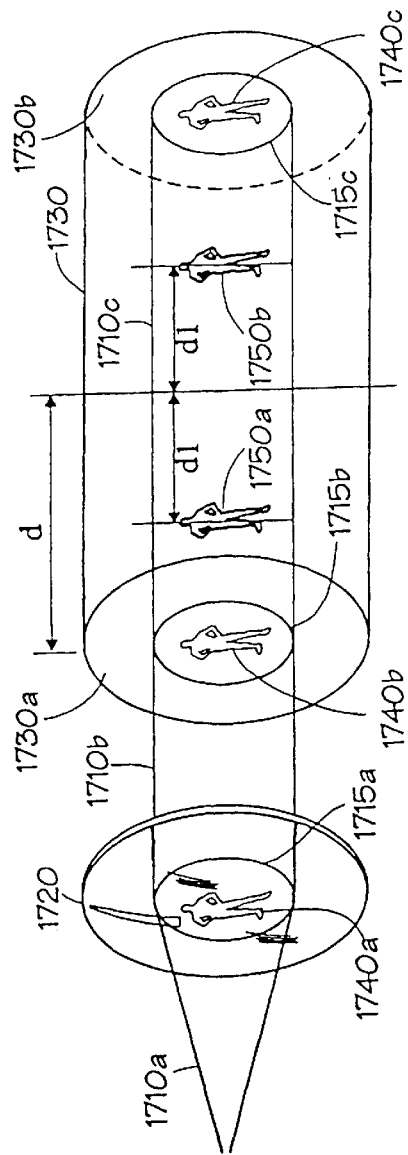
FIG. 17 is a diagram illustrating three-dimensional image formation in a gaseous imaging chamber, according to the invention.

FIG. 17 is a diagram illustrating formation of a three-dimensional image in a gas-filled imaging chamber 1730. A modulated, divergent, two-dimensional scanning beam 1710a is converged with a converging optical element 1720 to produce a parallel-ray modulated scanning beam 1710b. Outline 1715a indicates the extent of the scanning beam 1710a at the converging optical element 1720, and a two-dimensional projection 1740a of the image to be formed at a given depth in the imaging chamber 1730 is shown on the converging optical element 1720 for illustrative purposes. Similarly, outlines 1715b and 1715c represent the extent of the parallel-ray scanning beam 1710b at near and far mirrored surfaces 1730a and 1730b of the chamber, respectively. Two-dimensional projections 1740b and 1740c are also shown at the near and far mirrored surfaces 1730a and 1730b, respectively, of the imaging chamber 1730 for illustrative purposes only. Assuming that the source beam (1710a) is modulated as described with respect to FIG. 14b to cause pulse reinforcement within the imaging chamber 1730, a pair of viewable images 1750a and 1750b in the shape of the two-dimensional scan (as shown in projection as 1740a,b,c) are formed in the chamber 1730, space equidistantly ("d1") from the centerline of the chamber. By changing the modulating pulse pattern on the scanning beam and by simultaneously altering the two-dimensional scanning pattern, different scanning patterns (and different corresponding visible patterns) will be formed at different depths in the imaging chamber, thereby permitting full three-dimensional image generation.

Since the three-dimensional images are always produced in pairs, only one of the images is likely to be used. It is possible to "hide" the redundant image either by blocking that portion of the imaging chamber, or by applying bias potential to the imaging gas only in the vicinity of the desired image.

It is also possible to eliminate the extraneous "mirror" image by replacing the first mirrored surface (1730a) and by lengthening the repetition period of the scanning beam. However in doing this, the bias threshold becomes much harder to establish.

Figure 18:
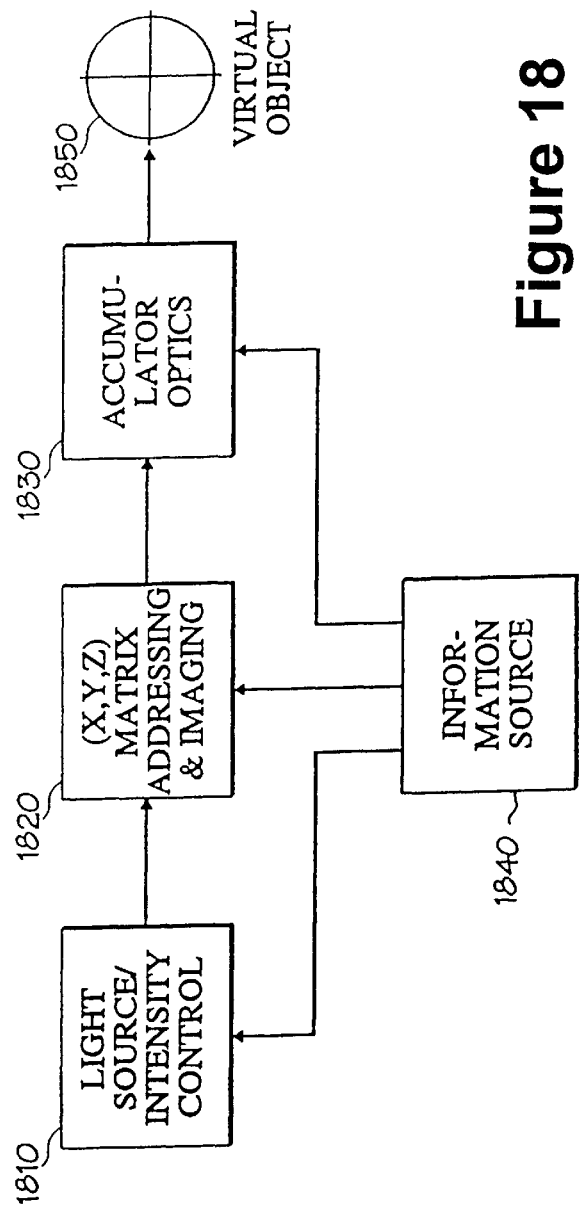
FIG. 18 is a generalized block diagram of a technique for forming three-dimensional volumetric images, according to the invention.

FIG. 18 is a block diagram showing a generalized system for three-dimensional volumetric imaging. (This, of course, excludes passive image generation techniques such as simple film holography). In order to generate three-dimensional volumetric images it is necessary to provide a light source and intensity control 1810 (see, e.g., the apparatus described with respect to FIG. 9). The light source is then processed in a functional block 1820 to provide three-dimensional addressability and to "precipitate" or form a visible image. Optional accumulator (image translation) optics 1830 (see, e.g., FIGS. 7A and 7B) can then be used to reposition the image to a desired position, producing a virtual three-dimensional object 1850 in space. An information source 1840 (e.g., image computing apparatus) provides control of the various parts of the system.

Based upon the techniques described hereinabove and assuming a laser illumination source, a table of techniques suited to three-dimensional volumetric image generation is set forth below in TABLE 1 (each row across the table represents a given combination of X, Y and Z addressing and image formation techniques):

TABLE 1

Volumetric Imaging Combinations

| X addressing | Y addressing | Z addressing | Image formation |
|---|---|---|---|
| Galvo/mirror | Galvo/mirror | Beam modulation | Imaging Chamber or Passive MOE (Imaging mode) |
| AOBD | Galvo/mirror | Beam modulation | (same as above) |
| Galvo/mirror | AOBD | Beam modulation | (same as above) |
| AOBD | AOBD | Beam modulation | (same as above) |
| Galvo/mirror or AOBD | Galvo/mirror or AOBD | Active MOE (FIGS. 11a,13) | Active MOE (FIGS. 11a,13) |
| Galvo/mirror or AOBD | Active MOE#1 (reflective) | Active MOE#2 (FIGS. 11a,13) | Active MOE#2 (FIGS. 11a,13) |

TABLE 1, above, lists some exemplary ones of the many possible combinations suggested by the techniques described hereinabove. It is by no means comprehensive, and it is fully within the spirit and scope of the invention that the above-described techniques be used in any suitable combination to achieve the desired result. For example, the MOE units can be parabolic rather than of flat as well as transparent, opaque or reflective. The table set forth above (TABLE 1) describes exemplary "x,y" scanning (addressing) techniques, as well as "x,y,z" scanning (addressing) techniques.

FIGS. 19–34

Frontal Surface Mirrors

There have been discussed, hereinabove, a number of techniques for "x,y" (single) or "x,y,z" (multiple) scanning of (or producing) an image into a reflector assembly to create a "single" or "multi-planar" image field, respectively. An "x,y" scanning technique that has utility in conjunction with the present invention can be found in video displays.

There have been discussed, hereinabove, a number of techniques for displaying a three-dimensional volumetric image by providing an optical (image translation) element (e.g., chamber) capable of spatially-translating a three-dimensional image and, from a first position, directing a three-dimensional image at the optical element and, at a second position, spatially removed from the first position, viewing the spatially-translated three-dimensional image. In an embodiment of the invention, the optical element comprises two concave reflectors which are facing one another. Other embodiments, such as using a lens atop a mirror, and such as creating "virtual" (holographic) optical image-translation elements are discussed in greater detail hereinbelow.

Figure 19A:
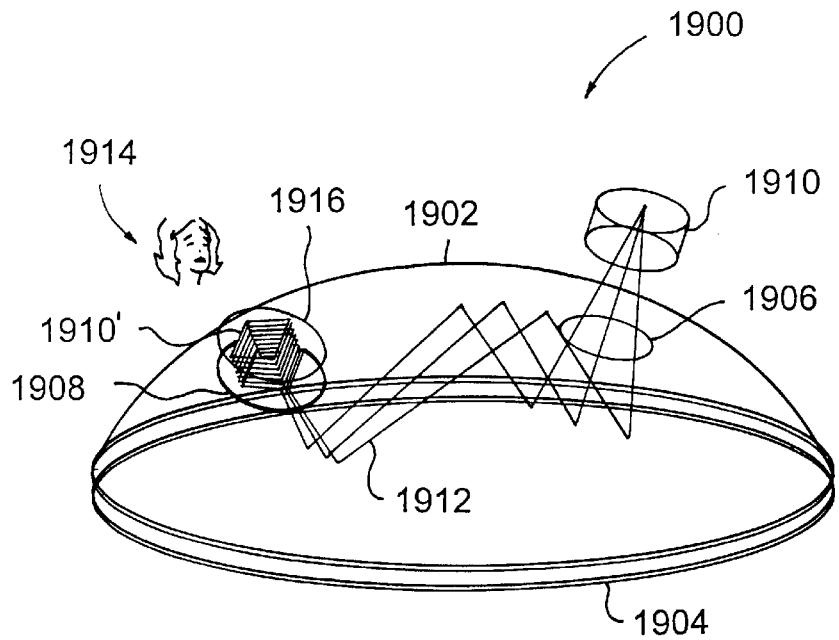
FIG. 19A is a partially schematic, partially perspective view of an embodiment of an image-translating chamber, according to the present invention, employing a lens and a mirror.

FIG. 19A illustrates an embodiment of an image translation chamber 1900 wherein a concave (preferably parabolic) reflector 1902 is disposed atop a mirror 1904, preferably a frontal surface mirror having its reflective surface facing the interior of the concave reflector 1902. A chamber is formed in the volume of space (cavity) located between the concave reflector 1902 and the frontal surface mirror 1904. The concave reflector 1902 has an input aperture 1906 and an output aperture 1908. The output aperture 1908 is preferably diametrically-opposed to the input aperture 1906, and both apertures are thus necessarily "off center" with respect to the concave reflector 1902.

An (input) image 1910 is caused to be formed at (e.g., directed at) the input aperture 1906 by the "x,y" (single) or "x,y,z" (multiple) scanning techniques described hereinabove with respect to TABLE 1. The input image 1910 enters the image translation chamber 1900 via the input aperture 1906, is translated within the chamber as indicated by the reflecting rays 1912, and exits the output aperture 1908 of the image translation chamber 1900, whereat the translated (output) image 1910' can be viewed by a viewer 1914 (shown as a head, not to scale). The input image 1910 is shown as a cylinder to indicate multi-planar scanning, and the output image 1910' is shown to have a multi-planar image. A viewing area (range of positions at which the viewer can view the output image) is indicated by the line 1916, and is generally restricted to those positions at which the viewer is looking through the output aperture 1908.

Figure 19B:
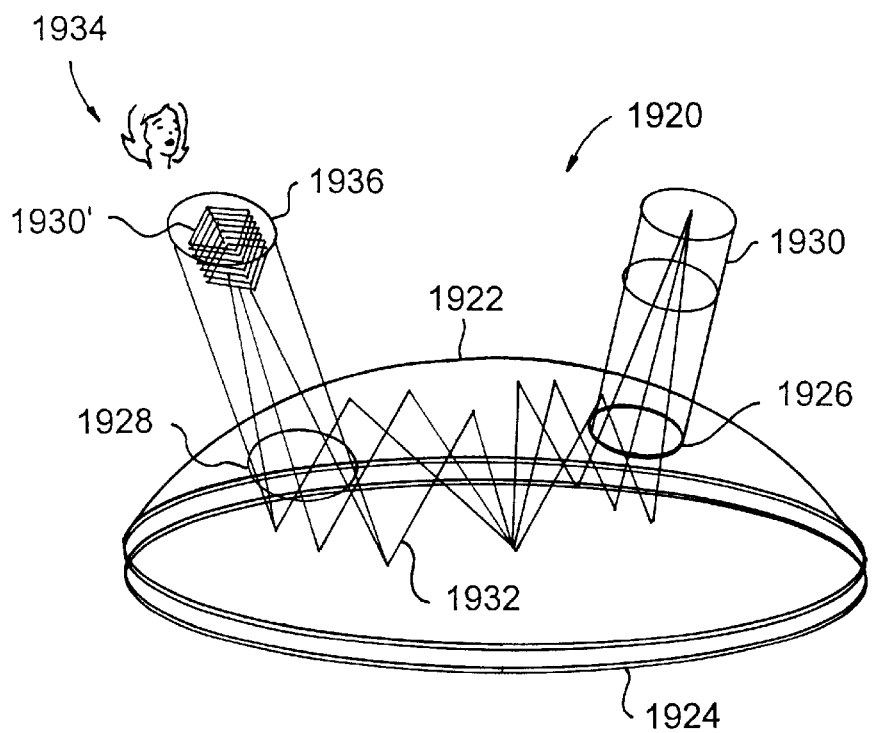
FIG. 19B is a partially schematic, partially perspective view of another embodiment of an image-translating chamber, according to the present invention, employing a lens and a mirror.

FIG. 19B illustrates an image translation chamber 1920 similar to the image translation chamber 1900 of FIG. 19A—namely, having a parabolic reflector 1922 with an input aperture 1926 and an output aperture 1928 disposed atop a frontal surface mirror 1924. An image 1930, provided at some distance from (in front of) the input aperture 1926 is translated within the chamber (see representative rays 1932) and exits the output aperture 1928 whereat the translated image 1930' can be viewed by a viewer 1934 (shown as a head, not to scale). The input image 1930 is shown as a cylinder to indicate multi-planar scanning, and the output image 1930' is shown to have a multi-planar image. A viewing area is indicated by the line 1936 and, as in the embodiment of FIG. 19A, is generally limited to positions whereat the viewer can look into the chamber through the output aperture 1928.

Generally, the embodiments of FIGS. 19A and 19B function in a manner similar to opposing concave reflecting saucers (104 and 106) described hereinabove.

Figure 19C:
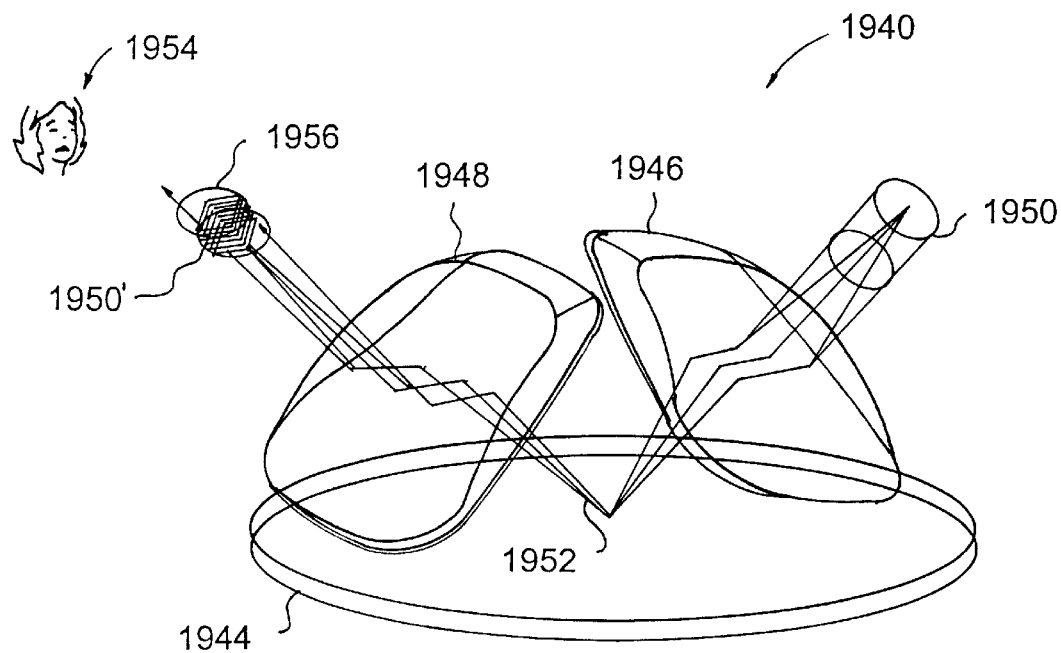
FIG. 19C is a partially schematic, partially perspective view of another embodiment of an image-translating chamber, according to the present invention, employing lens segments and a mirror.

FIG. 19C illustrates an image translation chamber 1940 wherein two radial sector parabolic lenses 1946 and 1948 are used instead of the concave reflector (e.g., 1902, 1922) and the input and output apertures (e.g., 1906, 1908) of the embodiments described with respect to FIGS. 19A and 19B. By using lenses rather than an opaque reflector, it is evident that input and output apertures are not required. The two radial sector parabolic lenses 1946 and 1948 are disposed atop a frontal surface mirror 1944 at diametrically opposed positions, and are inclined towards one another as shown. An input image 1950 (shown as a cylinder) enters the "input" radial sector parabolic lens 1946, is translated in a space between the two lenses 1946 and 1948 and the frontal surface mirror 1944, and exits the "output" radial sector parabolic lens 1948 whereat the translated output image 1950' is viewable by a viewer 1954. Representative rays 1952 are shown. An image viewing area is indicated by the line 1956, and is generally limited to positions whereat the viewer is able to look through the lens 1948, albeit at a substantial distance therefrom.

Figure 19D:
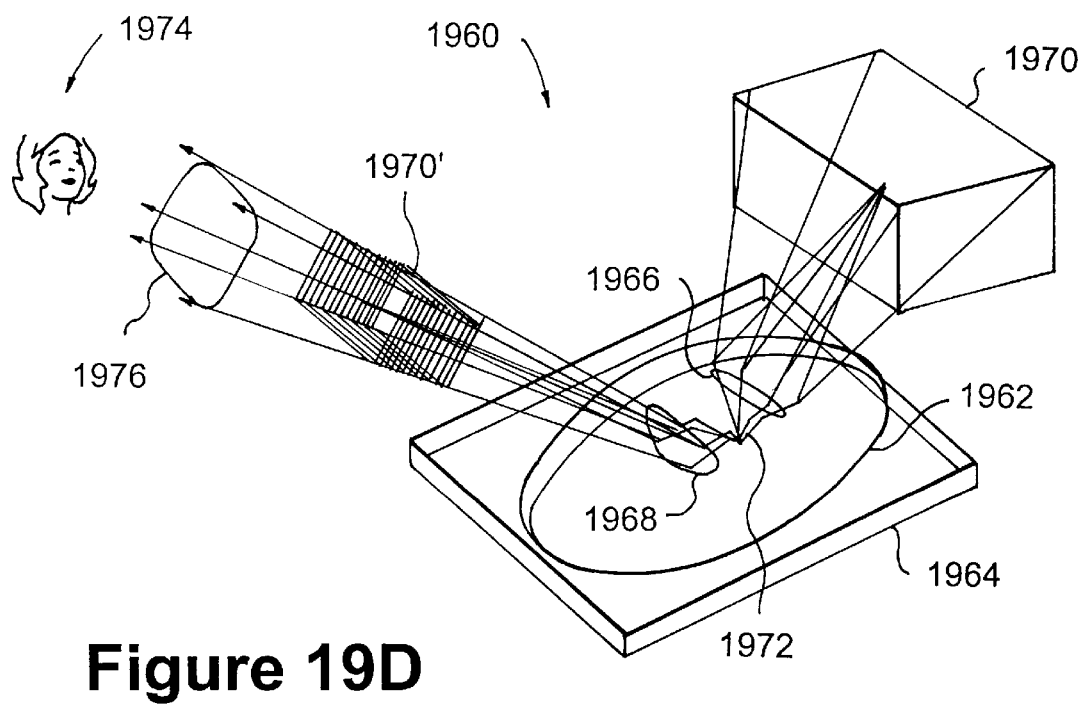
FIG. 19D is a partially schematic, partially perspective view of another embodiment of an image-translating chamber, according to the present invention, employing a lens and a mirror.

FIG. 19D illustrates an image translation chamber 1960 wherein a single plano-convex lens 1962 is used instead of the two radial sector parabolic lenses (1946, 1948) of the embodiment described with respect to FIG. 19C. The plano-convex lens 1962 is disposed with its flat side against the mirrored surface of a frontal surface mirror 1964. Evidently, in this embodiment and in the embodiments of FIGS. 20A and 20B, a true "chamber" having a three-dimensional cavity is not formed, as in the previous embodiments, but the term chamber will be applied for consistency of description.

An (input) image 1970 enters the lens 1962 at an input region 1966 thereof. The input region 1966 is analogous to the input aperture (1906) of a parabolic reflector (1902). The image is translated by the cooperative action of the lens 1962 and the mirror 1964, as indicated by the representative rays 1972, and exits the lens 1962 at an output region 1968 (analogous to the output aperture 1908 of a parabolic reflector 1902) as an output image 1970' viewable by a viewer 1974. A viewing area is indicated by the line 1976, and is generally limited to positions from which the viewer can look through the output region 1968.

In the embodiments described above, with respect to FIGS. 19A, 19B, 19C and 19D, a multi-planar (x,y,z) image can be generated by any of the techniques described hereinabove (e.g., with respect to TABLE 1), and can also be generated by a three-dimensional (volumetric) imaging device such as the chamber described in the aforementioned BATCHKO patent. A single planar (x,y) image can be generated on a flat screen.

Using MOE's

The embodiments described above are generally directed to using an image-translation device (e.g., chamber) to move (translate) a three-dimensional (volumetric) input image from one position to another, for viewing by a viewer. In the embodiments described with respect to FIGS. 20A and 20B, it is described how an additional dimension (e.g., z-axis depth) can be added to the input image during the process of translating the input image from an input position to an output position. The techniques described are especially useful for adding a third (e.g., depth) dimension to a two-dimensional (e.g., "x-y" scanned, or inchoate three-dimensional) image, and are also useful in the context of adding a virtual fourth dimension (e.g., modulation) to a three-dimensional input image.

Figure 20A:
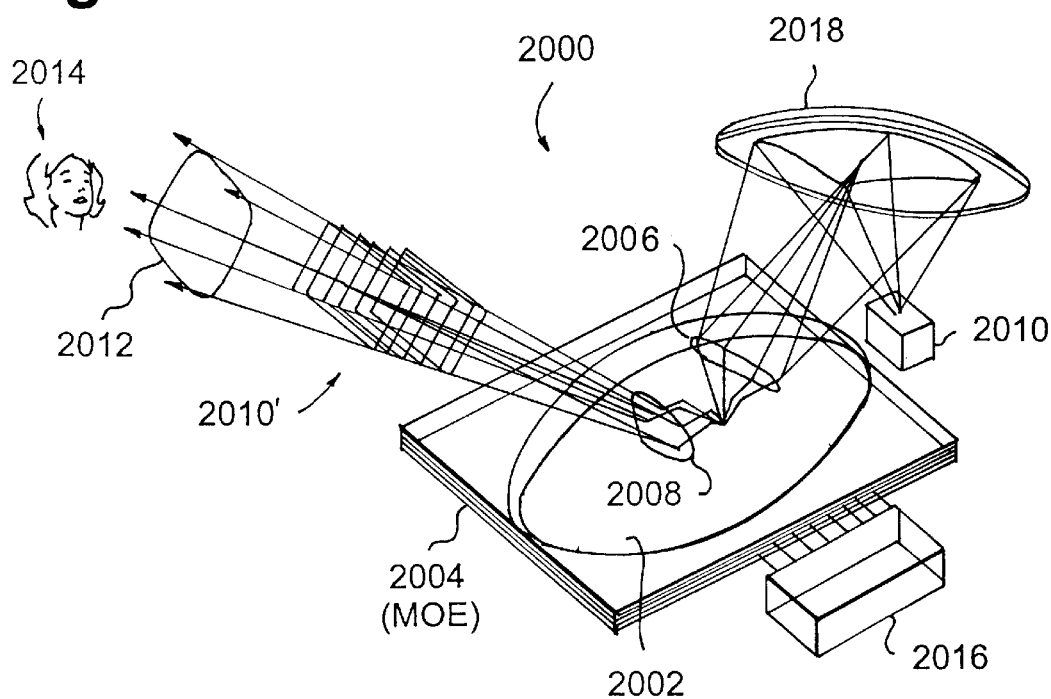
FIG. 20A is a partially schematic, partially perspective view of an embodiment of an image-translating chamber, according to the present invention, employing a lens and a multi-planar optical element (MOE).

FIG. 20A illustrates an embodiment 2000 of the invention employing a plano-convex lens 2002 in a manner similar to the embodiment of FIG. 19D. However, in this case, the plano-convex lens 2002 (compare lens 1962 of FIG. 19D) is disposed on a multi-planar optical element ("MOE") 2004, rather than on a frontal surface mirror (compare 1964). A third (z) dimension is added by the MOE to an image that is only scanned in two (x,y) dimensions such as by using a screen. In this example, the (input) image 2010 is shown as first being projected onto a concave, opaque white screen 2018 in which the concavity of the screen 2018 faces an input region 2006 of the plano-convex lens 2002 (compare input region 1966 in FIG. 19D). The image 2010 is translated, as indicated by the rays 2012 and exits an output region 2008 (compare output region 1968 in FIG. 19D) of the lens 2002 as a translated (output) image 2010' which is viewable by a viewer 2014. The input image 2010 could be aimed directly at the input region 2006 of the lens 2002 rather than first being revealed on the screen 2018.

In this embodiment, the multi-planar optical element ("MOE") 2004 is preferably of the "active" type of MOE discussed with respect to FIG. 11a. In this manner, a third (z) dimension can be added to a two dimensional (x,y) image during its translation in the translation chamber formed by the lens 2002 and the MOE 2004. In the case of using an active MOE, a z-axis driver 2016 is employed to selectively make layers of the MOE 2004 reflective and transmissive. It is within the scope of this invention that the MOE 2004 can be disposed atop a frontal surface mirror (not shown). A viewing area is indicated by the line 2012.

Figure 20B:
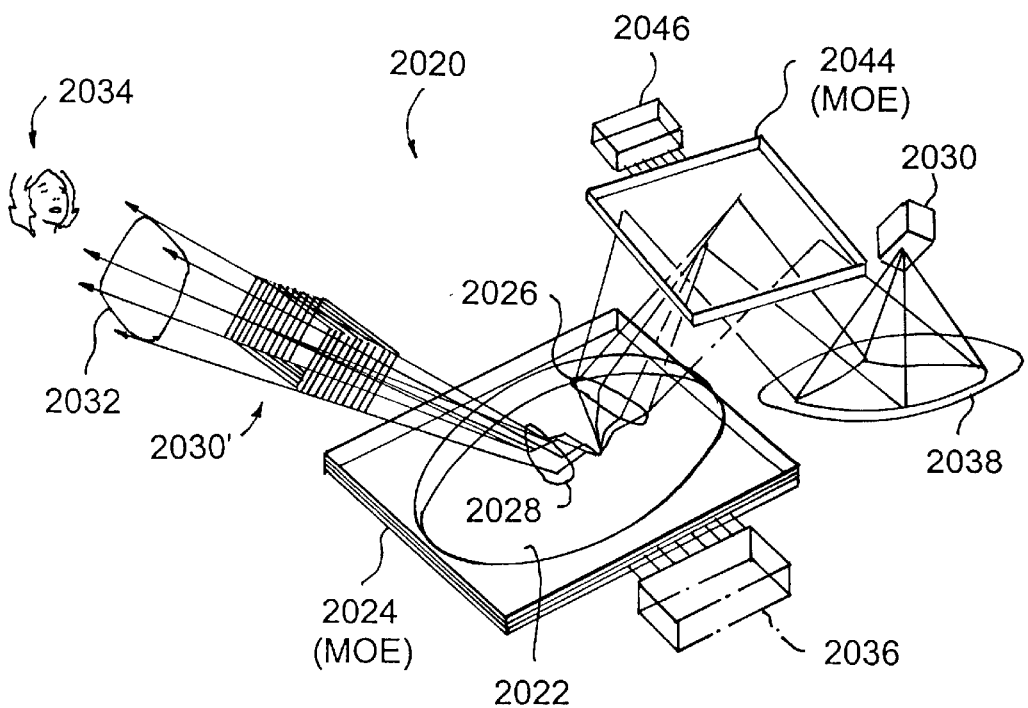
FIG. 20B is a partially schematic, partially perspective view of another embodiment of an image-translating chamber, according to the present invention, employing a lens and a multi-planar optical element (MOE).

FIG. 20B illustrates an embodiment 2020 of the invention employing a plano-convex lens 2022 disposed atop an MOE 2024 in a manner similar to the embodiment of FIG. 20A. An image enters an input region 2026 of the lens 2022 and exits an output region 2028 of the lens to be viewed as a translated output image 2030 by a viewer 2034. However, in this case, the number of planes (for the image being translated) is doubled by interposing a second MOE 2044 between the input image 2030 and the lens 2022. Each of the MOE's 2024 and 2044 is monolithic and is driven by an associated z-axis scanner driver 2036 and 2046, respectively. A concave, opaque white screen 2038 (compare 2018 of FIG. 20A) can be interposed between the input image and the MOE 2044. Generally, in the embodiments of FIG. 20A and 20B, the screens (2018, 2038) serve to "reveal" a two-dimensional image and to "fold" the respective ray paths through the respective image translation chamber so the apparatus can be efficiently housed. Examples of housings for containing the apparatus of this invention are described hereinbelow. A viewing area is indicated by the line 2032.

In the exemplary image translation chambers described with respect to FIGS. 19A, 19B, 19C, 19D, 20A and 20B, the view range (the range of angles at which the viewer can perceive the image being translated) is somewhat limited (e.g., 1916, 1936, 1956, 2012, 2032), in that the viewer must be looking at the output aperture (e.g., 1908), or at the output sectional lens (e.g., 1948), or at the output region of the lens (e.g., 2028) to perceive the output image. Techniques for increasing the range of angles at which a viewer (or multiple viewers) can perceive the translated output image are described hereinbelow.

Fabricating Holographic Optical Elements

In the embodiments described with respect to FIGS. 19A–D and 20A–B, "mechanical" optical elements such as parabolic reflectors, plano-convex lenses, and frontal surface mirrors (alternatively an MOE) are employed to effect image translation from an input location to an output location. In the following embodiments, described with respect to FIGS. 21, 22A, 22B and 23, "holographic" optical elements (HOE's) are employed for image translation in lieu of these "mechanical" optical elements. In this regard, the HOE's can be considered to be "virtual" mechanical optical elements.

According to an aspect of the present invention, the physical optical components of the translation chamber can be replaced with an HOE. As will be evident, by using an HOE in each of a number of systems, a large number of volumetric display system at a lower cost, since relatively expensive optical elements are not required for each iteration of the system. The use of HOE's also creates the opportunity (generally otherwise available with physical optical elements) to fabricate large (e.g., wall-size) holographic optical elements displaying relatively large (e.g., room-size) volumetric displays simultaneously viewable by a large number of viewers at different positions.

Figure 21:
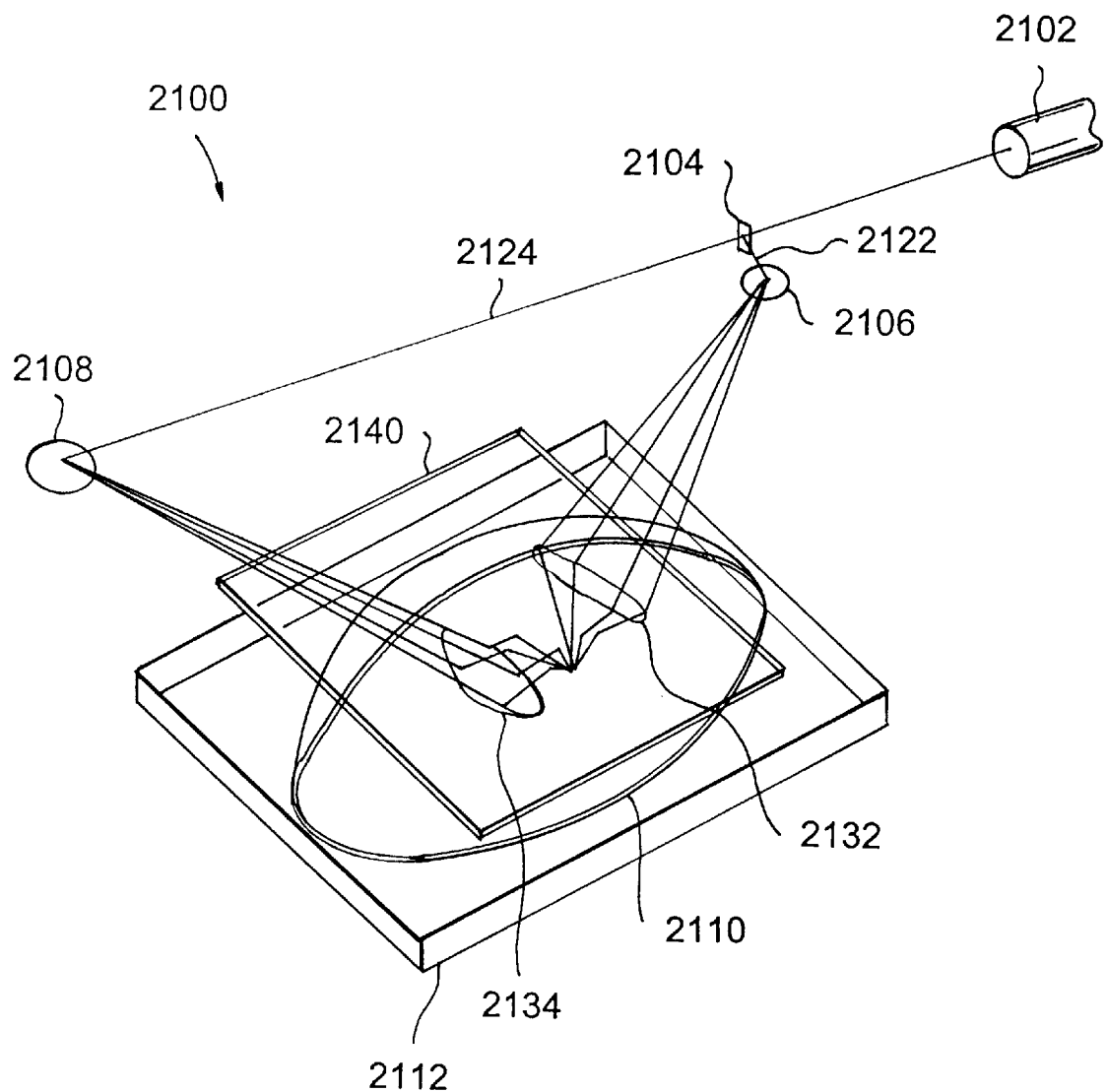
FIG. 21 is a partially schematic, partially perspective view of an embodiment of forming a holographic optical element (HOE), according to the present invention.

FIG. 21 illustrates a technique for making a holographic optical element (film) 2102 that will function in an image translation chamber in a manner analogous to, and in lieu of, the plano-convex lens (1962) and frontal surface mirror (1964) of FIG. 19D (e.g.). This figure essentially a fabrication process that would occur prior to projecting and translating an image, as opposed to a technique of projecting and translating an image. A holographic optical element (HOE) produced by the techniques disclosed herein are readily reproduced, at much less overall expense than procuring a number of precision mechanical optical elements, for use in a number of volumetric display apparatus.

The production and use of a holographic element, as described herein, relates to volumetric imaging, and should not be confused with the projection of a holographic image.

FIG. 21 illustrates an apparatus 2100 comprising a laser 2102, a beam splitter 2104, a diverging means 2106 (such as a convex mirror, or a flat mirror and a lens), another diverging means 2108 (such as a convex mirror, or a flat mirror and a lens), a "reference" plano-convex lens 2110 and a single frontal surface mirror 2112.

The plano-convex lens 2110 is disposed atop the frontal surface mirror 2112 in a manner similar to the embodiment described with respect to FIG. 19D. This is recognizable as apparatus that would be suited to image-translation.

The laser 2102 outputs a beam 2120 which is directed at the beam splitter 2104, which splits the beam 2120 into two beams 2122 and 2124. The beam 2122 is diverted (reflected) and diverged through an first portion 2132 of the lens 2110, wherein said first portion 2132 is analogous to the input region (1966) of the lens, in use. The beam 2124 is diverted (reflected) and diverged through a second portion 2134 of the lens 2110, wherein said second portion 2134 is analogous to the output region (1968) of the lens, in use.

A flat piece of film 2140 suitable for recording holographic images is disposed between the flat face of the lens 2110 and the frontal surface mirror 2112, and records (images, when developed) a pattern of wavefronts interfering with one another as a result of the juxtaposition of the two beams 2122 and 2124 entering the lens through two different positions 2132 and 2134, respectively. In other words, a holographic "picture" of the lens is taken, using coherent laser light. The diverging optics (2106, 2108) diverge the respective beam (2122, 2124) a sufficient amount to "cover" an area of the lens that corresponds to the input and output regions of the "virtual" (holographic) lens, in a single exposure of the film. As will be seen, the film 2140 can be used to translate an image and, as mentioned, is readily reproduced in quantity to fabricate a like quantity of image-translation chambers.

Figure 22A:
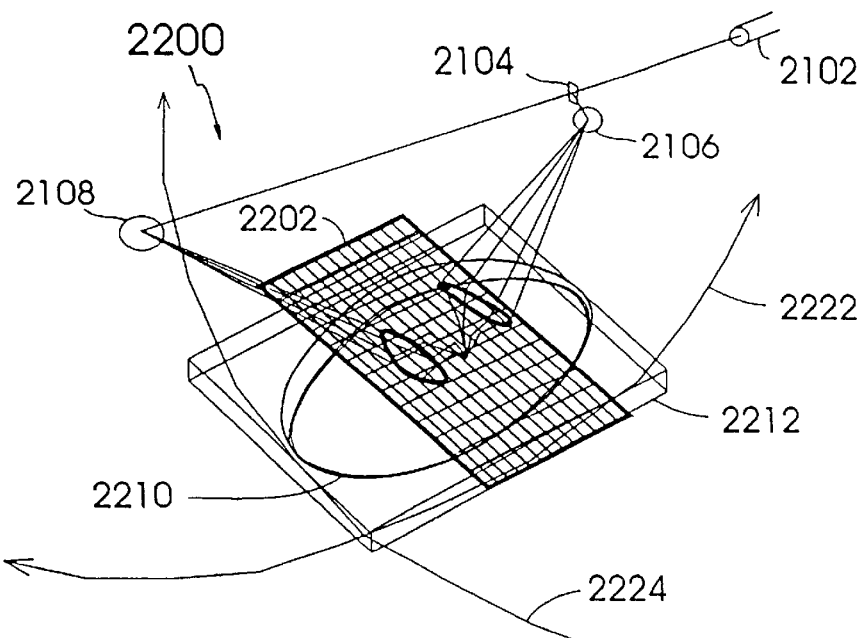
FIG. 22A is a partially schematic, partially perspective view of another embodiment of forming a holographic optical element (HOE), in this case a linear HOE (LHOE), according to the present invention.
Figure 22B:
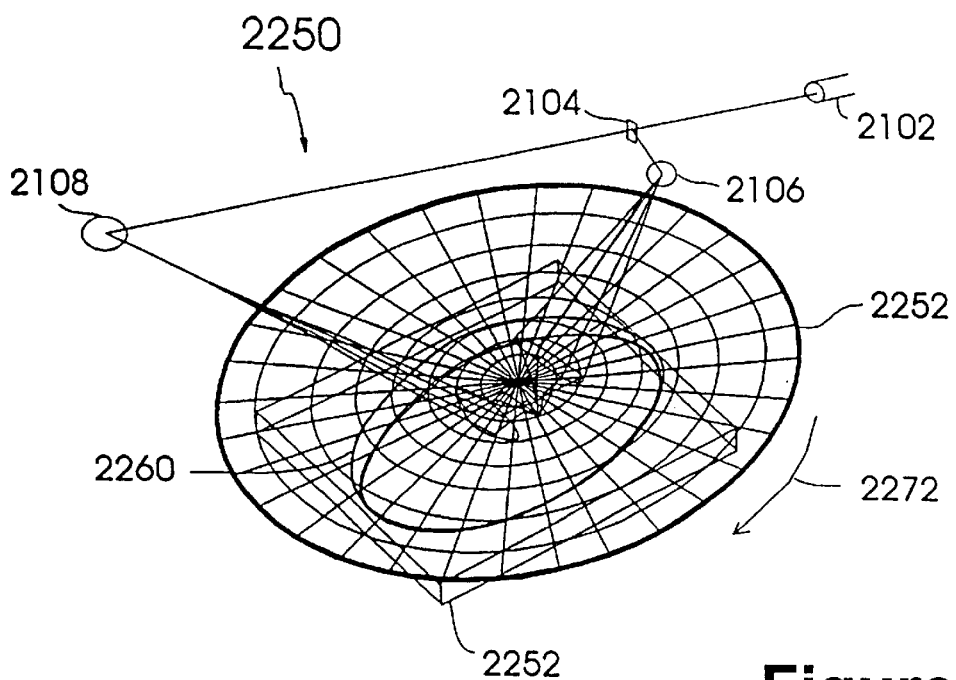
FIG. 22B is a partially schematic, partially perspective view of another embodiment of forming a holographic optical element (HOE), in this case a radial HOE (RHOE), according to the present invention.

It will be appreciated that a holographic optical element (HOE) fabricated in the manner set forth with respect to FIG. 21 will exhibit a limited view range corresponding to the limited view ranges discussed above. FIGS. 22A and 22B illustrate the fabrication of holographic optical elements (HOE's) which, in use, will exhibit a much wider range of view angles. FIG. 22A illustrates a technique for forming a "linear" holographic optical element (LHOE). FIG. 22B illustrates a technique for forming a "radial" holographic optical element (LHOE). Both of these techniques employ a laser, a beam splitter, a diverging means (such as a convex mirror, or a flat mirror and a lens), another diverging means (such as a convex mirror, or a flat mirror and a lens), a "reference" plano-convex lens and a single frontal surface mirror, as described above with respect to FIG. 21, and the numbering of these elements is omitted for illustrative clarity. Whereas the HOE was fabricated with a single exposure of the film in the embodiment of FIG. 21, in the embodiments of FIGS. 22A and 22B, multiple exposures of the film are made.

In FIG. 22A, an apparatus 2200 is illustrated for manufacturing a linear holographic optical element (LHOE) 2202 suitable for use in a translation chamber in lieu of a plano-convex lens and a frontal surface mirror. In this example, the film 2202 (which is interposed between the lens 2210 (compare 2110) and the frontal surface mirror 2212 (compare 2112)), the lens 2210 and the mirror 2212 are moved in discrete steps in parabolic trajectories 2222 and 2224 along each of the x- and y-axes, respectively.

At each position of the lens/film/mirror, an exposure is made (using the laser, beam splitter and diverging optics), as indicated by the matrix of intersections of a first set of parallel lines and a second set of parallel lines shown the film. Each intersection represents taking an exposure of the lens and mirror at a different position, and the matrix of position made in this manner enables a very wide view field when the LHOE 2202 is used in an image-translation chamber. In other words, the resulting LHOE will replicate a plurality of pairs of input apertures (1966) and output apertures (1968), thereby providing a like plurality of viewing ranges which, in aggregate, make for a much wider range of viewing angles than is otherwise possible using the "mechanical" optical elements (i.e., lens 1962 and mirror 1964). Preferably, there are sufficient exposures made at suitable positions to enable a large number of (preferably overlapping) of viewing angles for the viewer (1974).

In FIG. 22B, an apparatus 2250 is illustrated for manufacturing a radial holographic optical element (RHOE) 2252 suitable for use in a translation chamber in lieu of a plano-convex lens and a frontal surface mirror. In this example, the film 2252 (which is interposed between the lens 2260 (compare 2110) and the frontal surface mirror 2262 (compare 2112)), the lens 2260 and the mirror 2262 are moved in discrete steps in a parabolic trajectories 2272 along at least one of the x- and y-axes, and is also rotated in discrete steps in the "plane" of the x- and y-axes.

At each position of the lens/film/mirror, an exposure is made (using the laser, beam splitter and diverging optics), as indicated by the matrix of intersections of a first set of parallel lines and a second set of concentric circular lines shown the film. Each intersection represents taking an exposure of the lens and mirror at a different position, and the matrix of position made in this manner enables a very wide view field when the RHOE 2202 is used in an image-translation chamber. In other words, the resulting LHOE will replicate a plurality of pairs of input apertures (1966) and output apertures (1968), thereby providing a like plurality of viewing ranges which, in aggregate, make for a much wider range of viewing angles than is otherwise possible using the "mechanical" optical elements (i.e., lens 1962 and mirror 1964). Preferably, there are sufficient exposures made at a sufficient number of positions to enable a full circle (360°; three hundred sixty degree) of viewing angles for the viewer (1974).

Using Holographic Optical Elements

Techniques for making HOE's, specifically LHOE's and RHOE's have been described hereinabove with respect to FIGS. 21, 22A and 22B, and the use of these HOE's, as "virtual" optical elements, in lieu of reflectors (e.g., mirrors) and refractors (e.g., lenses) as "physical" optical elements, has been discussed.

Figure 23:
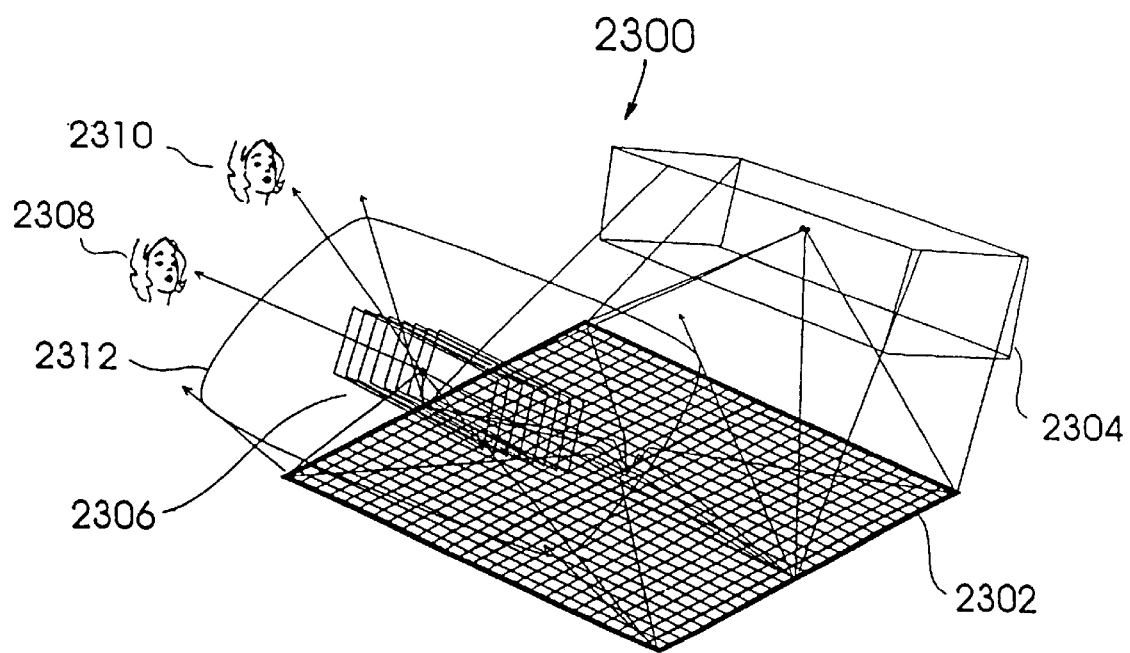
FIG. 23 is a partially schematic, partially perspective view of an embodiment of volumetrically displaying an image of a three-dimensional object, using a holographic optical element (HOE), according to the present invention.

FIG. 23 shows, schematically, a volumetric display system 2300 employing a linear holographic optical element (LHOE) 2302 such as the LHOE 2202 of FIG. 22A to effect a result similar to the embodiment of FIG. 19D.

An input image 2304, shown as a rectangle (rectangular prism) is generated by any suitable "x,y" or "x,y,z" scanning technique, such as the techniques described hereinabove. For example, the BATCHKO display device could be used to create the input image.

The input image 2304 is directed at the LHOE 2302, which translates the image and provides an output image 2306 at a position remote from the input image 2304. In this example, two viewers 2308 and 2310 are shown viewing the translated output image 2306 in a relatively (e.g., in comparison to FIG. 19D) wide view range 2312.

In this and other embodiments employing a HOE in a reflective mode, the HOE (e.g., LHOE) should be disposed on an opaque (e.g., black) or reflective (e.g., silvered) surface (not shown).

Figure 24A:
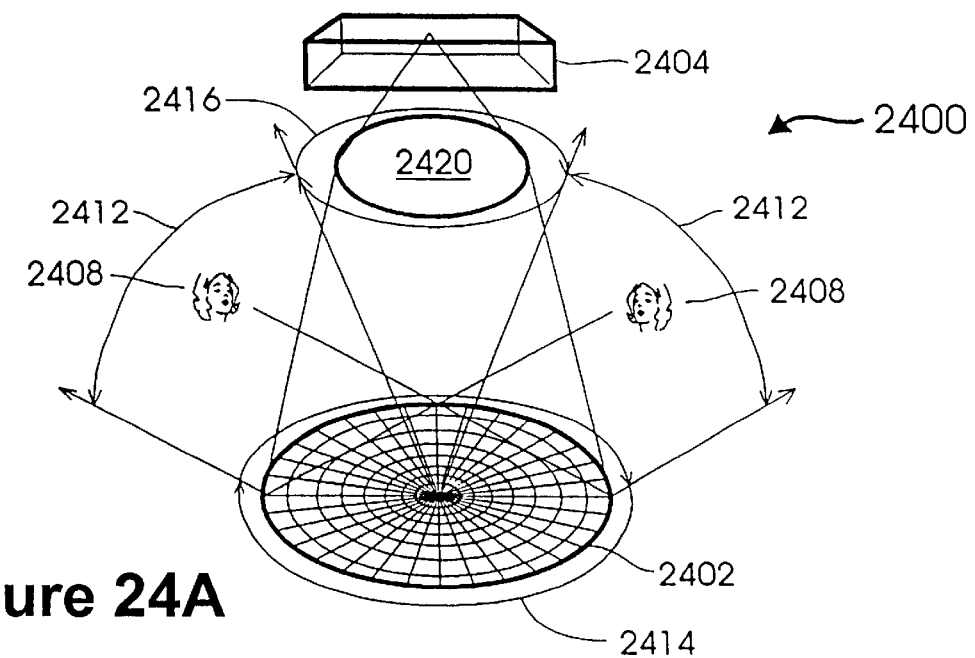
FIG. 24A is a partially schematic, partially perspective view of another embodiment of volumetrically displaying an image of a three-dimensional object, projecting the image from above and using a radial holographic optical element (RHOE) in a reflective mode, according to the present invention.

FIG. 24A shows, schematically, a volumetric display system 2400 employing a radial holographic optical element (RHOE) 2402 such as the RHOE 2252 of FIG. 22B to effect a result similar to the embodiment of FIG. 19D.

An input image 2404, shown as a rectangle (rectangular prism) is generated by any suitable "x,y" or "x,y,z" scanning technique, such as the techniques described hereinabove. For example, the BATCHKO display device could be used to create the input image.

The input image 2404 is directed through a single or compound optical assembly 2420 towards (at) the RHOE 2402, which translates the image and provides an output image at a an annular range of positions remote from the input image 2404. In this example, two viewers 2408 and 2410 are shown viewing the translated output image 2406 at diametrically opposed positions.

As shown in this figure, the view range can be described as having two components—an azimuth component shown by "horizontal" circles 2414 and 2416, each of which encompasses a full circle (360°), and an elevation component 2412 extending from approximately five-to-ten degrees (5–10°) above the "horizon" to approximately eighty degrees (80°) above the horizon. As can be seen, the vertical (elevation) extent of the view range is generally limited only by a conical central region "reserved" for directing the input image at the RHOE. A vertical viewing range 2412 of seventy degrees (70°) in elevation and 360° in azimuth is readily achieved with such a system. In this figure and in FIG. 24B, the components of the system are shown in heavy (thick) lines, and the ray paths are shown in light (thin) lines.

The embodiment of FIG. 24A is considered to be an "overhead" projection embodiment, wherein the input image is projected down onto the HOE (e.g., RHOE) and the HOE functions in a reflective mode. A three-dimensional input image will appear as a three-dimensional output image to viewers looking obliquely down onto the HOE from any azimuth and from a wide (nearly ninety degrees) range of elevations. As in the previous embodiment of FIG. 23, the HOE should be mounted on an opaque or reflective surface (not shown).

Figure 24B:
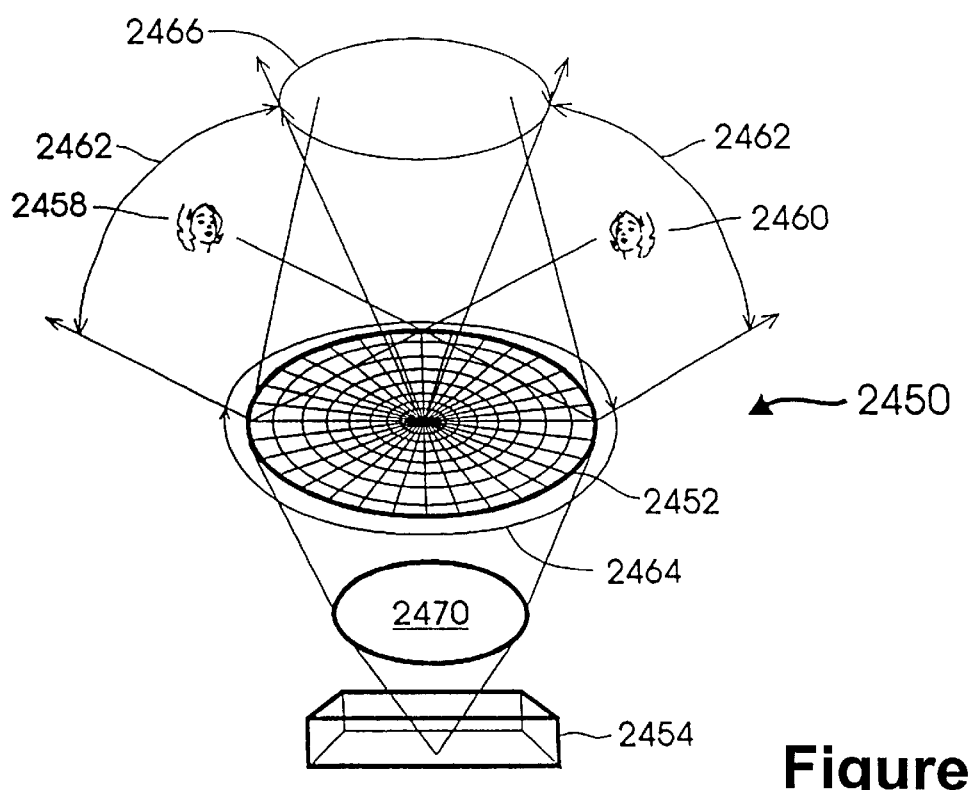
FIG. 24B is a partially schematic, partially perspective view of another embodiment of volumetrically displaying an image of a three-dimensional object, projecting the image from below and using a radial holographic optical element (RHOE) in a transmissive mode, according to the present invention.

FIG. 24B shows, schematically, a volumetric display system 2450 employing a radial holographic optical element (RHOE) 2452 such as the RHOE 2252 of FIG. 22B to effect a result similar to the embodiment of FIG. 19D.

An input image 2454, shown as a rectangle (rectangular prism) is generated by any suitable "x,y" or "x,y,z" scanning technique, such as the techniques described hereinabove. For example, the BATCHKO display device could be used to create the input image.

The input image 2454 is directed through a single or compound optical assembly 2470 at and through the RHOE 2452, which translates the image and provides an output image at an annular range of positions remote from the input image 2454. In this example, two viewers 2458 and 2460 are shown viewing the translated output image at diametrically opposed positions. As shown in this figure, the view range can be described as having two components—an azimuth component (2464, 2466) encompassing a full circle (360°), and an elevation component 2462 extending from approximately five-to-ten degrees (5–10°) above the "horizon" to approximately eighty degrees (80°) above the horizon. Generally, the view range of the embodiment of FIG. 24B is commensurate with the view range of the embodiment of FIG. 24A.

The embodiment of FIG. 24A is considered to be an "underneath" projection embodiment, wherein the input image is projected up through the HOE (e.g., RHOE) and the HOE functions in a transmissive mode. A three-dimensional input image will appear as a three-dimensional output image to viewers looking obliquely down onto the HOE from any azimuth and from a wide (nearly ninety degrees) range of elevations.

Figure 25A:
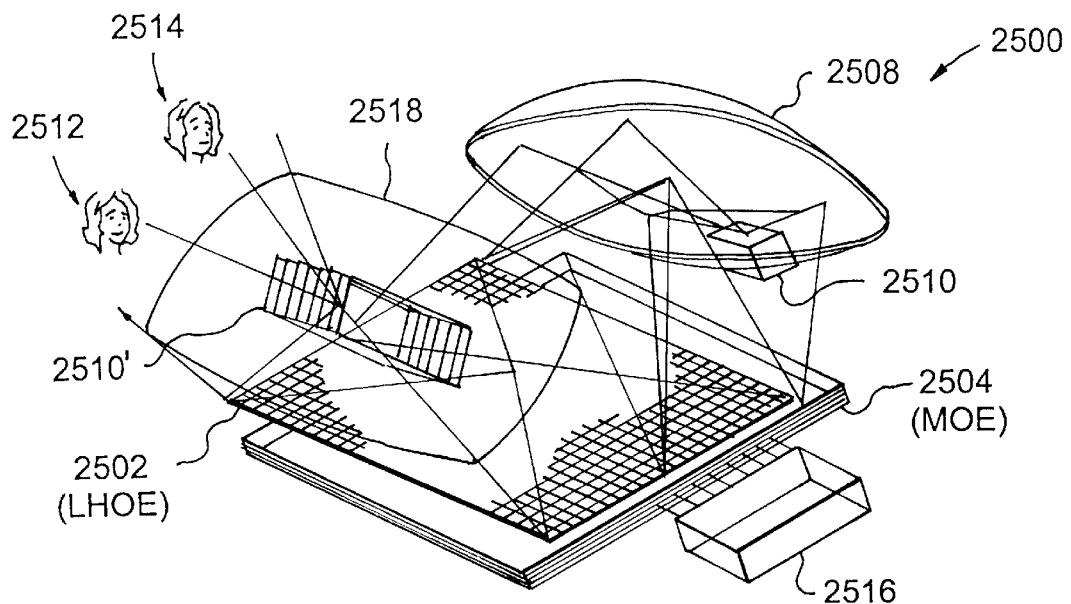
FIG. 25A is a partially schematic, partially perspective view of an embodiment of volumetrically displaying an image of a three-dimensional object, using a multi-planar optical element (MOE) and a holographic optical element (HOE), according to the present invention.
Figure 25B:
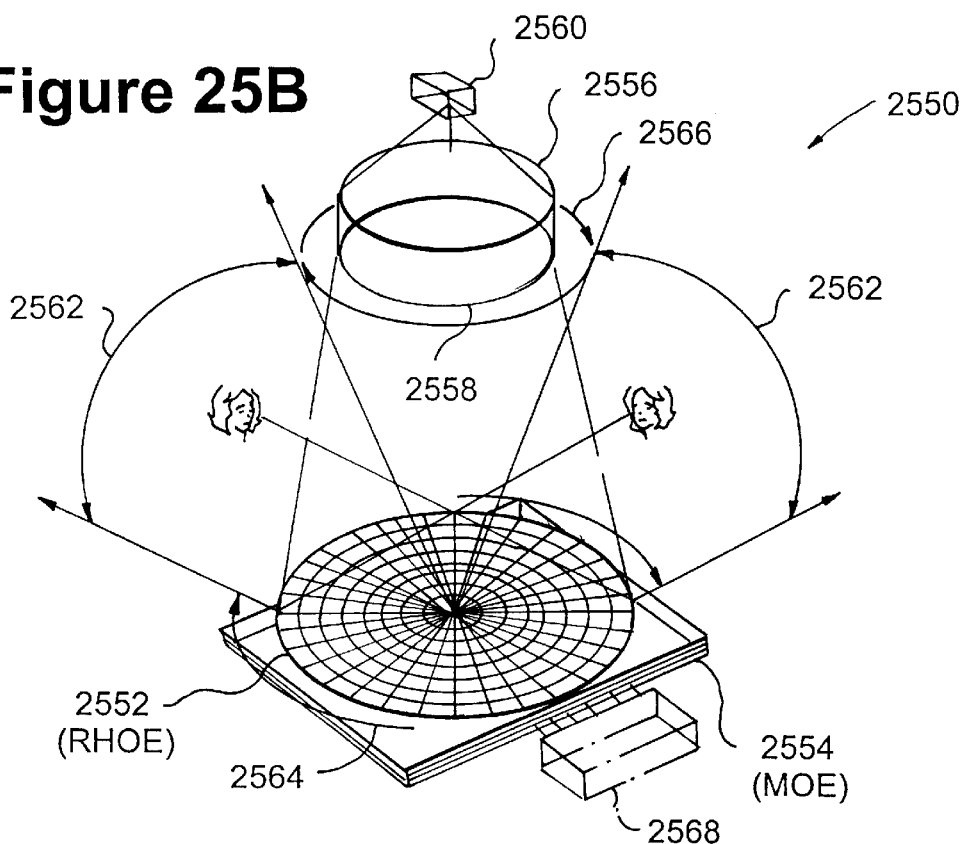
FIG. 25B is a partially schematic, partially perspective view of an embodiment of volumetrically displaying an image of a three-dimensional object, projecting the image from above and using a multi-planar optical element (MOE) and a radial holographic optical element (RHOE) in a reflective mode, according to the present invention.
Figure 25C:
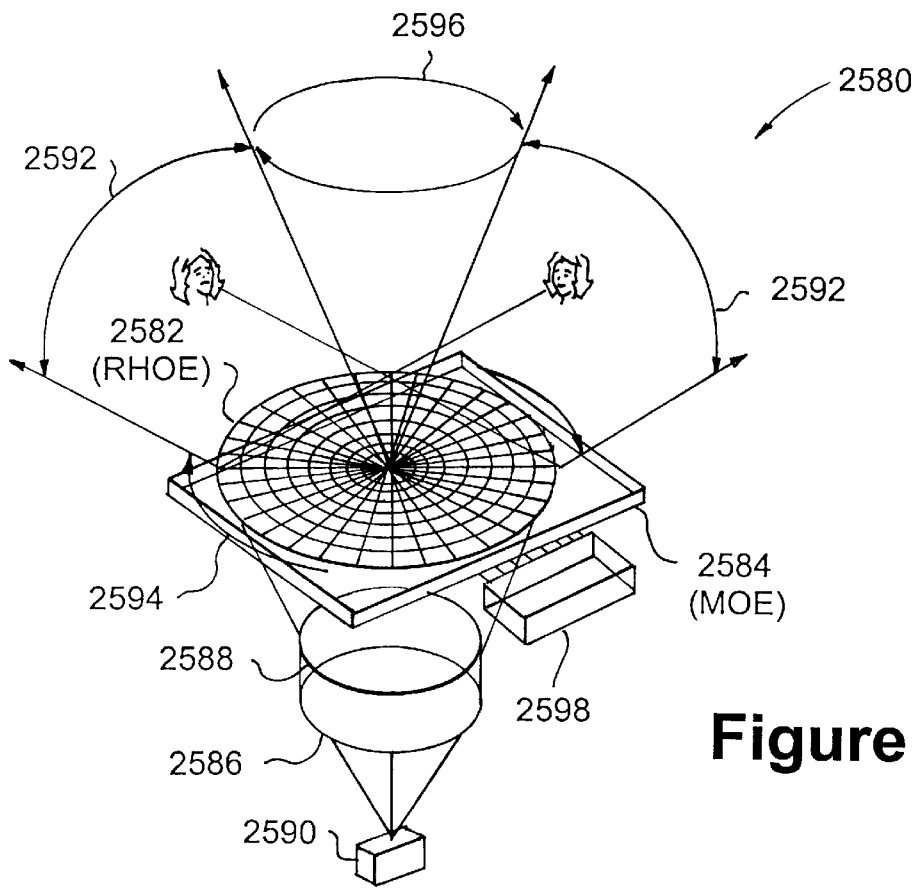
FIG. 25C is a partially schematic, partially perspective view of an embodiment of volumetrically displaying an image of a three-dimensional object, projecting the image from below and using a multi-planar optical element (MOE) and a radial holographic optical element (RHOE) in a transmissive mode, according to the present invention.

FIGS. 25A, 25B and 25C illustrate embodiments of volumetric display apparatus employing HOE'S, in a manner generally similar to the embodiments of FIGS. 23, 24A and 24B, and employing MOE's in a manner generally similar to the embodiments of FIGS. 20A and 20B. Generally, these embodiments employ HOE's fabricated using a plano-convex lens disposed on a frontal surface mirror, and function in a manner analogous to the embodiment described with respect to FIG. 19D.

FIG. 25A illustrates an "overhead" type embodiment 2500 of a volumetric display apparatus functioning in a manner analogous to the embodiment described with respect to FIG. 24A. In this embodiment, the input image is directed at the HOE from "overhead", using beam path folding techniques analogous to those described with respect to FIG. 20A.

The volumetric display system 2500 utilizes a linear HOE (LHOE) 2502 disposed atop an MOE 2504 which is modulated by a z-axis scanner 2516. An input image 2510 is directed to a concave screen 2508 which directs the input image onto the HOE 2402. The HOE translates the input image, providing an output image 2510' which is viewable by two viewers 2512 and 2514 over a wide range of viewing angles indicated by the line 2518. A radial HOE (RHOE) could be substituted for the LHOE 2502.

FIG. 25B illustrates an "overhead" embodiment of a volumetric display system 2550 functioning in a manner analogous to the embodiments of FIGS. 19D and 24A.

The volumetric display system 2550 utilizes a radial HOE (RHOE) 2502 disposed atop an MOE 2554 which is modulated by a z-axis scanner 2568. An input image 2560 is directed through collimating optics (a collimating lens) 2566 onto the RHOE 2552. Optionally, the input image is first "revealed" on a rear projection screen 2556 interposed between the image 2560 and the collimating optic 2566. The collimating optic 2566 serves, in essence, to "size" the image for translation by the RHOE 2552. The RHOE 2552 translates the image so as to be viewable over a wide range of viewing angles (indicated by azimuthal lines 2564, 2566, and elevational lines 2562) by a plurality of viewers. A discrete output image is omitted from this figure, for illustrative clarity. Moreover, the figure illustrates that a large number of viewers can view the same image from a full circle (360°) range of viewing positions, each viewing the output image from a different (their unique) perspective. A linear HOE (RHOE) could be substituted for the RHOE 2552.

FIG. 25C illustrates a volumetric display system 2580 which is similar to the system 2550 of FIG. 25B. Whereas the system 2550 is an "overhead" projection type system, the system 2580 is an "underneath" projection type system. An input image 2590 is projected through a collimating optic 2588, and optionally a rear projection screen 2586, through an MOE 2584 that is modulated by a z-axis scanner 2598, to pass through an RHOE 2582. The RHOE 2582 translates the image so that it is viewable over a full circle range of viewing positions by a plurality of viewers, as indicated by the azimuthal lines 2594 and 2596, and the elevational lines 2592.

A plurality of sensors can be disposed in the viewing area (or, alternatively, beneath the HOE and MOE) to, sense attempted user interaction with the perceived volumetric object—i.e., when the user tries to touch the object—in response to which the image can be caused to move in response to the user's attempted interaction with the object. Such an interactive feature will augment the mystique of the display.

Multiple Input Images

Figure 26A:
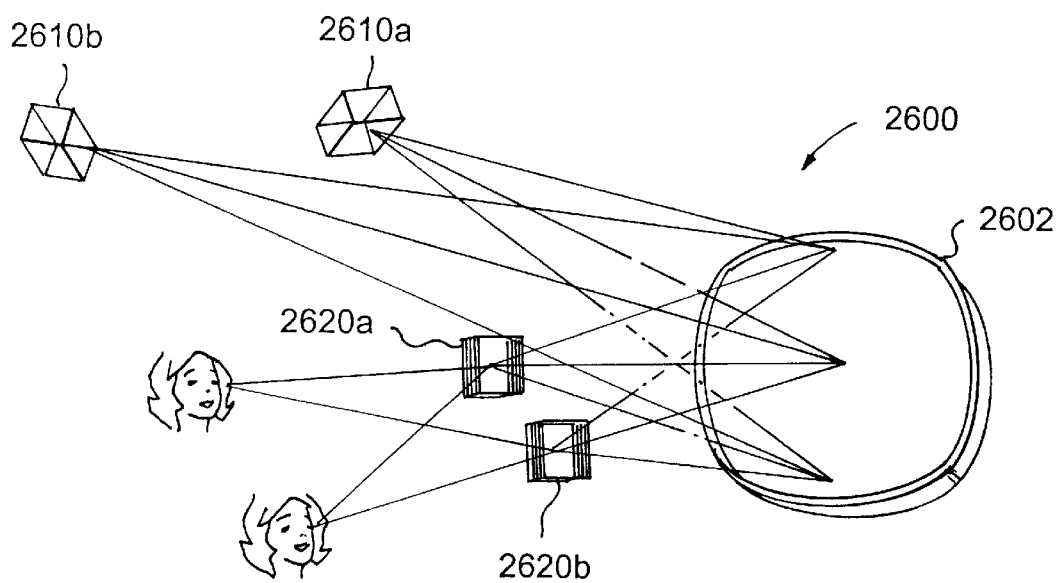
FIG. 26A is a partially schematic, partially perspective view of an embodiment of volumetrically displaying an image of a three-dimensional object to multiple viewers, employing multiple projection sources, using a multi-planar optical element (MOE) and a radial holographic optical element (RHOE) in a reflective mode, according to the present invention.
Figure 26B:
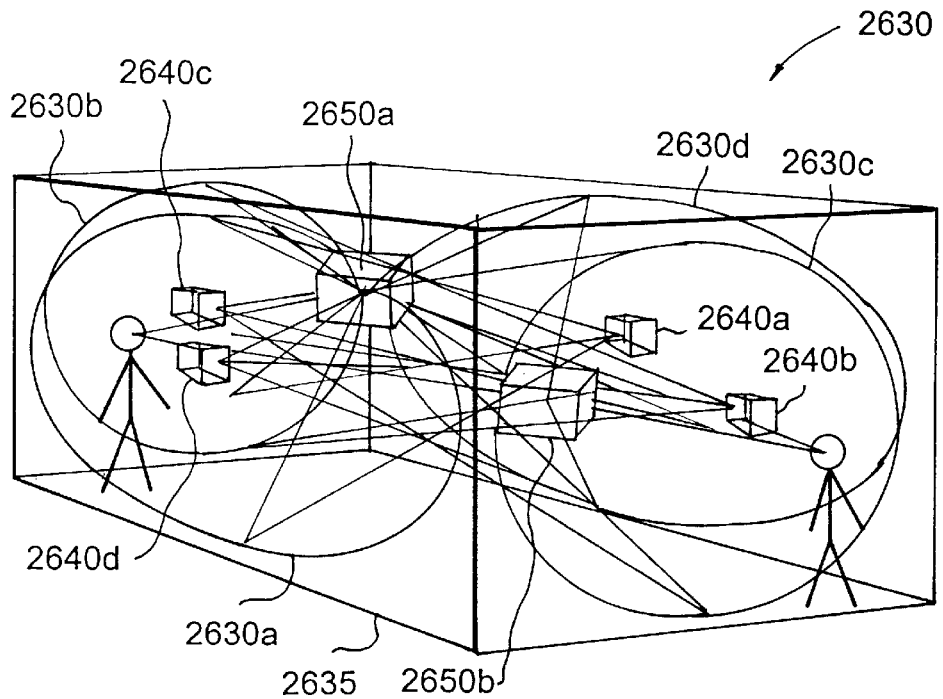
FIG. 26B is a partially schematic, partially perspective view of an embodiment of volumetrically displaying an image of a three-dimensional object to multiple viewers in a typical room having the shape of a rectangular prism, employing multiple projection sources, using a multi-planar optical element (MOE) and a radial holographic optical element (RHOE) in a reflective mode, according to the present invention.
Figure 26C:
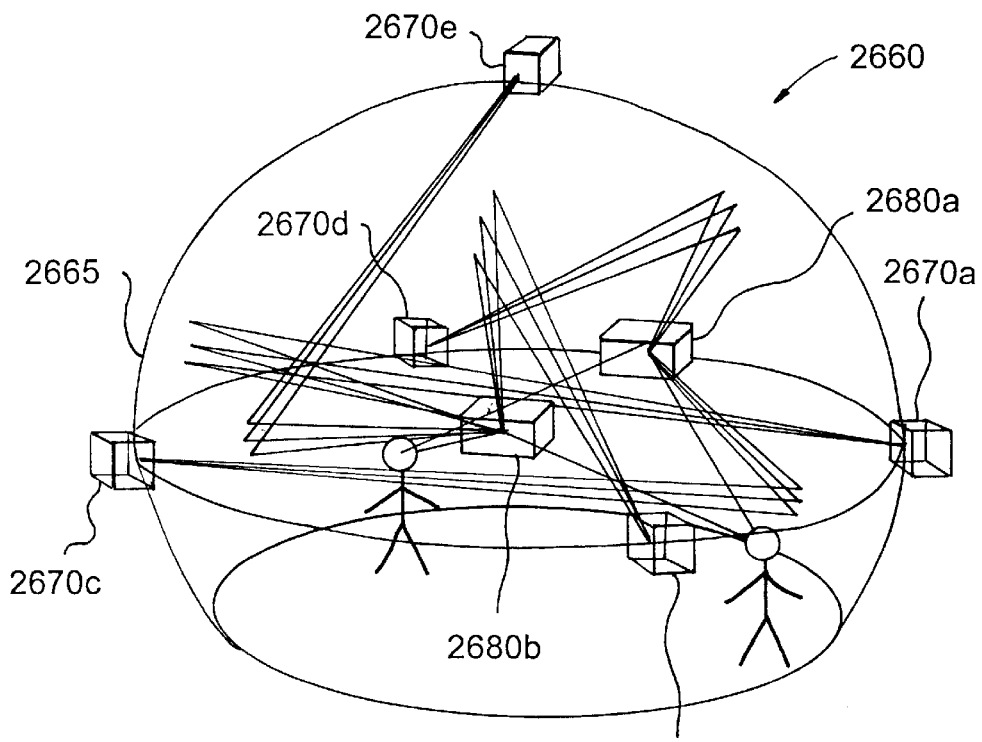
FIG. 26C is a partially schematic, partially perspective view of an embodiment of volumetrically displaying an image of a three-dimensional object to multiple viewers in a room having a rounded (astronomical observatory like) shape, employing multiple projection sources, using a multi-planar optical element (MOE) and a radial holographic optical element (RHOE) in a reflective mode, according to the present invention.

FIGS. 26A, 26B and 26C illustrate embodiments of volumetric display devices wherein the HOE is disposed generally vertically, rather than horizontally. In these embodiments, the HOE can be used to "wallpaper" a viewing room, enabling a plurality of viewers to view a three-dimensional image. It is generally preferred in these embodiments to use multiple (at least two) projectors which project multiple iterations of the input image at the HOE wallpaper from multiple angles. Evidently, the multiple images need to be correlated with one another since they are, in essence, views taken from different angles. The following figures describe using HOEs and transmission display devices employing multiple projection sources and yielding a wide (up to 360°) viewing range suitable for multiple-user applications.

FIG. 26A illustrates a volumetric display system 2600 which is generally similar to the system 2500 of FIG. 25A. A plurality of synchronized (coordinated) input images 2610a and 2610b are projected at a HOE 2602, which translates the input images to spatially-displaced positions as output images 2620a and 2620b. Collimating optics, rear projection screens, and MOE's can be incorporated into such a system, but are omitted for illustrative clarity.

FIG. 26B illustrates a volumetric display system 2630 employing a plurality of wall-size HOE's 2630a, 2630b, 2630c and 2630c disposed on the four walls of a room 2635. An input image is projected at a respective HOE from a respective volumetric projector (e.g., scanner, collimating optic, MOE) 2640a, 2640b, 2640c and 2640d, each of which is conveniently disposed behind the opposite (form the corresponding HOE) wall of the room. Viewers, shown as stick figures, can be in the room with the output (translated input) images 2650a and 2650b (two shown).

FIG. 26C illustrates a volumetric display system 2660 similar to the system 2630 of FIG. 26B, disposed in a non-traditional (e.g., not a box) viewing room 2665. Holographic (HOE) wallpaper (not shown) is disposed on the wall(s) of the room, and input images are projected onto the HOE wallpaper from a plurality of input devices 2670a, 2670b, 2670c, 2670d, 2670e from a plurality of angles. By coordinating (e.g., synchronizing) the input images, a plurality of volumetric output images 2680a and 2680b can be suspended in the viewing room 2665 to be viewed, and interacted with, by the viewers (shown as stick figures).

Packaging

As with any system interfacing with a user, the volumetric display device of the present invention should be packaged in an ergonomic manner. Given the wide range of applications for such a volumetric display device (including entertainment, virtual reality, CAD/CAM, etc.), the packaging could range from a tabletop display device to a kiosk-type arrangement. In FIGS. 26A, 26B and 26C, wallpapering a viewing room has been described, wherein the viewer generally does not perceive the volumetric display apparatus components (other than the HOE "wallpaper").

There have been described hereinabove a number of techniques for forming, projecting and displaying volumetric images, such as images of computer-aided design which is created on a computer. nI the following FIGS. 27A, 27B, 27C and 28A, 28B are shown exemplary "packaged" versions of a working volumetric display system.

Figure 27B:
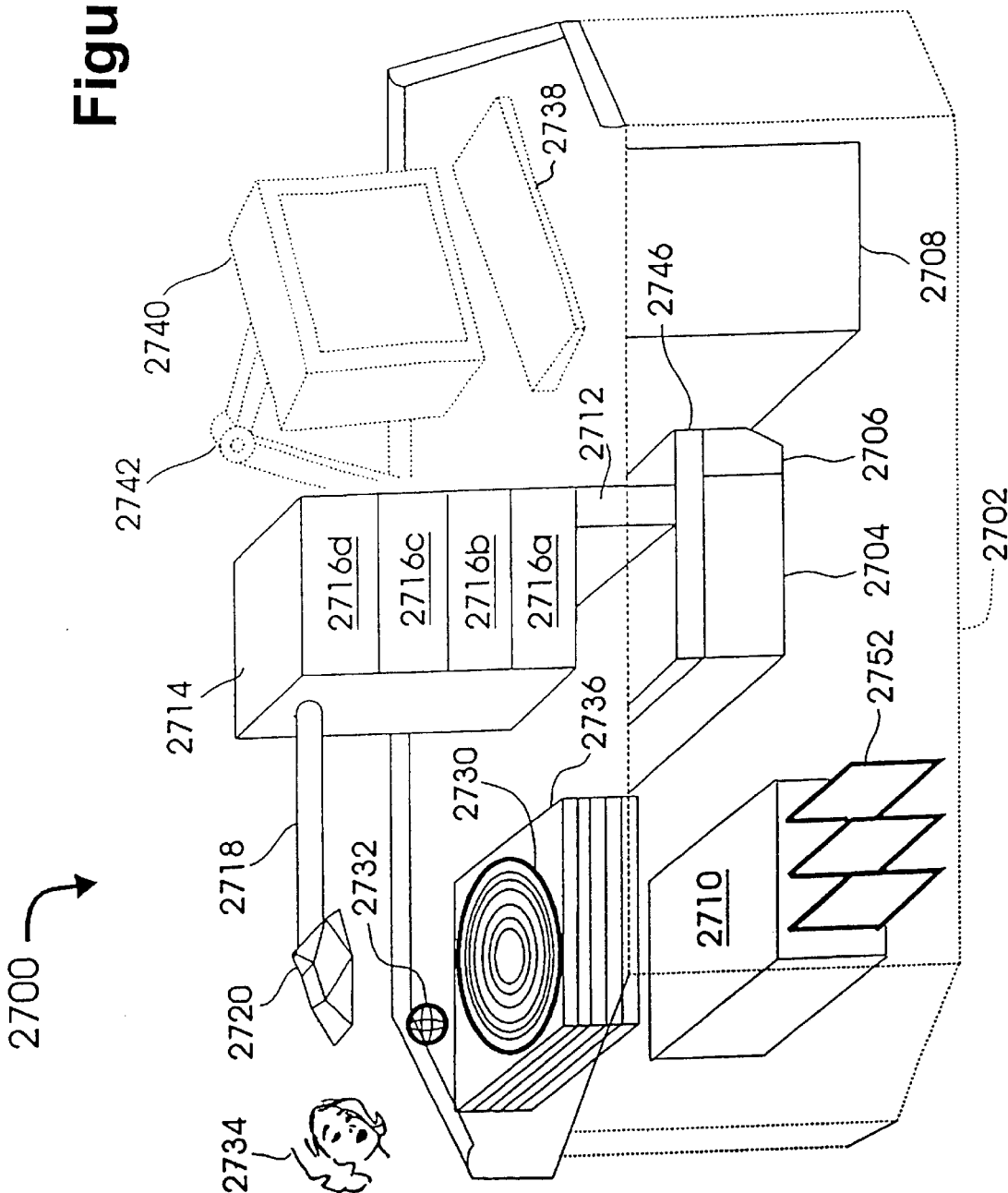
FIG. 27B is a perspective view of the apparatus of FIG. 27A, showing the location of components in the interior, according to the present invention.
Figure 27C:
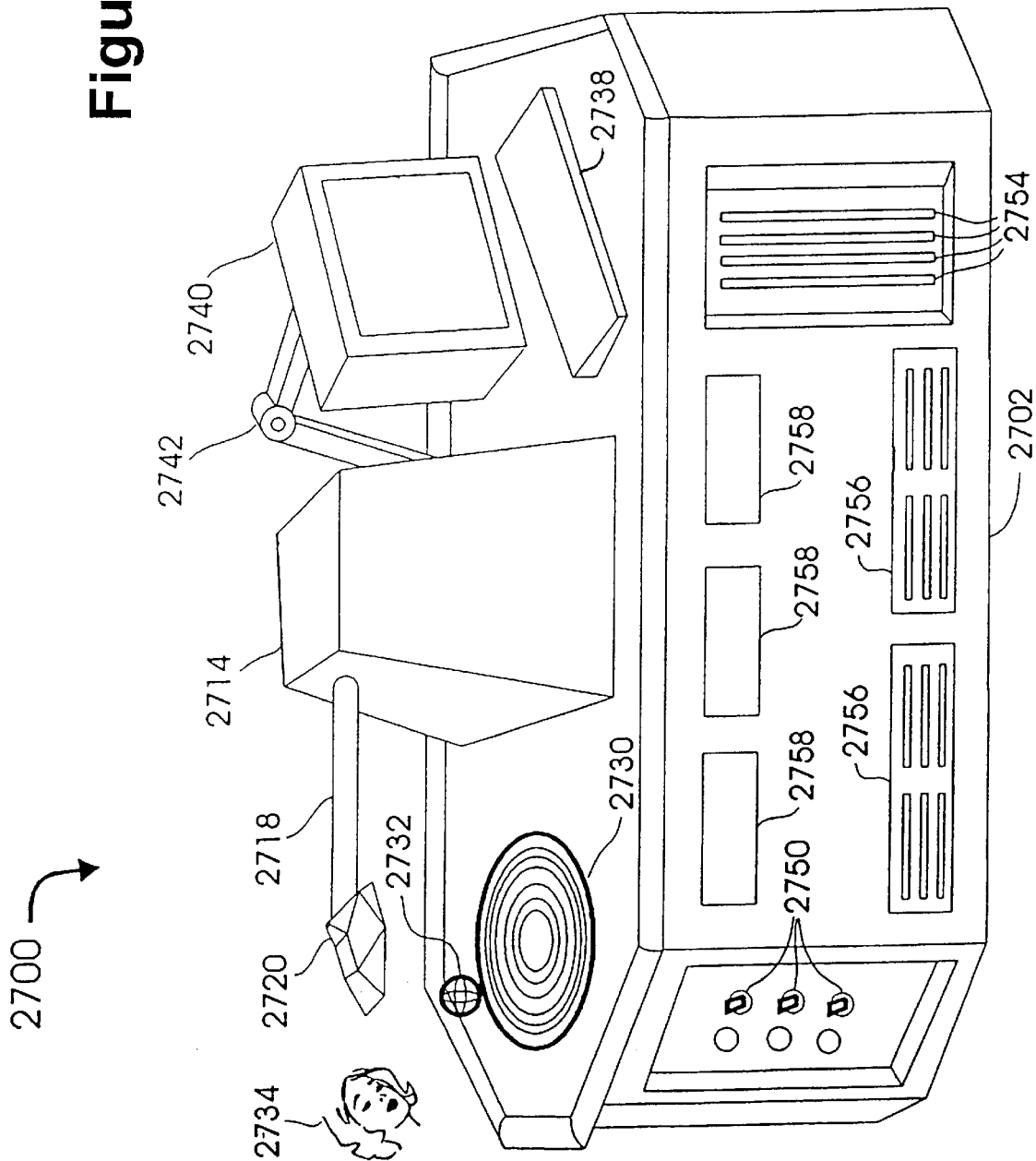
FIG. 27C is a perspective view of the apparatus of FIG. 27A, showing the location of external controls, according to the present invention.

FIGS. 27A, 27B and 27C illustrate a packaged volumetric display system 2700 suitable for tabletop use in any application where a video display monitor would otherwise be employed to view data. A system such as is shown in FIGS. 27A, 27B and 27C is similar to the embodiment described with respect to FIG. 24B. The system 2700 includes a base 2702 housing the laser(s) 2704 and certain of the optical elements 2706 (namely splitting optics), as well as microprocessor(s) 2708 for controlling the laser(s) and optics (AOD's, MOE) and power supplies 2710.

The beam(s) from the laser(s) are directed via a beam feed (beam delivery system) 2712 to a tower 2714 disposed atop the base 2702 and containing the AOD (acousto-optic deflector) components which are stacked one atop the other in the beam path. Generally, four AOD's (2716a, 2716b, 2716c, 2716d) are employed. The laser(s) and splitting optics are disposed beneath a mounting plate 2746, and the AOD's are mounted atop the mounting plate 2746.

An inchoate (partially complete) three-dimensional image is fed over a light pipe 2718 from the tower 2714 to a projector head 2720. The projector head contains a mirror 2722 (for re-directing the beam), a concave screen 2724 (for revealing an image in a manner similar to the screen described with respect to FIG. 25A), and a converging lens 2726 for adjusting the size of an image reflected off of the screen.

An HOE, preferably a RHOE 2730 is disposed on the top surface of the base 2702. Image data (inchoate three-dimensional image) is directed by the projector head 2720 at the RHOE 2730, to form a three-dimensional image of an object 2732 (a simple ball-shaped object is shown) which may be viewed (and/or interacted with) by a viewer 2734. The RHOE 2730 can be disposed atop an MOE 2736, in a manner analogous to the embodiment shown in FIG. 25A.

The basic (underlying) image information (raw object data) is generated by an off-line computer (not shown), the operation of which can be controlled by a keyboard 2738 and observed on a monitor 2740. The monitor can be mounted on an articulated arm 2742 extending from the tower 2714 at a position opposite the light pipe 2718. An opaque, preferably rubber, bumper 2744 is disposed around the periphery of the top surface of the base to reduce illumination of the RHOE 2730 from ambient sources (e.g., room lights).

FIG. 27B is an "x-ray" view of the system 2700, showing the location of certain components of the volumetric display system, and FIG. 27C is an exterior view of the system 2700, showing representative controls (e.g., switches, rheostats, etc.), gauges (e.g., meters), and the like, relating to the operation of the volumetric display system components (laser(s) AOD(s), etc.).

The system 2700 of FIGS. 27A, 27B, 27C has been designed with ergonomics and serviceability of components in mind. For example, the projector head 2720 and HOE 2730 are located at an opposite end of the base from the keyboard 2738 and the monitor 2740. Certain controls 2750 intended for use by the viewer are accessible at the projector end of the base. Power supply boards 2752 and microprocessor boards 2754 are accessible from one common side (visible in the figures) of the base. Vents 2756 and miscellaneous control panels 2758 are also disposed on the common side of the base. The opposite side of the base (not visible in the figures) does not have any controls, and can be disposed against a wall or the like.

The system 2700 of FIGS. 27A, 27B, 27C is an "overhead" system similar to the "overhead" system of FIG. 24A.

Figure 28A:
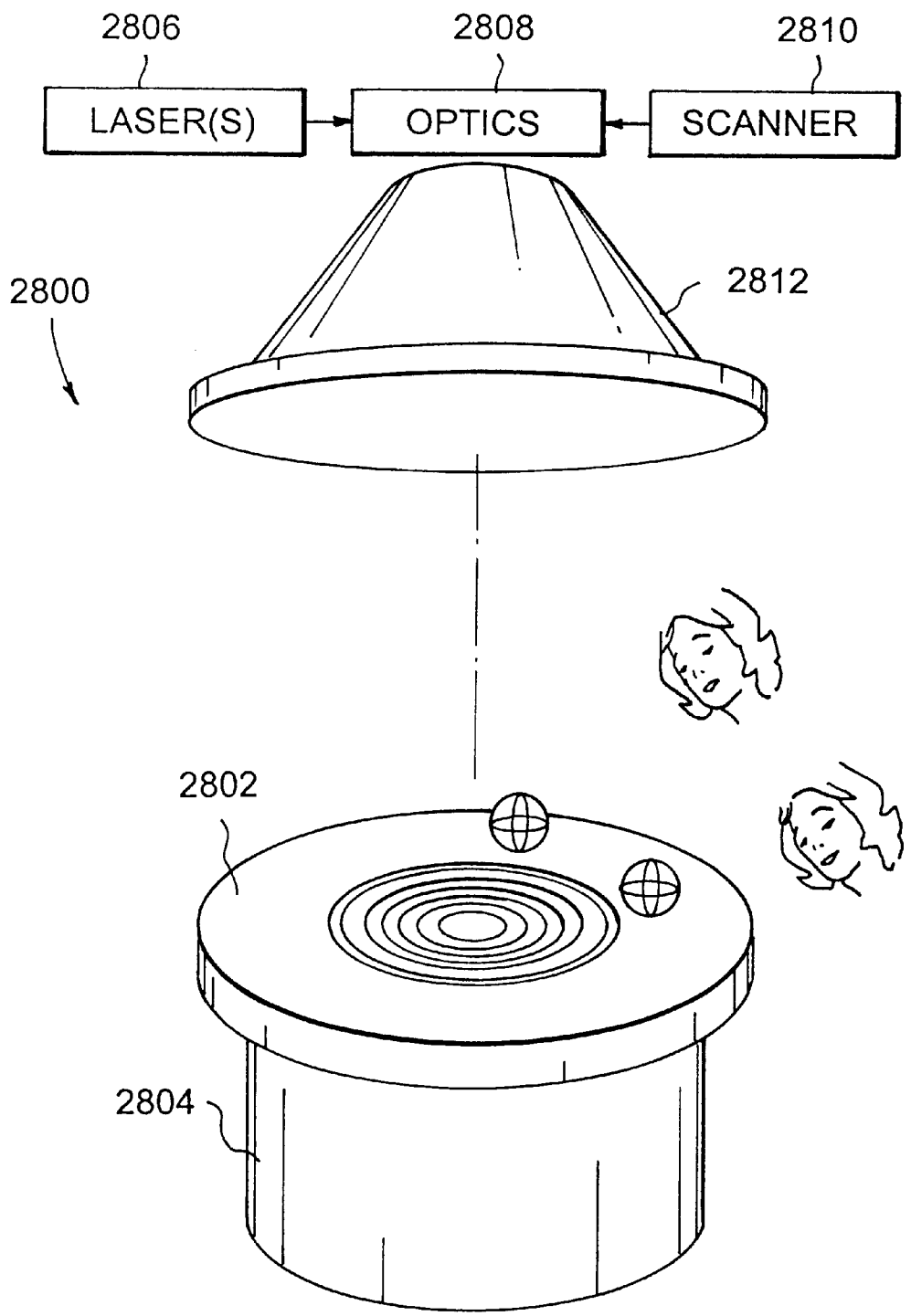
FIG. 28A is a partially schematic, partially perspective of another embodiment of a volumetric display apparatus, according to the present invention.

FIG. 28A illustrates an embodiment of a volumetric display system 2800 suitable for use in a small room, and is similar in principle to the system 2700 of FIGS. 27A, 27B, 27C. An RHOE 2802 is disposed atop a pedestal 2804 which preferably contains an MOE (not shown). The pedestal may be disposed on a floor or submerged in the floor. In the latter case, a curb (not shown) should be erected around the submerged pedestal. This system 2800 is configured so that the laser(s) 2806, optics 2808 and scanner(s) 2810 are disposed separate from the pedestal, and preferably concealed in a ceiling. A projector head 2812 is suspended from above the pedestal, and may be flush with a ceiling. The projector head 2812 contains the necessary screen and collimating optics (not shown).

Figure 28B:
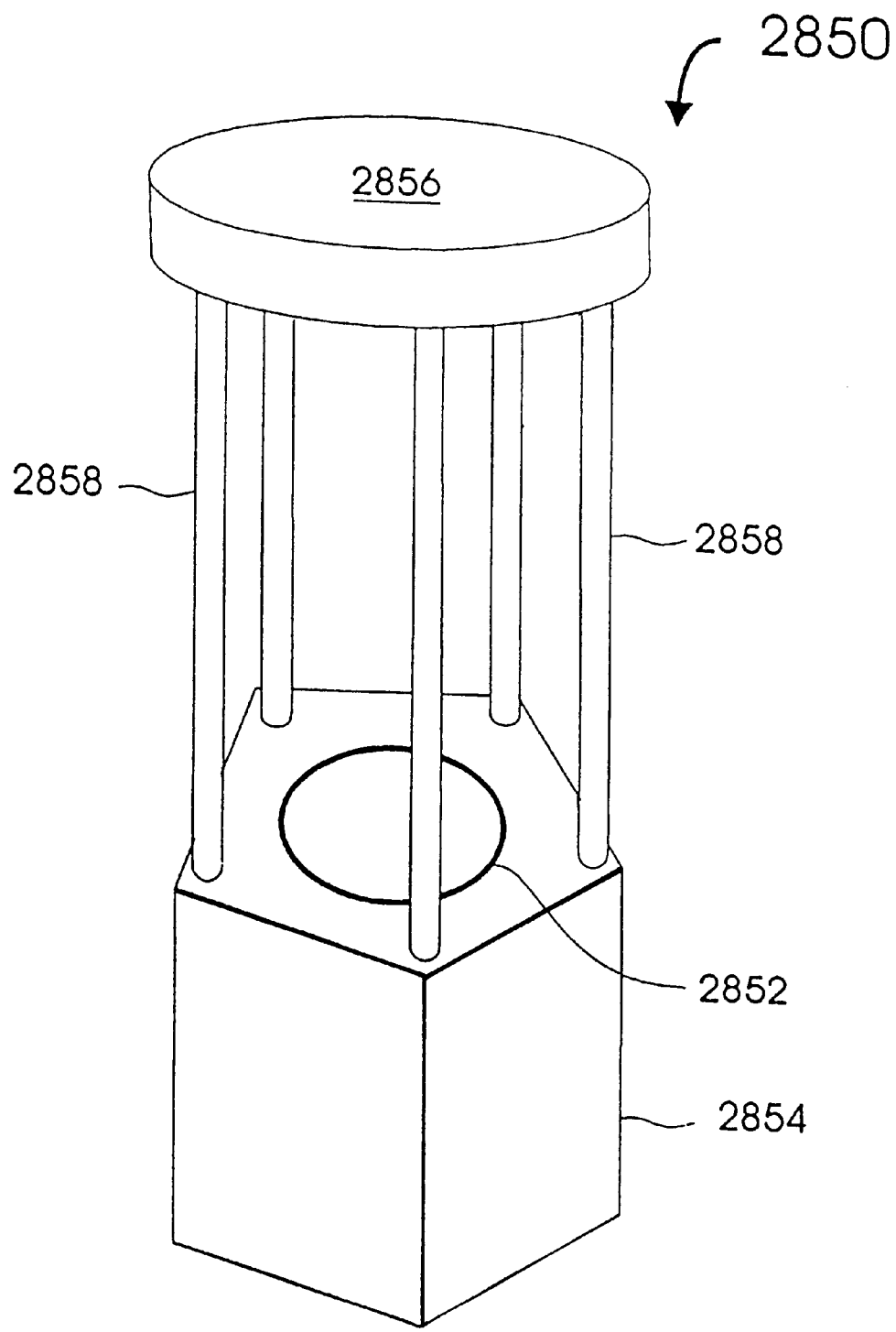
FIG. 28B is a perspective view of the exterior surfaces of the volumetric display apparatus shown in FIG. 28A, according to the present invention.

FIG. 28B illustrates an embodiment of a volumetric display system 2850 similar to the system 2800 of FIG. 28A. In this case the system is packaged in a portable "kiosk" form, such as would be useful for arcade (game) or display (e.g., trade show) applications. An RHOE 2852 and an MOE (not shown) are disposed on the top surface of a base component 2854 of the system, and the lasers, optics, scanner, screen and collimating optics are disposed in a top component 2856 of the system. The top component 2856 is supported above the base component 2854 by a suitable number of columns 2858.

Interactive Applications

There have been described, hereinabove, a number of embodiments of volumetric display apparatus suitable for displaying volumetric, three-dimensional images. Inasmuch as these images can be generated by a computer (such as in entertainment or CAD/CAM applications), it is evident that providing means whereby the user can interact with the images, rather than simply viewing the images, would be highly desirable. Such interaction may take the form of modifying the appearance of an existing image and/or affecting the presentation of a subsequently-displayed image. Various exemplary techniques of interacting with a displayed image are discussed herein.

Figure 29:
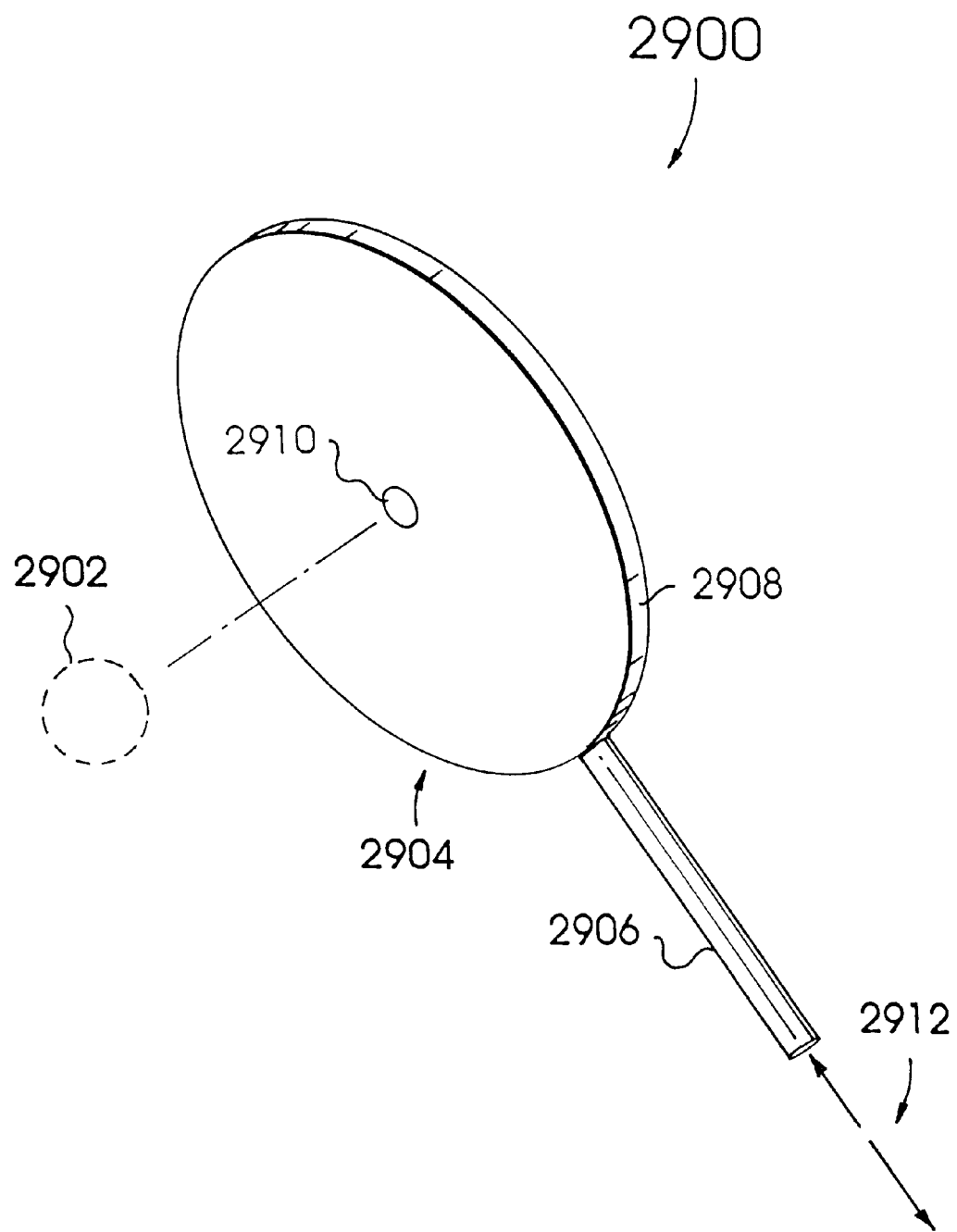
FIG. 29 is a partially schematic, partially perspective view of one embodiment of apparatus for interacting with a volumetric image of a three-dimensional object, according to the present invention.

FIG. 29 illustrates one technique 2900 for enabling a user (viewer) to interact with a volumetrically displayed image. An image 2902, such as a ball (shown in dashed lines) is presented to the viewer, by any of the techniques described hereinabove. In this example, the user is provided with a hand-held paddle device 2904 with which the user can interact with the image 2902.

The paddle 2904 has a handle portion 2906 suitable for being gripped by the user, and has a head portion 2908 suitable for the user probing (e.g., hitting) the image 2902. The head portion 2908 is preferably formed of a transparent or translucent material, such as plastic. Inasmuch as, in this example, the paddle 2904 is larger than the viewed object 2902, this will allow the user to continue viewing the object 2902 while interacting therewith.

The paddle 2904 is provided with a light-sensitive sensor 2910 such as a photocell. When the head 2908 of the paddle 2908 comes in "contact" with the object 2902, the photocell provides a signal on a line 2912. Said signal is readily provided to a computer (not shown) generating the image of the object to modify the position of the object. An exemplary application of such interaction would be in entertainment applications, such as for a user playing ping-pong with a volumetrically-displayed ball (2902). However, the concept of the user interacting via a photocell with the displayed object is not limited to such applications.

This embodiment (2900) exemplifies the concept that the three-dimensional image (2902) is displayed as a volumetric "bundle" of photons occupying a localized position in space, by virtue of the fact that an abrupt change in intensity can be sensed when a sensor comes into "contact" with the displayed image.

Additional Embodiments, Components and Uses

Figure 30A:
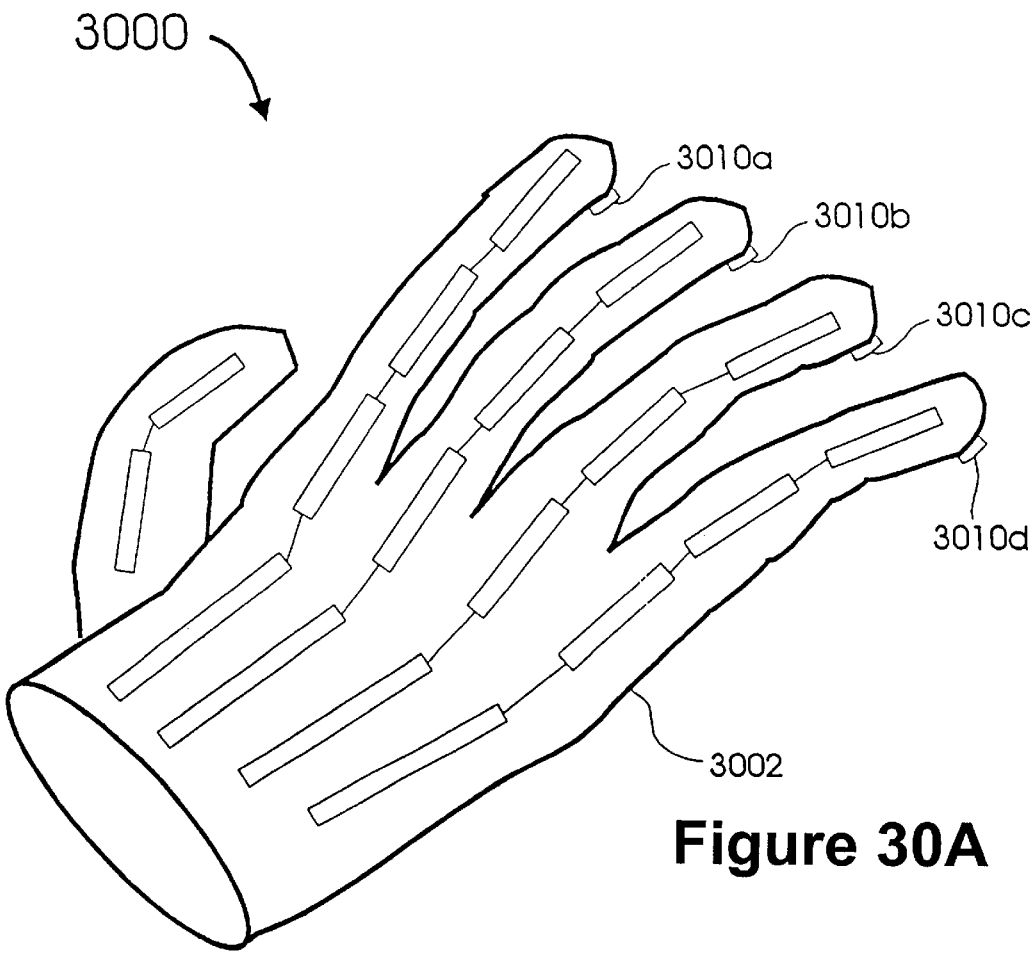
FIG. 30A is a partially schematic, partially perspective view of another embodiment of apparatus for interacting with a volumetric image of a three-dimensional object, according to the present invention.
Figure 30B:
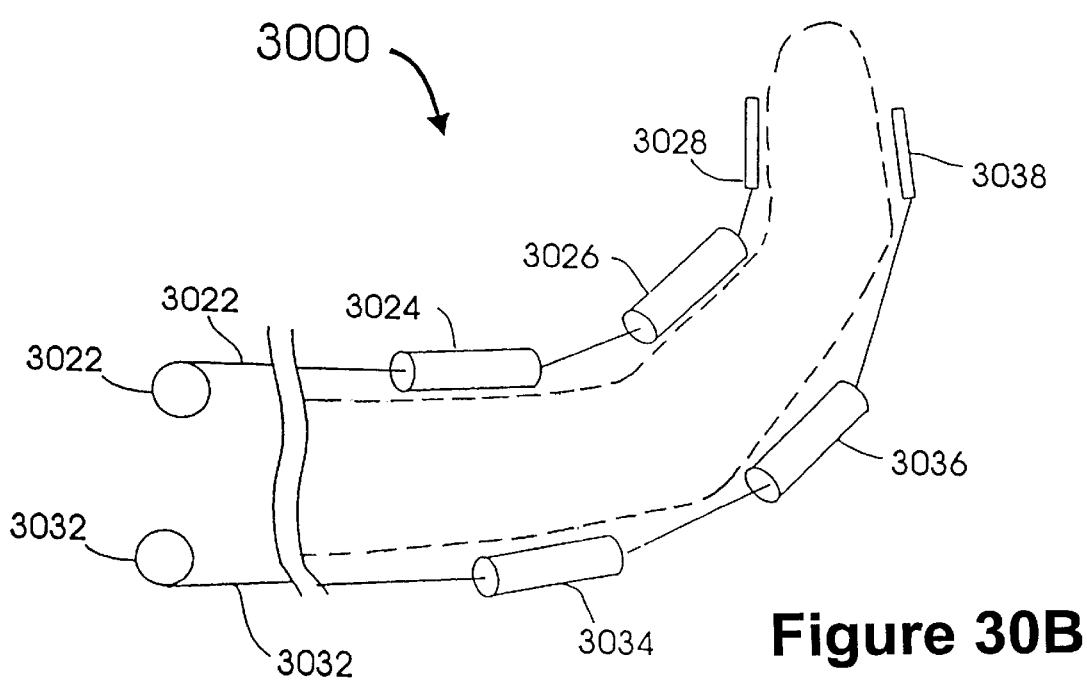
FIG. 30B is a partially schematic side view of a portion of the apparatus of FIG. 30A, according to the present invention.

FIGS. 30A and 30B illustrate another device 3000 for enabling a user to interact with a volumetric display. In this example, the device 3000 is in the form of a glove 3002 intended to be worn on the hand of the user. Each fingertip (and optionally the thumbtip) of the glove 3002 is provided with a light-sensitive sensor 3010 (3010a, 3010b, 3010c, 3010d) such as a photocell. In this manner, when a finger comes in "contact" with a displayed object (not shown), the display can be modified in a manner analogous to the embodiment of FIG. 29.

The glove 3002 is additionally provided with a system of strain, resistance and/or positioning components which provide the user with tactile feedback when the gloves comes into contact with a displayed object. For example, as best viewed in FIG. 30B, a cable 3020 extends from a reel (drum) 3022 through two hollow bushings 3024, 3026 disposed on the two segments of each finger (in the case of the thumb, the one segment) closest to the palm of the hand. The distal end of the cable 3020 is secured to a solid bushing 3028 disposed on the segment of the finger farthest from the palm. A stepper motor (not shown) associated with the drum 3022 can control flexure of the finger. A friction clutch (not shown) associated with the drum 3022 can provide resistance to flexure of the finger. A position sensor (such as a rheostat, not shown) associated with the drum 3022 can detect the flexure of the finger. The drum 3022 and associated stepper motor, friction clutch and/or position sensor are suitably located in a wrist portion (not shown) of the glove (gauntlet). As illustrated in FIG. 30B, the bushings 3024, 3026, 3028 are disposed on the inner (palm side) surface of the finger. A similar arrangement of drum 3032, cable 3030, hollow bushings 3034 and 3036, and solid bushing 3028 can be disposed on the outer (back of the hand side) surface of the finger.

Multi-Planar Optical Sensor

In FIGS. 29, 30A and 30B, embodiments of user-interaction devices were described which employed photocells to sense, in an existential (e.g., ON/OFF) sense, coming into contact with a displayed object—generally with the "surface" of the displayed object.

Figure 31:
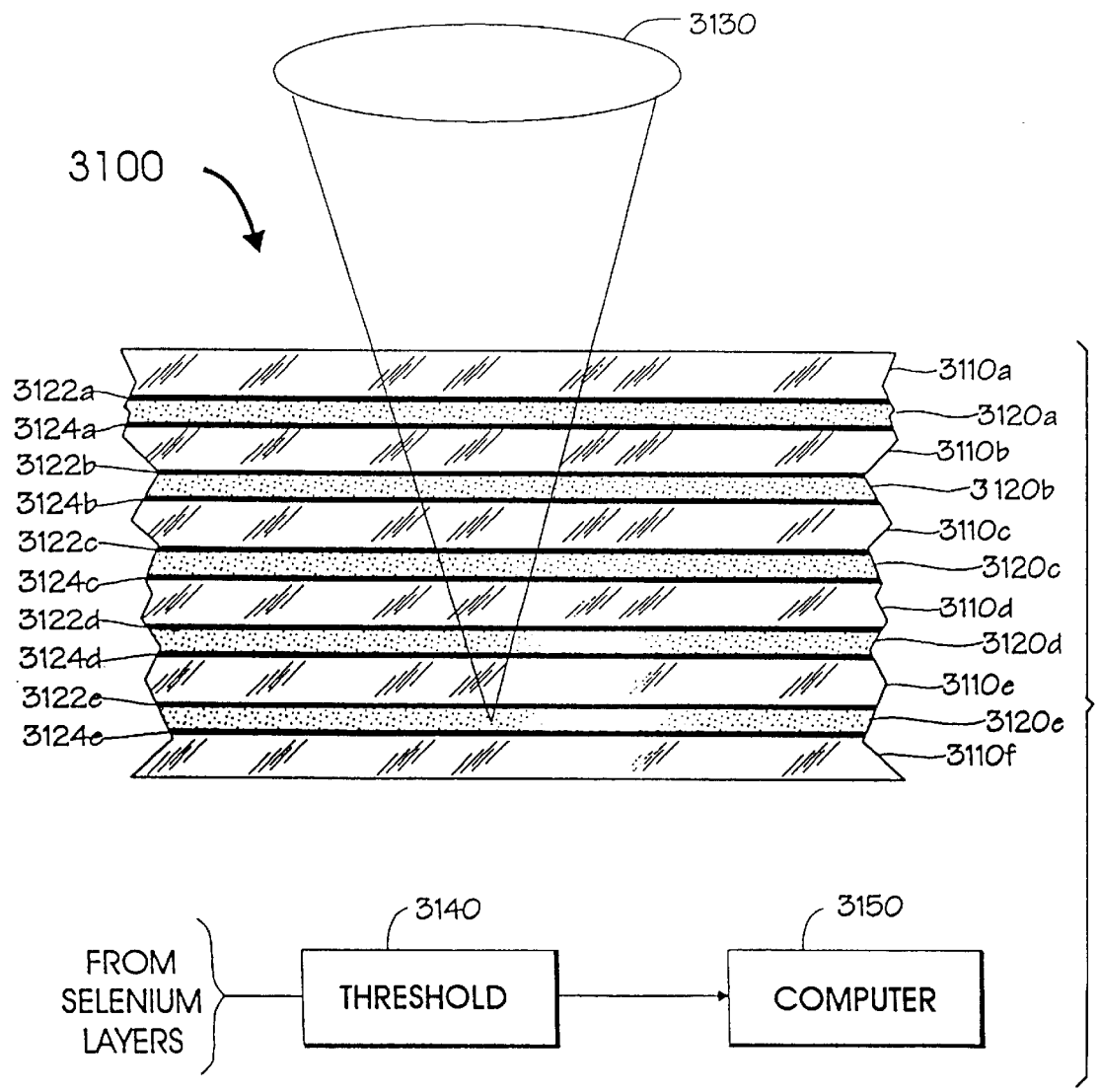
FIG. 31 is a schematic view of a multi-planar optical sensor ("MOS"), according to the present invention.

FIG. 31 illustrates a device 3100 which is useful for collecting greater information (data) from a volumetrically-generated display, which may be the display of an object or a "display" of data. Generally the device 3100 is a multi-planar optical sensor (MOS) which is constructed in a manner similar to the multi-planar optical element (MOE) of FIG. 11A. Whereas the MOE of FIG. 11A was used in a manner analogous to a transmitter, the MOS of FIG. 31 is used in a manner analogous to a receiver. As will be evident from discussions that follow, the MOS can be advantageously employed as a "receiver" in a high-density data link.

The MOS 3100 comprises a series of transparent (preferably glass) plates 3110a, 3110b, 3110c, 3110d, 3110e, and 3110f, separated from one another by thin layers 3120a, 3120b, 3120c, 3120d, and 3120e of photosensitive material such as selenium. Each layer of selenium is provided with a pair of transparent electrodes for the purpose of sensing impingement of light upon the layer. Selenium layer 1120a has transparent electrodes 1122a and 1124a disposed on opposite sides thereof. Selenium layer 1120b has transparent electrodes 1122b and 1124b disposed on opposite sides thereof. Selenium layer 1120c has transparent electrodes 1122c and 1124c disposed on opposite sides thereof. Selenium layer 1120d has transparent electrodes 1122d and 1124d disposed on opposite sides thereof. Selenium layer 1120e has transparent electrodes 1122e and 1124e disposed on opposite sides thereof. One of the two electrodes associated with each selenium layer may be used to pre-charge the layer, and the other may be used as a "sense" line.

The electrodes (sense lines) are connected (connections omitted for illustrative clarity) to circuitry 3140 for adjusting the selenium layer's threshold of sensitivity, and the circuitry 3140 is connected to a computer 3150 for processing data generated by the threshold-adjusted selenium layers.

The electrodes are preferably disposed in a matrix for each layer of selenium, so that information can be derived from each layer pertaining to the "x" and "y" position of photons impinging (at the depth of the particular layer) upon the MOS. The stacked series of selenium layers provides "z" (depth) information pertaining to the photons impinging upon the MOS. An MOS constructed in this manner can "decode" a volumetric (three-dimensional) image directed at the MOS. The MOS 3100 can also be provided with liquid crystal layers (in the manner of the embodiment of FIG. 11A) to selectively make the individual selenium layers receptive. In any case (with or without liquid crystal layers), a volumetric package of photons directed at the MOS will be "scanned" to determine its content (e.g., data content). Anti-reflective coatings on the transparent layers 3110a–e can be used to minimize "ghosting" and undesirable spurious reflections off the surfaces thereof. In a manner analogous to the second mode of operation discussed with respect to the MOE 1100 of FIG. 11A, the MOS 3100 is used in an "imaging" mode. One of ordinary skill in the art will understand that the multi-planar optical sensor is not restricted to any particular number of layers, and that any number of photosensitive layers may readily be incorporated into an assembly of this sort. By providing a large number of layers, three-dimensional images of considerable depth can be read (decoded). Alternatively, with a large number of layers an incident beam can be effectively "scanned" in a large number of steps.

As is evident, the MOS 3100 is useful for sensing the contour of a displayed image, as well as for decoding (reading) information contained (encoded) in a volumetric bundle of light.

The MOS 3100 is advantageously employed to decode linear data which has been "bundled" in volumetric form. In such an application, the MOS 3100 is simply placed at the foci locus of an emitting lens 3130, and can discern between the different "layers" of information being projected (e.g., transmitted). Each layer of the MOS is coated to pass a portion (e.g., 50%) of incident light, and to refract the remaining portion (e.g., 50%) of incident light, and the individual layers may alternately (other than selenium) be coated with a piezo-electric material that will emit a voltage when "squeezed" by incident light. The photosensitive layers may also be formed by fabricating a thin film of photoreactive crystals (e.g., using lasers) on each of the plates of the MOS.

The teachings of the present invention are not limited to displaying volumetric images of three-dimensional objects. The teachings of the present invention are also applicable to "compressing" large amounts of data into a small image-like packet of data, and transmitting said packet of data along a suitable optical link, such as an optical fiber cable. This will enable high density (and high speed) data communications from one site to another, such as over an optical fiber cable.

Figure 32A:
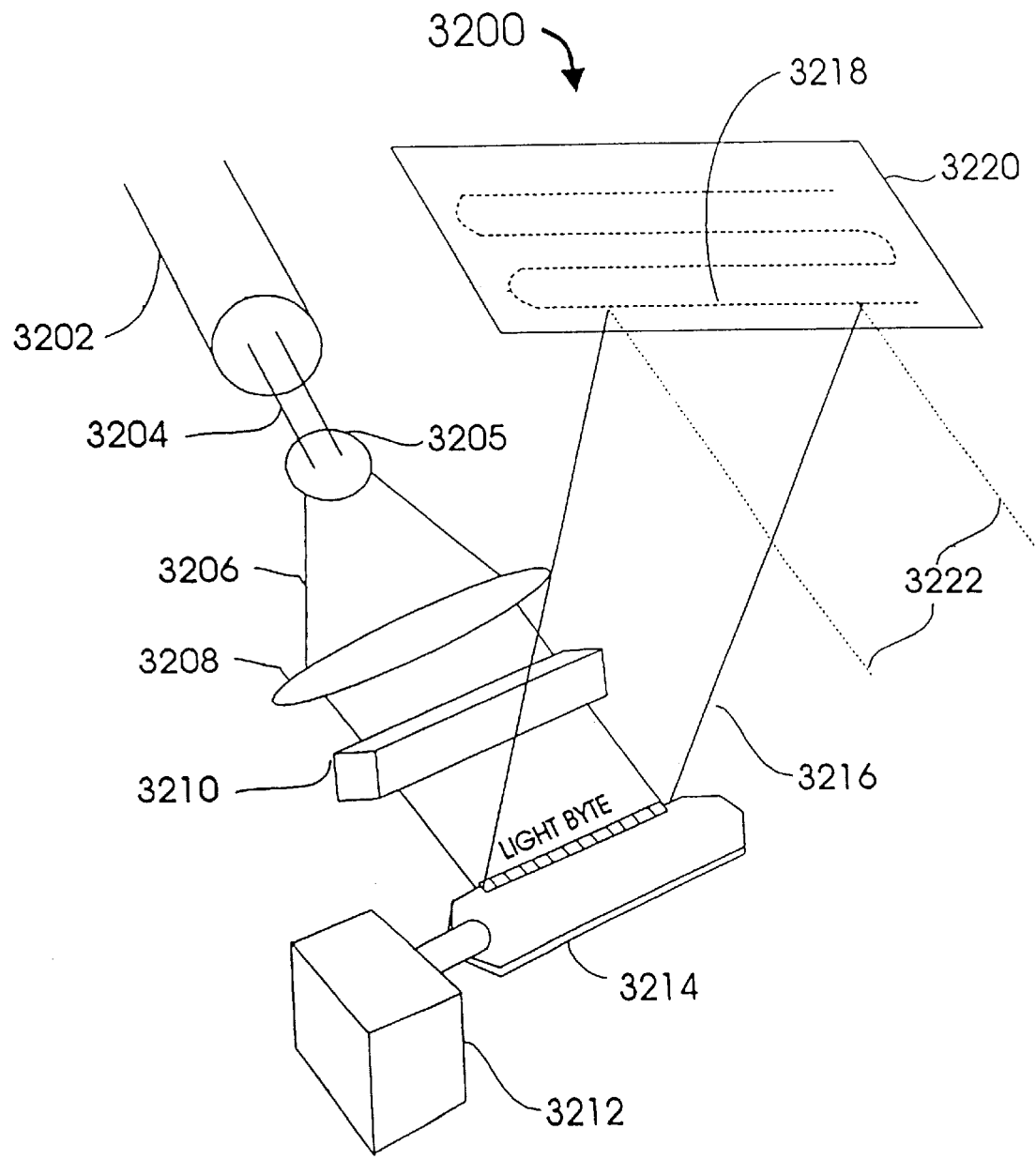
FIG. 32A is a schematic view of an embodiment of system for rapidly scanning data in optical form, according to the present invention.
Figure 32B:
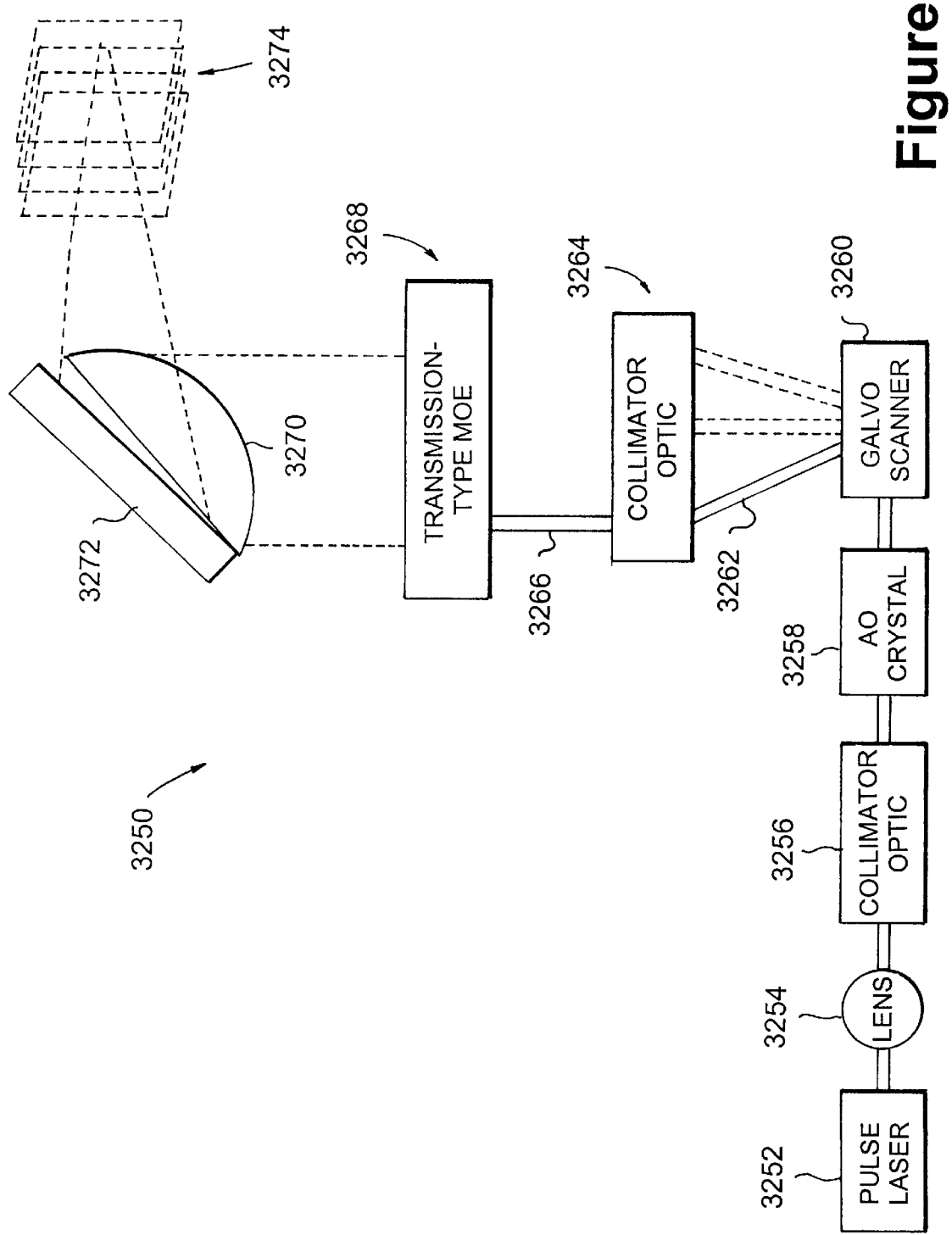
FIG. 32B is a schematic view of an embodiment of a system for rapidly scanning volumetric data, according to the present invention.

FIGS. 32A and 32B are illustrative of components of a volumetric system suitable for encoding large amounts of "linear data" (data which is not in a volumetric format) into a volumetric format, such as would find application in a high-density communications link, according to the present invention.

Acousto-Optic Line Scanner

FIG. 32A shows an AO (acousto-optic) line scanner 3200. The scanner is designed to perform the task of scanning, at an extremely rapid rate. Generally, an AO driver (3210) sends shear waves down a $TeO_2$ (or other suitable AO) crystal, making a pattern of points, or COLUMNS (all the waves are staggered at different spacings). A string (sequence) of COLUMNS in this pattern becomes a single row of on/off points (analogous to one vertical row on a television). This ROW is bounced off of a line motor scanner (3212, 3214), designed to perform this function at a very fast rate without requiring random access, then advances to the next ROW below (behind, in the sequence) it. This enables raster-type scanning, as indicated by the pattern 3218 on the screen 3220. In a sense, a laser (3202) is used like an automotive timing light (e.g., to freeze motion), in this case to isolate each of the ROWs of information (shear waves) that are travelling down the crystal (3210) at the speed of sound. The laser beam may be doubled in a YAG doubling chamber 3204 prior to being made wedge-shaped by a cylinder optic (lens) 3205. The wedge-shaped beam is collimated by a collimator optic (lens) 3206) prior to being acted upon by the AO crystal 3210. The AO crystal 3210 is driven by a radio frequency (RF) signal (not shown). A vertical axis galvo scanner 3212 drives (rotates) a reflective paddle 3214, to provide discrete "light bytes" (tm), on a row-by-row basis, to a screen 3220, where the volumetric data can be raster (alternatively, vector) scanned (3218) and emitted along a path 3222 to emitter optics and an MOE (not shown). The screen 3220 functions analogously to a television screen, and the system 3200 is useful for x,y scanning of enormous volumes of data at a very rapid rate, for subsequent formatting (by emitter optics, MOE, and the like) into a volumetric format. Such high-density, volumetrically-formatted data, can be transmitted over a wide link, such as a fiber optic cable (not shown), to be decoded (disassembled, de-volumetrized) at the receiving end.

Multi-Planar Phase-Scanned System

FIG. 32B shows a multi-planar, AO (phase) scanned system 3250, and illustrates that a two-dimensional display could be provided into a transmission-type MOE (3268) to scan a volume. In this figure, the image (3274) is suspended with an assembly of a mirror (3272) and a lens (3270). Generally, a high frequency pulse laser 3252 provides a beam to a cylinder optic (lens) 3254. The beam output by the lens 3254 is provided to a collimator optic 3256, the output of which is scanned by an AO crystal 3258 or the like. The output of the AO 3258 is provided to a galvo ("ping-pong") scanner 3260. The output of the scanner 3260 is provided as a scanned beam 3262 (alternate positions of the beam shown in dashed lines) to a collimator optic 3264. The output of the collimator 3264 is provided to an MOE 3268. The output of the MOE 3268 is caused to be suspended in space, as a multi-planar image 3274 by a mirror 3272 and a lens 3270.

Generally, in this system, the radial-like scanned output of the galvo (3260) is converted to a linear scan, to ensure that all of the volumetric bits of data are properly lined up.

Communications Over a Distance

Figure 33:
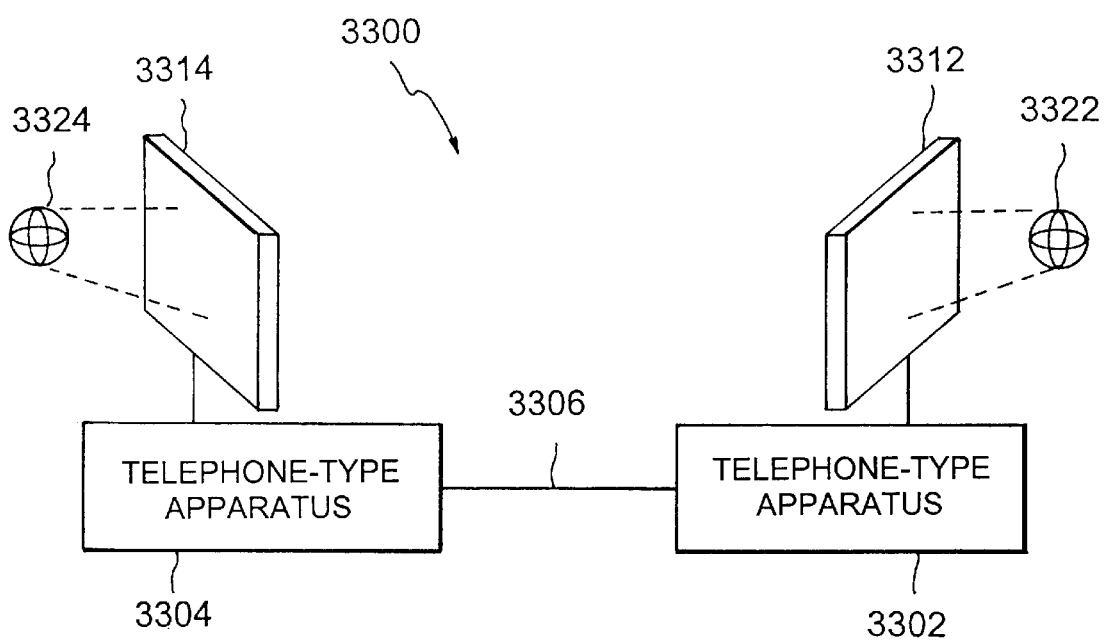
FIG. 33 is a partially schematic, partially perspective view of exemplary apparatus for transmitting a volumetric display of three-dimensional objects over a distance.

FIG. 33 illustrates a system 3300 for communicating images from a one location to another location, comprising two telephone-type apparatus 3302 and 3304 connected by a high density communications line 3306 (such as an optical fiber channel). Each telephone 3302 and 3304 is equipped with a volumetric display apparatus 3312 and 3314, respectively, for displaying a volumetric image 3322 and 3324, respectively. The volumetric display apparatus 3312 (3314) is any of the volumetric display apparatus described hereinabove—for example, the embodiment 2450 of FIG. 24B. For a compact (versus, e.g., room-size) volumetric display apparatus, solid state lasers would advantageously be employed. Additionally, HOE's (especially RHOE's) would maintain the cost at a level affordable by consumers (versus, e.g., physical optical elements). Generally, any method of transmitting large amounts of data (including image data) from one location to another location, involves: providing input data (including image data) in a linear (i.e., non-volumetric) format; converting the input data to a volumetric format; transmitting the data in the volumetric format; and receiving (decoding) the data in a volumetric format; and converting the received data to a linear format.

Converging Streams of Radiant Energy

Figure 34:
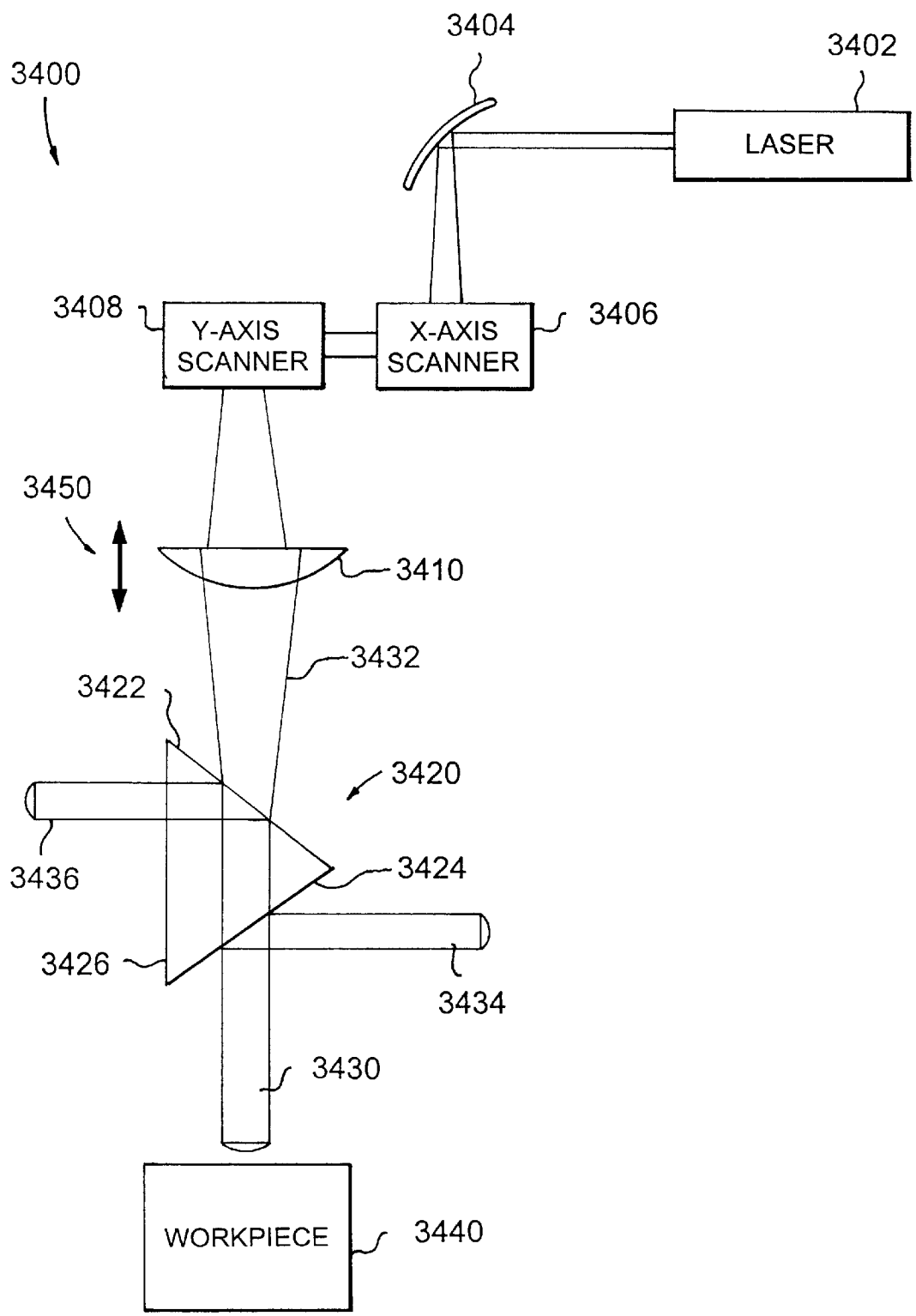
FIG. 34 is a schematic illustration of a beam-combining component, according to the present invention.

FIG. 34 illustrates a technique 3400 for converging at least two streams of radiant energy, and is useful for any of the embodiments described hereinabove requiring converging laser energy (beams) from two or more lasers. Generally, the technique is particularly advantageous for converging three laser beams, and may be used in various ones of the previous embodiments as a converging optic.

A first beam 3432 is directed along a first path at a first face 3422 of a three-sided prism 3420. A second beam 3434 is directed along a second path at a second face 3424 of the three-sided prism 3420. A third beam 3436 is directed along a third path at a third face 3426 of the three-sided prism 3420.

The first beam 3432 enters the prism 3420 through the first face 3422 thereof, and passes through the prism 3420, from the first face 3422 to the second face 3424, exiting the prism as a portion of an output beam 3430. The second beam 3434 is directed at, and reflects (externally) off of, the second face 3424 of the prism, along the path of the output beam 3430—never entering the prism. This is effected by a dichroic coating (not shown) disposed on the second face of the prism. The third beam 3436 enters the prism 3420 through the third face 3426 thereof, reflects (internally) off of the first face 3422 of the prism, passes through the prism 3420, from the first face 3422 to the second face 3424, and exits the second face 3424 along the path of the output beam 3430. This is effected by a dichroic coating on the first face 3422 of the prism. It is not necessary to coat (dichroic) the third face 3426 of the prism. The output beam 3430 is the aggregate of the first, second and third "input" beams 3432, 3434, 3436, and is suitably directed to optics, MOE's, HOE's, or a workpiece (3440).

High energy input beams (e.g., 3432), such as from a high energy laser 3402, can be modified (such as modulated or dispersed) by a concave reflector (mirror) 3404, an "x-axis" scanner 3406 (such as a galvo), a "y-axis" scanner 3408 (such as a galvo), and a converging (or diverging) optic (lens) 3410. The mirror 3404 can be cooled, if necessary. By moving the optic 3410 back and forth along the beam path, as indicated by the two-headed arrow 3450, the focal point of the beam (i.e., that input beam's component of the output beam) can be modified (e.g., modulated, given a depth component). All three beams can be generated and modified in the same manner as shown with respect to the first beam 3432.

Although the invention has been illustrated and described in detail in the drawings and foregoing description, the same is to be considered as illustrative and not restrictive in character—it being understood that only representative embodiments have been shown and described, and that all changes and modifications thereto are within the spirit and scope of the invention are desired to be are desired to be protected. It should be understood that various alternatives to the embodiments of the invention described herein can be employed in practicing the invention. It is intended that the following claims define the scope of the present invention and that structures and methods within the scope of these claims and their equivalents be covered thereby.

What is claimed is:

1. A multi-planar optical element for use in multi-dimensional displays comprising:

a plurality of substantially evenly-spaced parallel planar transparent layers, each planar transparent layer having a first planar surface and a second planar surface;

a plurality of liquid crystal layers disposed between the planar transparent layers, wherein each liquid crystal layer has a light receiving surface extending along the entire length of the respective liquid crystal layer, wherein each liquid crystal layer is controlled to have the entire light receiving surface configured in one of a transparent state and a non-transparent state, with the non-transparent state affecting all incident light substantially identically; and means for directing a beam of light at the plurality of transparent layers.

2. A multi-planar optical element according to claim 1, further comprising:

means for controlling each of the liquid crystal layers to switch between the transparent state and a reflective state as the non-transparent state for reflecting the incident light of any wavelength.

3. A multi-planar optical element according to claim 2, wherein:

the beam of light is directed at the plurality of transparent layers at an oblique angle relative to the planar surfaces of the transparent layers.

4. A multi-planar optical element according to claim 1, further comprising:

means for controlling each of the liquid crystal layers to switch between the transparent state and an opaque state as the non-transparent state being opaque to the incident light of any wavelength.

5. A multi-planar optical element according to claim 4, wherein:

the beam of light is directed at the plurality of transparent layers perpendicular to the planar surfaces of the transparent layers.

6. A multi-planar optical element according to claim 1, further comprising:

means for evenly spacing the plurality of parallel planar transparent layers apart from one another and including the plurality of liquid crystal layers.

7. A multi-planar optical element for use in multi-dimensional displays, comprising:

a plurality of substantially evenly-spaced parallel planar transparent layers, each planar transparent layer having a first planar surface and a second planar surface;

a plurality of liquid crystal layers disposed between the planar transparent layers, wherein each liquid crystal layer has a light receiving surface extending along the entire length of the respective liquid crystal layer, wherein each liquid crystal layer is controlled to have the entire light receiving surface configured in one of a transparent state and a non-transparent state, with the non-transparent state affecting all incident light substantially identically; and a light projector directing a beam of light at the plurality of transparent layers.

8. A multi-planar optical element for use in multi-dimensional displays, comprising:

a plurality of substantially evenly-spaced parallel planar transparent layers, each planar transparent layer having a first planar surface and a second planar surface; and a plurality of liquid crystal layers disposed between the planar transparent layers, wherein each liquid crystal layer has a light receiving surface extending along the entire length of the respective liquid crystal layer, wherein each liquid crystal layer is controlled to have the entire light receiving surface configured in one of a transparent state and a non-transparent state, with the non-transparent state affecting all incident light substantially identically.

\* \* \* \* \*